(12) United States Patent
Mark et al.

(10) Patent No.: US 11,759,990 B2
(45) Date of Patent: Sep. 19, 2023

(54) THREE DIMENSIONAL PRINTING

(71) Applicant: MARKFORGED, INC., Watertown, MA (US)

(72) Inventors: Gregory Thomas Mark, Newton, MA (US); Antoni S. Gozdz, Stow, MA (US)

(73) Assignee: MARKFORGED, INC., Waltham, MA (US)

(*) Notice: Subject to any disclaimer, the term of this patent is extended or adjusted under 35 U.S.C. 154(b) by 0 days.

(21) Appl. No.: 17/476,915

(22) Filed: Sep. 16, 2021

(65) Prior Publication Data

US 2022/0001587 A1 Jan. 6, 2022

Related U.S. Application Data

(63) Continuation of application No. 16/134,451, filed on Sep. 18, 2018, which is a continuation of application
(Continued)

(51) Int. Cl.
*B29C 64/118* (2017.01)
*B33Y 10/00* (2015.01)
(Continued)

(52) U.S. Cl.
CPC ............ *B29C 48/154* (2019.02); *B29B 15/14* (2013.01); *B29C 48/92* (2019.02); *B29C 64/118* (2017.08);
(Continued)

(58) Field of Classification Search
CPC ... B29C 64/118; B29C 64/209; B29C 48/154; B29C 48/92; B29C 48/05; B29C 69/001;
(Continued)

(56) References Cited

U.S. PATENT DOCUMENTS 4,291,841 A 9/1981 Dalrymple et al.
4,720,251 A 1/1988 Mallay et al.
(Continued)

FOREIGN PATENT DOCUMENTS

CA 2907492 C 3/2022
CN 1659320 A 8/2005
(Continued)

OTHER PUBLICATIONS

"List of thermal conductives" https://en.wikipedia.org/wiki/List_of_thermal_conductivities, accessed Mar. 27, 2019 (Year: 2019).
(Continued)

*Primary Examiner* — Joseph S Del Sole
*Assistant Examiner* — Baileigh Kate Darnell
(74) *Attorney, Agent, or Firm* — Lando & Anastasi, LLP

(57) ABSTRACT

Various embodiments related to three dimensional printers, and reinforced filaments, and their methods of use are described. In one embodiment, a void free reinforced filament is fed into an extrusion nozzle. The reinforced filament includes a core, which may be continuous or semi-continuous, and a matrix material surrounding the core. The reinforced filament is heated to a temperature greater than a melting temperature of the matrix material and less than a melting temperature of the core prior to extruding the filament from the extrusion nozzle.

35 Claims, 46 Drawing Sheets

Related U.S. Application Data

No. 15/206,569, filed on Jul. 11, 2016, now Pat. No. 10,076,876, which is a continuation of application No. 15/179,223, filed on Jun. 10, 2016, now abandoned, which is a continuation of application No. 14/222,318, filed on Mar. 21, 2014, now abandoned.

(60) Provisional application No. 61/907,431, filed on Nov. 22, 2013, provisional application No. 61/902,256, filed on Nov. 10, 2013, provisional application No. 61/883,440, filed on Sep. 27, 2013, provisional application No. 61/881,946, filed on Sep. 24, 2013, provisional application No. 61/880,129, filed on Sep. 19, 2013, provisional application No. 61/878,029, filed on Sep. 15, 2013, provisional application No. 61/847,113, filed on Jul. 17, 2013, provisional application No. 61/831,600, filed on Jun. 5, 2013, provisional application No. 61/815,531, filed on Apr. 24, 2013, provisional application No. 61/804,235, filed on Mar. 22, 2013.

(51) Int. Cl.

| | | |
|---|---|---|
| *B29C 48/154* | (2019.01) | |
| *B29C 69/00* | (2006.01) | |
| *B29C 48/92* | (2019.01) | |
| *B29C 70/38* | (2006.01) | |
| *B33Y 30/00* | (2015.01) | |
| *B29C 64/209* | (2017.01) | |
| *B33Y 70/10* | (2020.01) | |
| *B33Y 40/00* | (2020.01) | |
| *B29B 15/14* | (2006.01) | |
| *B29C 48/05* | (2019.01) | |
| *B29C 48/25* | (2019.01) | |
| *B29K 101/12* | (2006.01) | |
| *B29K 105/08* | (2006.01) | |

(52) U.S. Cl.
CPC .......... *B29C 64/209* (2017.08); *B29C 69/001* (2013.01); *B29C 70/384* (2013.01); *B33Y 10/00* (2014.12); *B33Y 30/00* (2014.12); *B33Y 40/00* (2014.12); *B33Y 70/10* (2020.01); *B29C 48/05* (2019.02); *B29C 48/2528* (2019.02); *B29C 2948/92076* (2019.02); *B29C 2948/92571* (2019.02); *B29C 2948/92704* (2019.02); *B29C 2948/92904* (2019.02); *B29K 2101/12* (2013.01); *B29K 2105/08* (2013.01)

(58) Field of Classification Search
CPC ....... B29C 70/384; B33Y 10/00; B33Y 30/00; B33Y 40/00; B33Y 70/00; B29B 15/14; B29K 2101/12
See application file for complete search history.

(56) References Cited

U.S. PATENT DOCUMENTS

| | | | |
|---|---|---|---|
| 5,002,712 A | 3/1991 | Goldmann et al. | |
| 5,037,691 A | 8/1991 | Medney et al. | |
| 5,096,530 A | 3/1992 | Cohen | |
| 5,121,329 A | 6/1992 | Crump | |
| 5,155,324 A | 10/1992 | Deckard et al. | |
| 5,285,995 A | 2/1994 | Gonzalez et al. | |
| 5,340,433 A | 8/1994 | Crump | |
| 5,447,793 A | 9/1995 | Montsinger | |
| 5,764,521 A | 6/1998 | Batchelder et al. | |
| 5,866,058 A | 2/1999 | Batchelder et al. | |
| 5,885,316 A | 3/1999 | Sato et al. | |
| 5,906,863 A | 5/1999 | Lombardi et al. | |
| 5,936,861 A | 8/1999 | Jang et al. | |
| 5,955,119 A | 9/1999 | Andris et al. | |
| 6,054,077 A | 4/2000 | Comb et al. | |
| 6,070,107 A | 5/2000 | Lombardi et al. | |
| 6,080,343 A | 6/2000 | Kaufman et al. | |
| 6,085,957 A | 7/2000 | Zinniel et al. | |
| 6,099,783 A | 8/2000 | Scranton et al. | |
| 6,129,872 A | 10/2000 | Jang | |
| 6,153,034 A | 11/2000 | Lipsker | |
| 6,214,279 B1 | 4/2001 | Yang et al. | |
| 6,363,606 B1 | 4/2002 | Johnson, Jr. et al. | |
| 6,372,178 B1 | 4/2002 | Tseng | |
| 6,421,820 B1 | 7/2002 | Mansfield et al. | |
| 6,492,651 B2 | 12/2002 | Kerekes | |
| 6,504,127 B1 | 1/2003 | McGregor et al. | |
| 6,547,210 B1 | 4/2003 | Marx et al. | |
| 6,823,230 B1 | 11/2004 | Jamalabad et al. | |
| 6,859,681 B1 | 2/2005 | Alexander | |
| 6,934,600 B2 | 8/2005 | Jang et al. | |
| 6,986,739 B2 | 1/2006 | Warren et al. | |
| 7,020,539 B1 | 3/2006 | Kovacevic et al. | |
| 7,083,697 B2 | 8/2006 | Dao et al. | |
| 7,127,309 B2 | 10/2006 | Dunn et al. | |
| 7,625,200 B2 | 12/2009 | Leavitt | |
| 8,050,786 B2 | 11/2011 | Holzwarth | |
| 8,066,842 B2 | 11/2011 | Farmer et al. | |
| 8,153,183 B2 | 4/2012 | Skubic et al. | |
| 8,221,669 B2 | 7/2012 | Batchelder et al. | |
| 8,295,972 B2 | 10/2012 | Coleman et al. | |
| 8,815,141 B2 | 8/2014 | Swanson et al. | |
| 8,827,684 B1 | 9/2014 | Schumacher et al. | |
| 8,916,085 B2 | 12/2014 | Jackson et al. | |
| 8,920,697 B2 | 12/2014 | Mikulak et al. | |
| 9,126,365 B1 | 9/2015 | Mark et al. | |
| 9,126,367 B1 | 9/2015 | Mark et al. | |
| 9,156,205 B2 | 10/2015 | Mark et al. | |
| 9,207,540 B1 | 12/2015 | Bhargava et al. | |
| 9,327,453 B2 | 5/2016 | Mark et al. | |
| 9,370,896 B2 | 6/2016 | Mark | |
| 9,427,399 B2 | 8/2016 | Adams et al. | |
| 9,511,544 B2 | 12/2016 | Hemingway et al. | |
| 9,579,851 B2 | 2/2017 | Mark et al. | |
| 9,694,544 B2 | 7/2017 | Mark et al. | |
| 9,849,631 B1 | 12/2017 | Goss et al. | |
| 10,016,942 B2 | 7/2018 | Mark et al. | |
| 10,029,415 B2 | 7/2018 | Swanson et al. | |
| 10,059,057 B2 | 8/2018 | Schirtzinger et al. | |
| 10,061,301 B2 | 8/2018 | Burton | |
| 10,076,876 B2 | 9/2018 | Mark et al. | |
| 10,099,427 B2 | 10/2018 | Mark et al. | |
| 10,118,375 B2 | 11/2018 | Hickman et al. | |
| 10,131,088 B1 | 11/2018 | Tyler et al. | |
| 10,160,193 B2 | 12/2018 | Nielsen-Cole et al. | |
| 10,254,499 B1 | 4/2019 | Cohen et al. | |
| 10,293,594 B2 | 5/2019 | Gardiner | |
| 10,414,147 B2 | 9/2019 | Sweeney et al. | |
| 10,611,082 B2 | 4/2020 | Mark et al. | |
| 2001/0030383 A1 | 10/2001 | Swanson et al. | |
| 2002/0009935 A1 | 1/2002 | Hsiao et al. | |
| 2002/0062909 A1 | 5/2002 | Jang et al. | |
| 2002/0079607 A1 | 6/2002 | Hawley et al. | |
| 2002/0102322 A1 | 8/2002 | Gunther | |
| 2002/0113331 A1 | 8/2002 | Zhang et al. | |
| 2002/0165304 A1 | 11/2002 | Mulligan et al. | |
| 2002/0172817 A1 | 11/2002 | Owens | |
| 2003/0044593 A1 | 3/2003 | Vaidyanathan et al. | |
| 2003/0056870 A1 | 3/2003 | Comb et al. | |
| 2003/0090034 A1 | 5/2003 | Mulhaupt et al. | |
| 2003/0186042 A1 | 10/2003 | Dunlap et al. | |
| 2003/0236588 A1 | 12/2003 | Jang et al. | |
| 2004/0067711 A1 | 4/2004 | Bliton et al. | |
| 2004/0124146 A1 | 7/2004 | Dao et al. | |
| 2004/0140078 A1 | 7/2004 | Liu et al. | |
| 2004/0166140 A1 | 8/2004 | Santini et al. | |
| 2004/0253365 A1 | 12/2004 | Warren et al. | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0156352 A1 | 7/2005 | Burkle et al. | |
| 2005/0230029 A1 | 10/2005 | Vaidyanathan et al. | |

(56) References Cited

U.S. PATENT DOCUMENTS

| | | |
|---|---|---|
| 2005/0279185 A1 | 12/2005 | Cook et al. |
| 2006/0047052 A1 | 3/2006 | Barrera et al. |
| 2007/0003650 A1 | 1/2007 | Schroeder |
| 2007/0036964 A1 | 2/2007 | Rosenberger et al. |
| 2007/0151167 A1 | 7/2007 | Cook et al. |
| 2007/0179657 A1 | 8/2007 | Holzwarth |
| 2007/0225856 A1 | 9/2007 | Slaughter et al. |
| 2007/0228592 A1 | 10/2007 | Dunn et al. |
| 2007/0252871 A1 | 11/2007 | Silverbrook |
| 2008/0176092 A1 | 7/2008 | Owens |
| 2008/0206394 A1 | 8/2008 | Bouti |
| 2008/0251975 A1 | 10/2008 | Gallagher et al. |
| 2008/0274229 A1 | 11/2008 | Barnett |
| 2009/0022615 A1 | 1/2009 | Entezarian |
| 2009/0054552 A1 | 2/2009 | Yano et al. |
| 2009/0065965 A1 | 3/2009 | Bowen |
| 2009/0092833 A1 | 4/2009 | Schmitt et al. |
| 2009/0095410 A1 | 4/2009 | Oldani |
| 2009/0174709 A1 | 7/2009 | Kozlak et al. |
| 2009/0199948 A1 | 8/2009 | Kisch |
| 2009/0220632 A1 | 9/2009 | Haque |
| 2009/0234616 A1 | 9/2009 | Perkins |
| 2010/0024987 A1 | 2/2010 | Saine et al. |
| 2010/0028641 A1 | 2/2010 | Zhu et al. |
| 2010/0151072 A1 | 6/2010 | Scheurich |
| 2010/0191360 A1 | 7/2010 | Napadensky et al. |
| 2010/0203351 A1 | 8/2010 | Nayfeh |
| 2010/0243764 A1 | 9/2010 | Okesaku et al. |
| 2011/0001264 A1 | 1/2011 | Minoura et al. |
| 2011/0032301 A1 | 2/2011 | Fienup et al. |
| 2011/0070394 A1 | 3/2011 | Hopkins et al. |
| 2011/0143108 A1 | 6/2011 | Fruth et al. |
| 2011/0178621 A1 | 7/2011 | Heide |
| 2011/0222081 A1 | 9/2011 | Yi et al. |
| 2011/0230111 A1 | 9/2011 | Weir et al. |
| 2011/0289791 A1 | 12/2011 | Menchik et al. |
| 2012/0060468 A1 | 3/2012 | Dushku et al. |
| 2012/0070523 A1 | 3/2012 | Swanson et al. |
| 2012/0092724 A1 | 4/2012 | Pettis |
| 2012/0140041 A1 | 6/2012 | Burgunder et al. |
| 2012/0144795 A1 | 6/2012 | Knappe |
| 2012/0156445 A1 | 6/2012 | Schmidt et al. |
| 2012/0231225 A1 | 9/2012 | Mikulak et al. |
| 2012/0247655 A1 | 10/2012 | Erb et al. |
| 2013/0004610 A1 | 1/2013 | Hartmann et al. |
| 2013/0075952 A1 | 3/2013 | Seman, Sr. et al. |
| 2013/0164498 A1 | 6/2013 | Langone et al. |
| 2013/0205920 A1 | 8/2013 | Tow |
| 2013/0209600 A1 | 8/2013 | Tow |
| 2013/0221192 A1 | 8/2013 | Rocco et al. |
| 2013/0233471 A1 | 9/2013 | Kappesser et al. |
| 2013/0241102 A1 | 9/2013 | Rodgers et al. |
| 2013/0242317 A1 | 9/2013 | Leavitt et al. |
| 2013/0320467 A1 | 12/2013 | Buchanan et al. |
| 2013/0327917 A1 | 12/2013 | Steiner et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0036035 A1 | 2/2014 | Buser et al. |
| 2014/0039663 A1 | 2/2014 | Boyer et al. |
| 2014/0044822 A1 | 2/2014 | Mulliken |
| 2014/0048969 A1 | 2/2014 | Swanson et al. |
| 2014/0048970 A1 | 2/2014 | Batchelder et al. |
| 2014/0061974 A1 | 3/2014 | Tyler |
| 2014/0065847 A1 | 3/2014 | Salmon et al. |
| 2014/0090528 A1 | 4/2014 | Graf |
| 2014/0120197 A1 | 5/2014 | Swanson et al. |
| 2014/0121813 A1 | 5/2014 | Schmehl |
| 2014/0154347 A1 | 6/2014 | Dilworth et al. |
| 2014/0159284 A1 | 6/2014 | Leavitt |
| 2014/0175706 A1 | 6/2014 | Kritchman |
| 2014/0210137 A1 | 7/2014 | Patterson et al. |
| 2014/0232035 A1 | 8/2014 | Bheda |
| 2014/0265037 A1 | 9/2014 | Stirling et al. |
| 2014/0268604 A1 | 9/2014 | Wicker et al. |
| 2014/0277661 A1 | 9/2014 | Amadio et al. |
| 2014/0287139 A1 | 9/2014 | Farmer et al. |
| 2014/0291886 A1 | 10/2014 | Mark et al. |
| 2014/0322383 A1 | 10/2014 | Rutter |
| 2014/0328963 A1 | 11/2014 | Mark et al. |
| 2014/0328964 A1 | 11/2014 | Mark et al. |
| 2014/0358273 A1 | 12/2014 | LaBossiere et al. |
| 2014/0361460 A1 | 12/2014 | Mark |
| 2015/0014885 A1 | 1/2015 | Hofmann et al. |
| 2015/0037446 A1 | 2/2015 | Douglass et al. |
| 2015/0165666 A1 | 6/2015 | Butcher et al. |
| 2015/0165690 A1 | 6/2015 | Tow |
| 2015/0165691 A1 | 6/2015 | Mark et al. |
| 2015/0183161 A1 | 7/2015 | Molinari et al. |
| 2015/0197063 A1 | 7/2015 | Shinar et al. |
| 2015/0201499 A1 | 7/2015 | Shinar et al. |
| 2015/0239178 A1 | 8/2015 | Armstrong |
| 2015/0242737 A1 | 8/2015 | Glazberg et al. |
| 2015/0266243 A1 | 9/2015 | Mark et al. |
| 2015/0266244 A1 | 9/2015 | Page |
| 2015/0287247 A1 | 10/2015 | Willis et al. |
| 2015/0290875 A1 | 10/2015 | Mark et al. |
| 2015/0298393 A1 | 10/2015 | Suarez |
| 2015/0321427 A1 | 11/2015 | Gunnarsson et al. |
| 2015/0342720 A1 | 12/2015 | Koc et al. |
| 2016/0067927 A1 | 3/2016 | Voris et al. |
| 2016/0068678 A1 | 3/2016 | Luo et al. |
| 2016/0075089 A1 | 3/2016 | Duro Royo et al. |
| 2016/0114432 A1 | 4/2016 | Ferrar et al. |
| 2016/0120040 A1 | 4/2016 | Elmieh et al. |
| 2016/0129634 A1 | 5/2016 | Keicher et al. |
| 2016/0179064 A1 | 6/2016 | Arthur et al. |
| 2016/0192741 A1 | 7/2016 | Mark |
| 2016/0221259 A1 | 8/2016 | Kobida et al. |
| 2016/0257033 A1 | 9/2016 | Jayanti et al. |
| 2016/0263832 A1 | 9/2016 | Bui et al. |
| 2016/0290880 A1 | 10/2016 | Lewis et al. |
| 2016/0303794 A1 | 10/2016 | Atwood et al. |
| 2016/0325491 A1 | 11/2016 | Sweeney et al. |
| 2016/0339633 A1 | 11/2016 | Stolyarov et al. |
| 2016/0346997 A1 | 12/2016 | Lewis et al. |
| 2016/0361873 A1 | 12/2016 | Maier |
| 2017/0021564 A1 | 1/2017 | Ooba et al. |
| 2017/0057164 A1 | 3/2017 | Hemphill et al. |
| 2017/0057170 A1 | 3/2017 | Gupta et al. |
| 2017/0080642 A1 | 3/2017 | Tyler |
| 2017/0087635 A1 | 3/2017 | Wilkes et al. |
| 2017/0106594 A1 | 4/2017 | Gardiner |
| 2017/0129170 A1 | 5/2017 | Kim et al. |
| 2017/0129171 A1 | 5/2017 | Gardner et al. |
| 2017/0136703 A1 | 5/2017 | Hayes et al. |
| 2017/0136707 A1 | 5/2017 | Batchelder et al. |
| 2017/0137955 A1 | 5/2017 | Hofmann et al. |
| 2017/0151713 A1 | 6/2017 | Steele |
| 2017/0173889 A1 | 6/2017 | Thomas-Lepore et al. |
| 2017/0255183 A1 | 9/2017 | Clement et al. |
| 2017/0259502 A1 | 9/2017 | Chapiro et al. |
| 2017/0361497 A1 | 12/2017 | Crescenti Savall et al. |
| 2018/0001585 A1 | 1/2018 | Farmer et al. |
| 2019/0022922 A1 | 1/2019 | Swanson et al. |
| 2019/0202119 A1 | 7/2019 | Budge |
| 2021/0362406 A1 | 11/2021 | Kim et al. |
| 2022/0063190 A1 | 3/2022 | De Backer et al. |

FOREIGN PATENT DOCUMENTS

| | | |
|---|---|---|
| CN | 101133107 A | 2/2008 |
| CN | 101193953 A | 6/2008 |
| CN | 101300299 A | 11/2008 |
| CN | 101484397 A | 7/2009 |
| CN | 101689229 A | 3/2010 |
| CN | 101801647 A | 8/2010 |
| CN | 101815746 A | 8/2010 |
| CN | 102548737 A | 7/2012 |
| CN | 104149339 A | 11/2014 |
| CN | 107443739 A | 12/2017 |
| DE | 4102257 A1 | 7/1992 |
| EP | 2762520 A1 | 8/2014 |
| EP | 2976205 A2 | 1/2016 |

(56) References Cited

FOREIGN PATENT DOCUMENTS

| | | |
|---|---|---|
| EP | 3063340 A1 | 9/2016 |
| EP | 3725497 A1 | 10/2020 |
| JP | S58-122116 A | 7/1983 |
| JP | 1-266231 A | 10/1989 |
| JP | H7-117141 A | 5/1995 |
| JP | H11207828 A | 8/1999 |
| JP | 2003-534159 A | 11/2003 |
| JP | 2003533367 A | 11/2003 |
| JP | 2004-331706 A | 11/2004 |
| JP | 2010535117 A | 11/2010 |
| JP | 2012-97449 A | 5/2012 |
| KR | 20100004475 A | 1/2010 |
| KR | 100995983 B1 | 11/2010 |
| KR | 101172859 B1 | 8/2012 |
| WO | 0189714 A1 | 11/2001 |
| WO | 2004050323 A1 | 6/2004 |
| WO | 2009009137 A1 | 1/2009 |
| WO | 2013017284 A2 | 2/2013 |
| WO | 2014028826 A1 | 2/2014 |
| WO | 2014153535 A2 | 9/2014 |
| WO | 2014193505 A1 | 12/2014 |
| WO | 2015042422 A1 | 3/2015 |
| WO | 2015061855 A1 | 5/2015 |
| WO | 2015077262 A1 | 5/2015 |
| WO | 2015120429 A1 | 8/2015 |
| WO | 2016011252 A1 | 1/2016 |

OTHER PUBLICATIONS

"Printed strain gauges for aircraft load detection using Aerosol Jet printing", Fraunhofer, 39 pages (Year: 2011).

"Sandwich-structured Composite", wikipedia.com, Dec. 29, 2009 version, accessed Apr. 18, 2018 at https://en.wikipedia.org/w/index.php?title=Sandwich-structured_composite&oldid=334666649 (Year: 2009).

"Thermal Conductivity of Metals", The Engineering Toolbox, http://www.engineeringtoolbox.com/thermal-conductivity-metalsd_858.html, Sep. 15, 2017, 6 pages.

Ahn et al., Anisoptropic material properties of fused deposition modeling ABS, Rapid Prorotyping vol. 8, No. 4, 2002, pp. 248-257.

ATI technical data sheet, ATI metals, Allegheny Technologies Incorporated, https://www.atimetals.com/Products/Documents/ <http://www.atimetals.com/Products/Documents/ datasheets/stainless-specialty-steel/martensitic/ati_410_420_425_mod_440a_440c_tds_en2_v2.pdf (Year: 2014).

August et al., Recent Developments in Automated Fiber Placement of Thermoplastic Composites, SAMPE Technical Conference Proceedings, Wichita, KS, Oct. 23, 2013.

Australian Examination Report No. 1 corresponding to Australian Application No. 2018247333 dated Jul. 1, 2019.

Bales, Steven, "Know Your Mold Coatings", Plastics Technology, http://www.ptonlinecom/articles/know-your-mold-coatings, Dec. 1, 2004, 8 pages.

Brett Compton, "3D printing of composites with controlled architecture," Engineering Conferences International, ECI Digital Archives, Composites at Lake Louise (CALL 2015), Fall Nov. 9, 2015, pp. 30.

Compton, B. G. et al., "3D-Printing of Lightweight Cellular Composites," Advanced Materials 2014, vol. 26, pp. 5930-5935.

Dell'Anno et al., Automated Manufacture of 3D Reinforced Aerospace Composite Structures, International Journal of Structural Integrity, 2012, vol. 3, Iss 1, pp. 22-40.

Devlieg et al., High-Speed Fiber Placement on Large Complex Structures, No. 2007-01-3843. SAE International 2007.

Donghong, Ding et al: "A tool-path generation strategy for wire and arc additive manufacturing," The International Journal of Advanced Manufacturing Technology, vol. 73, No. 1-4, Apr. 11, 2014 (Apr. 11, 2014), pp. 173-183, XP055472255, London, ISSN: 0268-3768, DOI: 10.1007/s00170-014-5808-5.

Extended European Search Report from corresponding European Application No. 14768852.7 dated Feb. 23, 2017.

Extended European Search Report from corresponding European Application No. 20169435.3 dated Sep. 18, 2020.

Geek magazine—hacker daily blog "To Skolkovo created the Russia's first composite 3D-printer", Feb. 24, 2015, Retreived from the internet: <http://geek-mag.com/posts/246332/>.

Gray IV, R.W., Baird, D.G. and Bøhn, J.H., 1998. Thermoplastic composites reinforced with long fiber thermotropic liquid crystalline polymers for fused deposition modeling. Polymer composites, 19(4), pp. 383-394. (Year: 1998).

Gray, R.W. IV et al., 1997, Effects ofProcessing Conditions on Prototypes Reinforced with TLCPs for Fused Deposition Modeling, In 1997 International Solid Freeform Fabrication Symposium (Year: 1998).

Hasenjaeger, Programming and Simulating Automated Fiber Placement (AFP) CNC Machines, SAMPE Journal, vol. 49, No. 6, Nov./Dec. 2013.

Hossain et al., Improving Tensile Mechanical Properties of FDM-Manufactured Specimens via Modifying Build Parameters, Proceedings of Solid Freeform Fabrication Symposium, Austin, Texas, Aug. 16, 2013.

Https://community.ultimaker.com/topic/3248-some-questions-on-perimeters-100-infill-extrusion-width/ (Year: 2013).

International Search Report for PCT/US2014/031493 dated Oct. 1, 2014.

Lamontia et al., "Contoured Tape Laying and Fiber Placement Heads for Automated Fiber Placement of Large Composite Aerospace Structures," 34th ISTC, Baltimore, Md, Nov. 4-7, 2002.

Lantern Robotics (https://www.fabbaloo.com/blog/2014/4/18/how-to-make-any-3d-printed-part-much-stronger and see https:// imgur.com/a/EHxkE & https://www.reddit.com/r/3Dprinting/comments/22jwlm/injecting_hot_melt_adhesive_for_100_solid_faster/ (Year: 2014).

Liu et al., "Wear of Materials", 2003, p. 1345.

Mondo et al., Overview of Thermoplastic Composite ATL and AFP Technologies, ITHEC 2012, Oct. 30, 2012, Messe Bremen, Germany.

Rower, Robot Driven Automatic Tapehead for Complex Composite Lay-ups, No. 10AMAF-0066, SAE International 2010, Aerospace Manufacturing and Automated Fastening Conference & Exhibition, Sep. 28, 2010.

Shofner, M.L. et al., 2003, Nanofiber-reinforced polymers prepared by fused deposition modeling, Journal of applied polymer science, 89(11), pp. 3081-3090 (Year: 2003).

Shofner, M.L. et al., 2003, Single wall nanotube and vapor grown carbon fiber reinforced polymers processed by extrusion freeform fabrication. Composites Part A: Applied Science and Manufacturing, 34( 12), pp. 1207-1217 (Year: 2003).

Slocum, Alexander: "Kinematic Couplings: A Review of Design Principles and Applications", International Journal of Machine Tools and Manufacture 50.4 (2010): 310-327.

Supplementary Partial European Search Report from corresponding European Application No. 14768852 dated Nov. 22, 2016.

This 3D printer could allow ISS components to be created in space—YouTube. Published on May 20, 2016. Retreived from the internet: <URL:<https://www.youtube.com/watch?v=YwrTfOjEFtw>.

Zieman et al., Anisotropic Mechanical Properties of ABS Parts Fabricated by Fused Deposition Modelling, INTECH Open Access Publisher, 2012.

Extended European Search Report from corresponding Euorpean Application No. 22153274.0 dated Apr. 29, 2022.

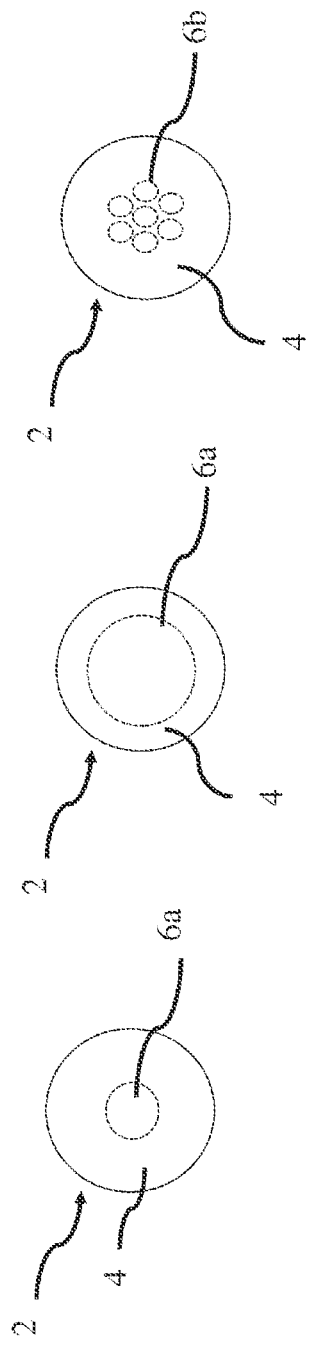
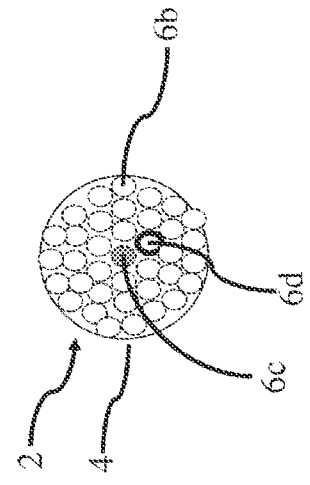
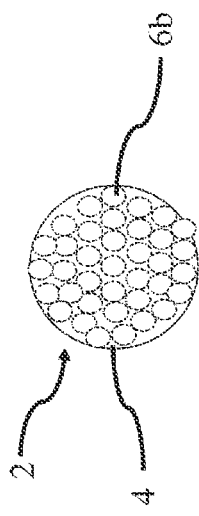
Fig. 3A  Fig. 3B  Fig. 3C  Fig. 3D  Fig. 3E

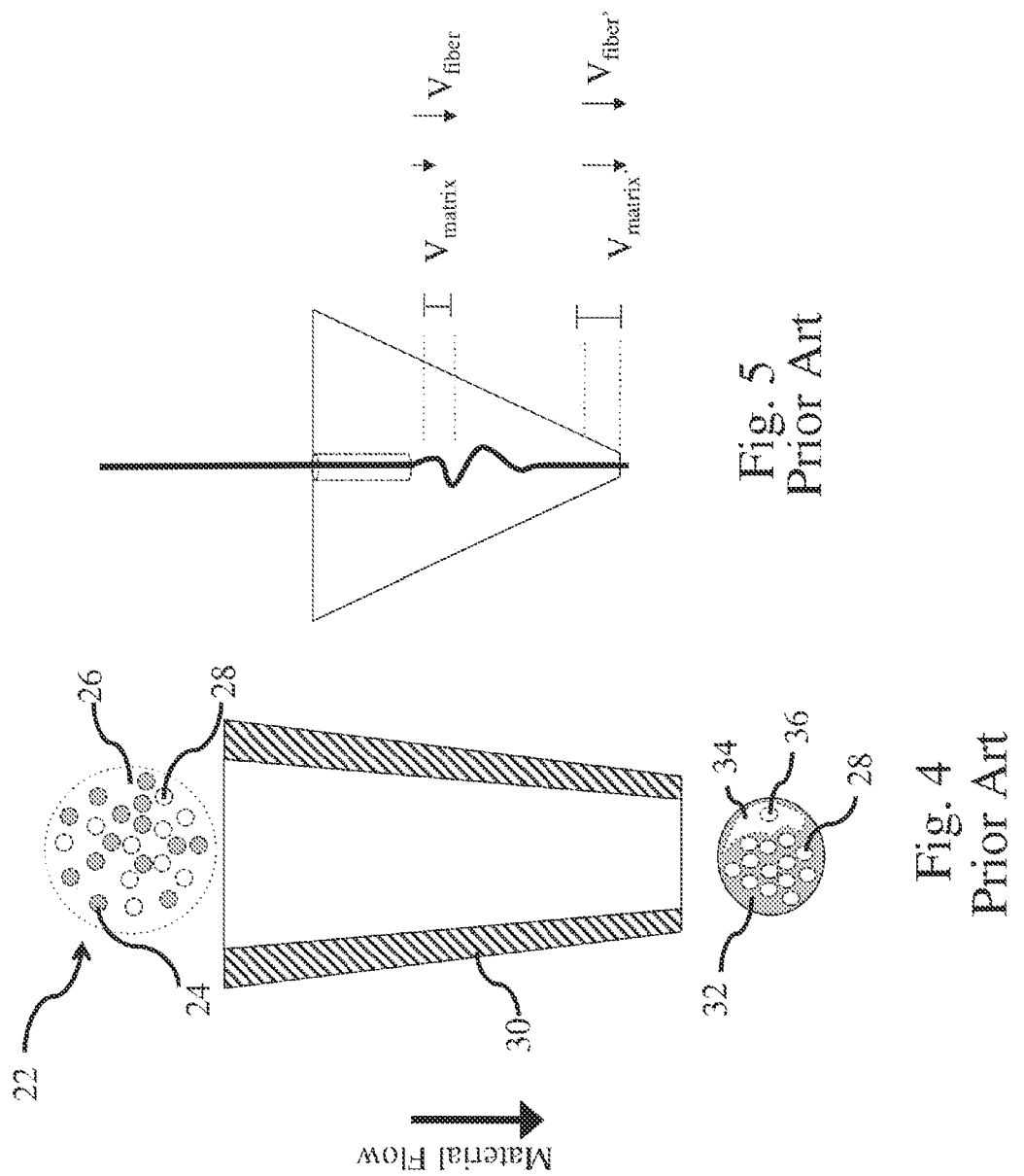

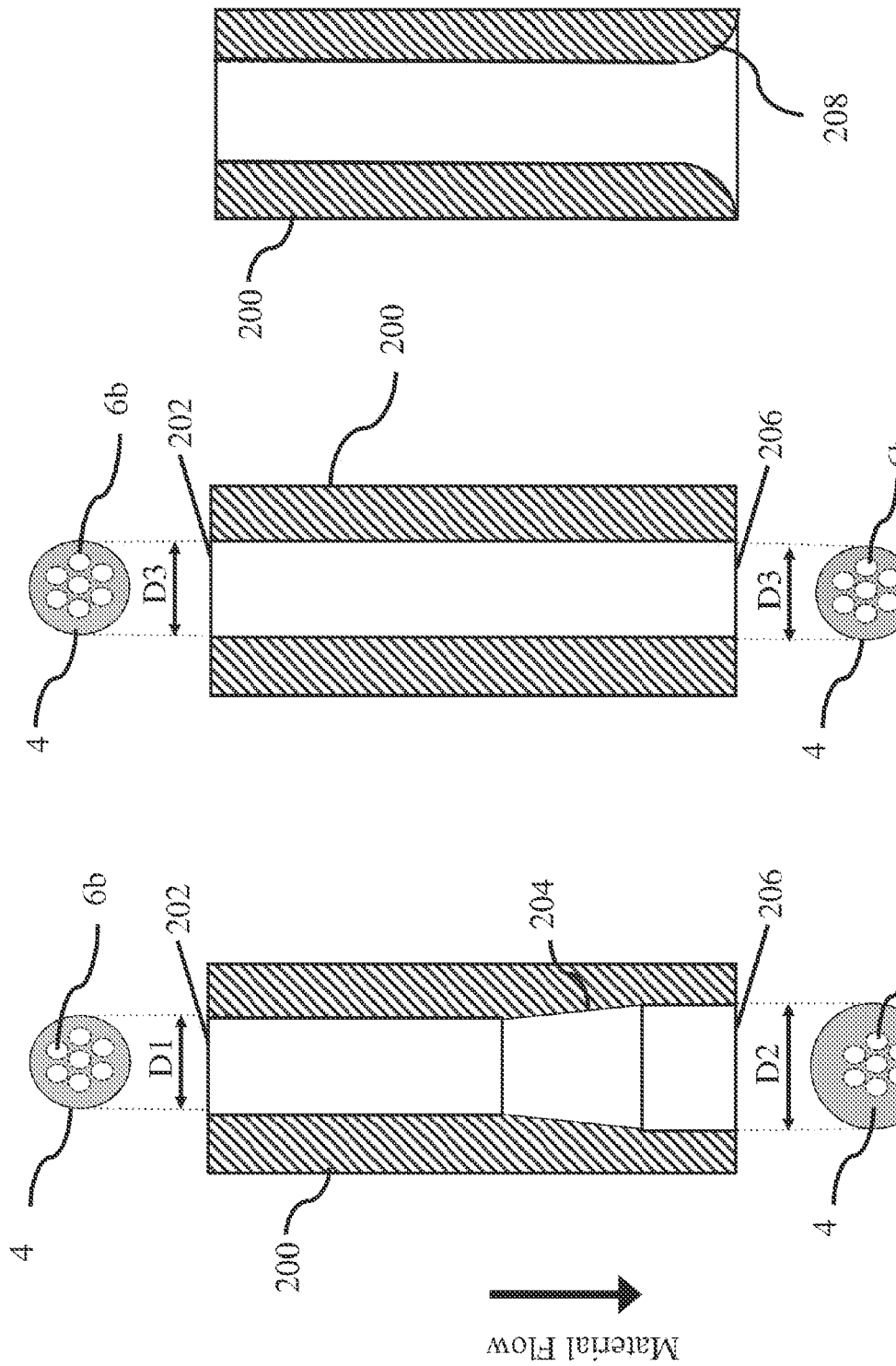

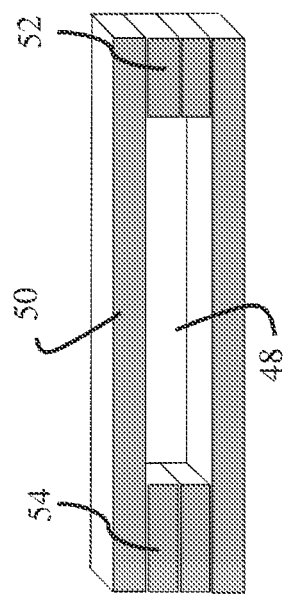
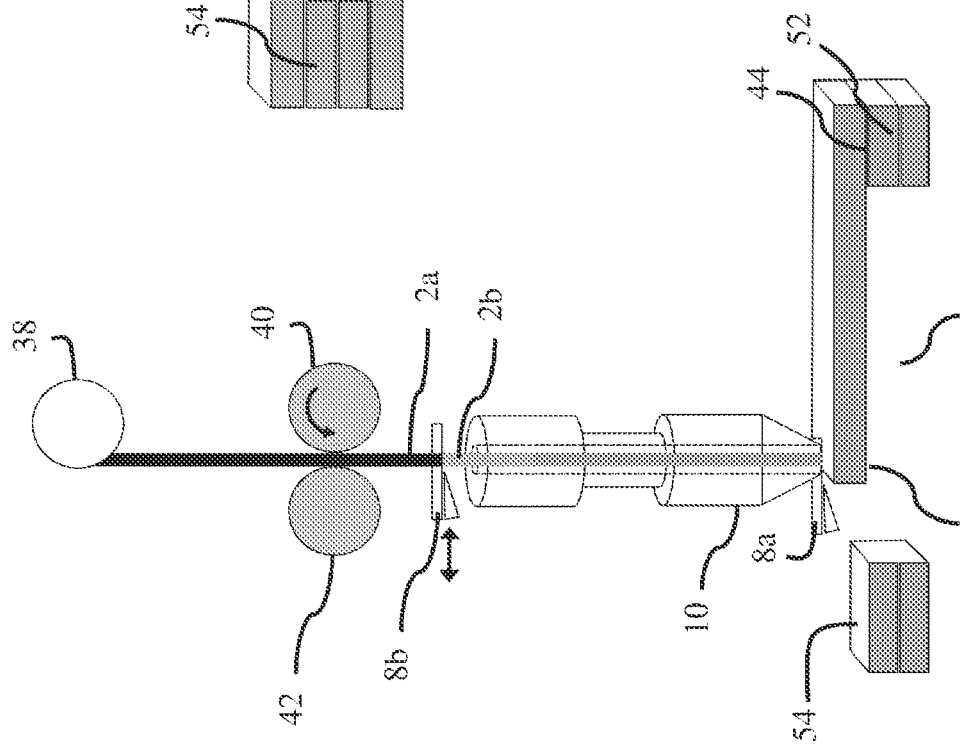
Fig. 8
Fig. 9

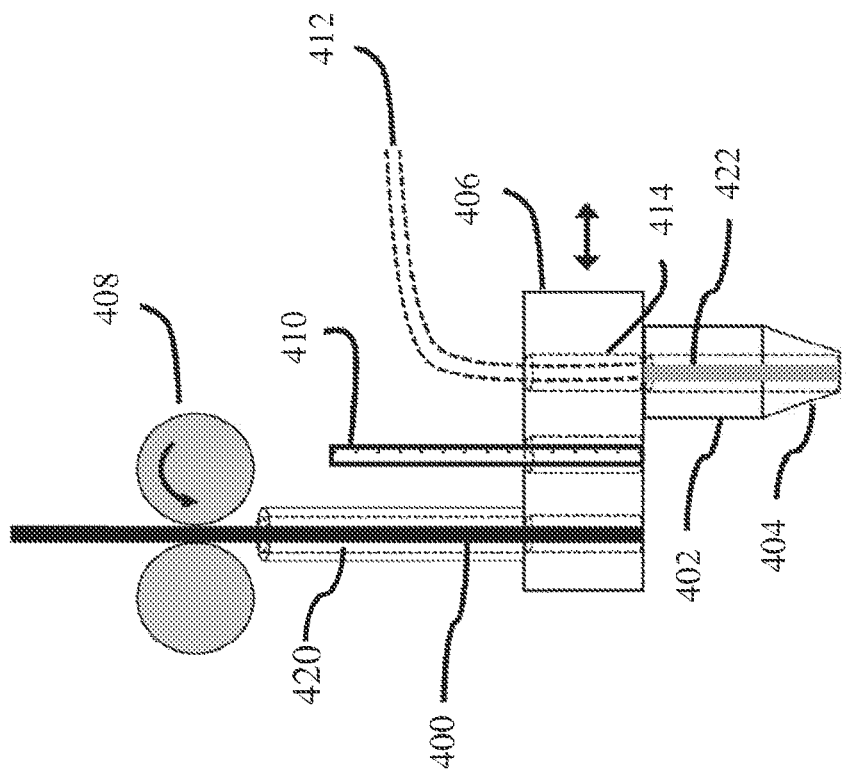
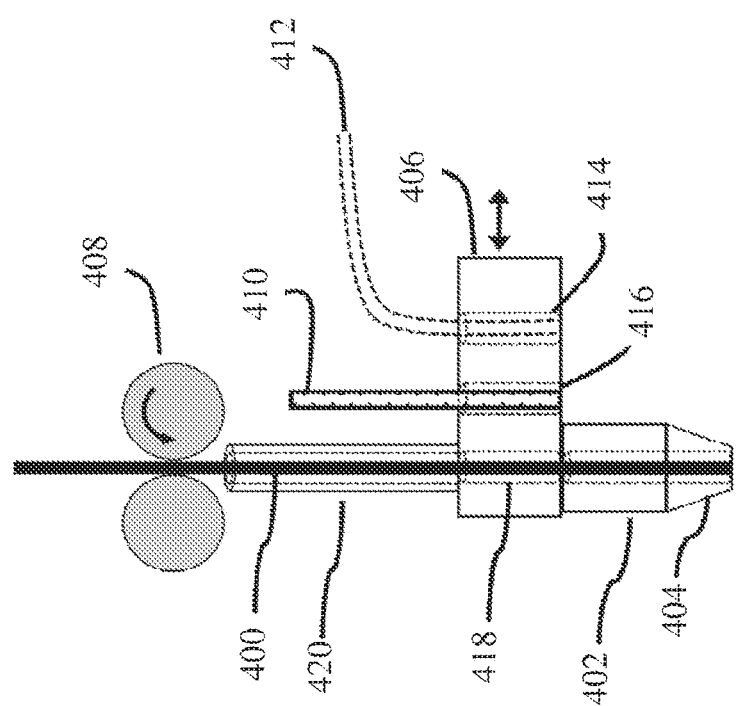
Fig. 12B
Fig. 12A

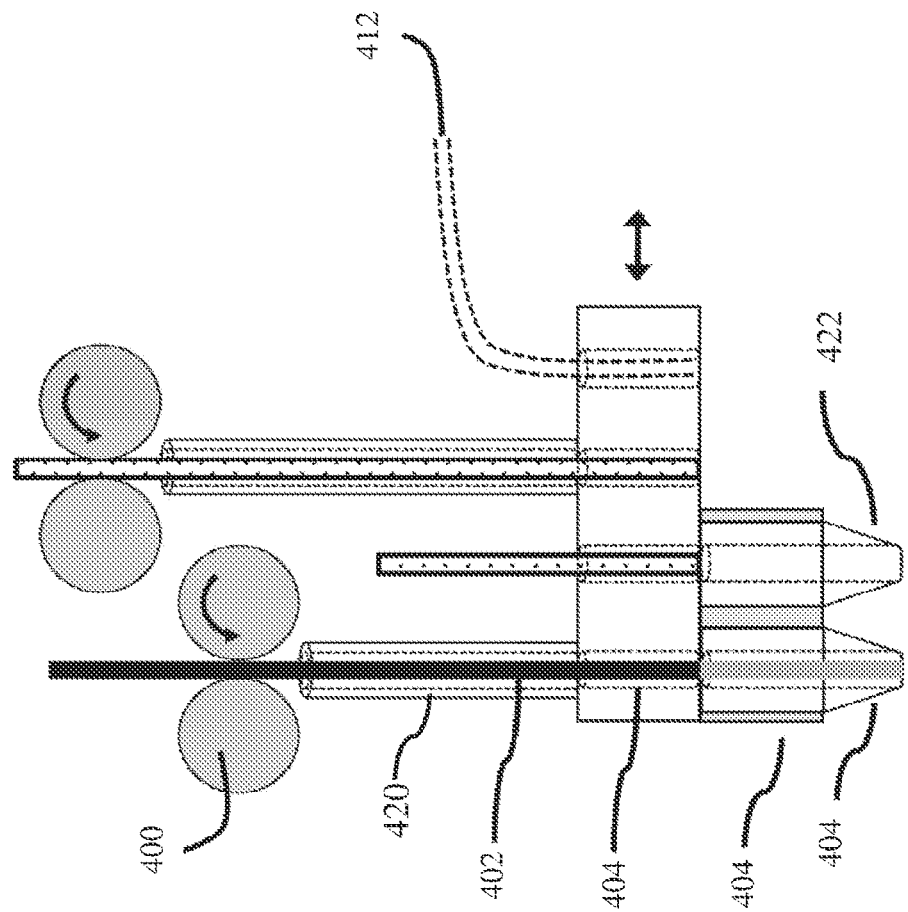

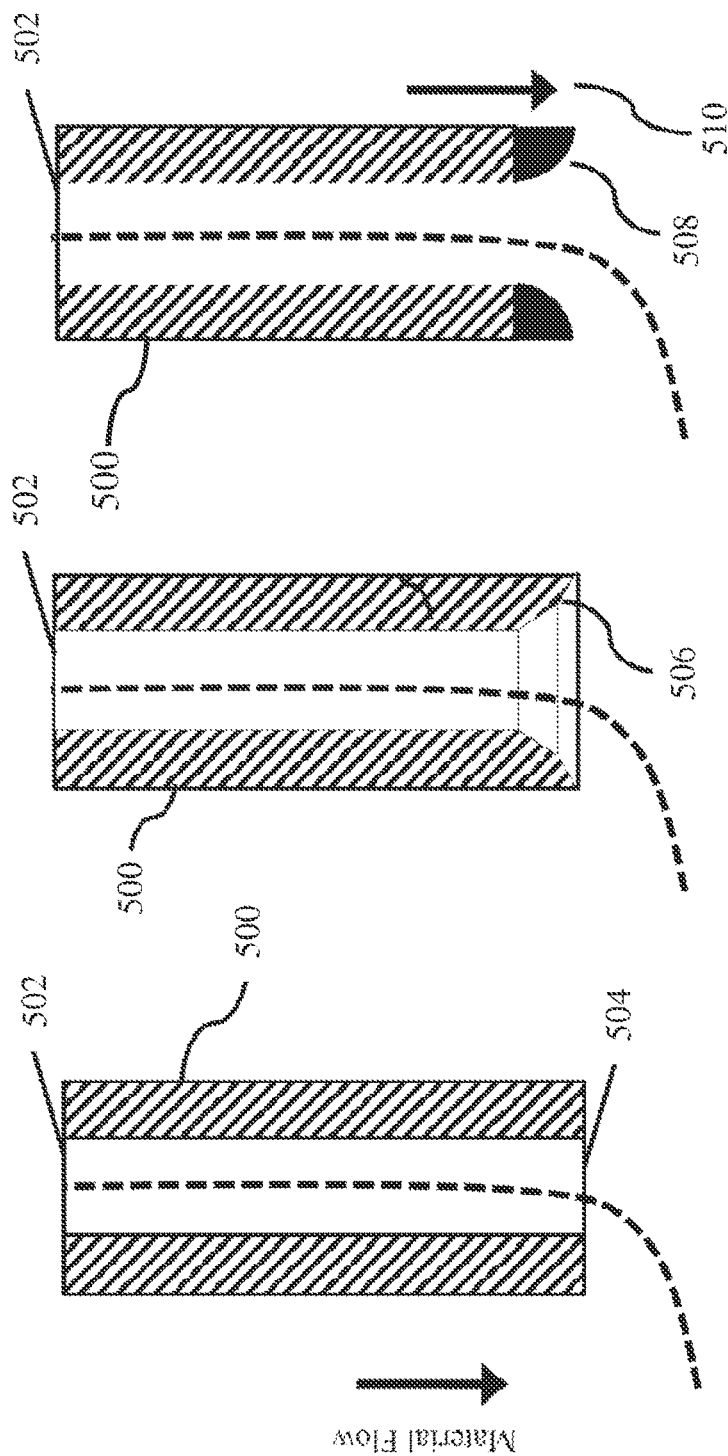

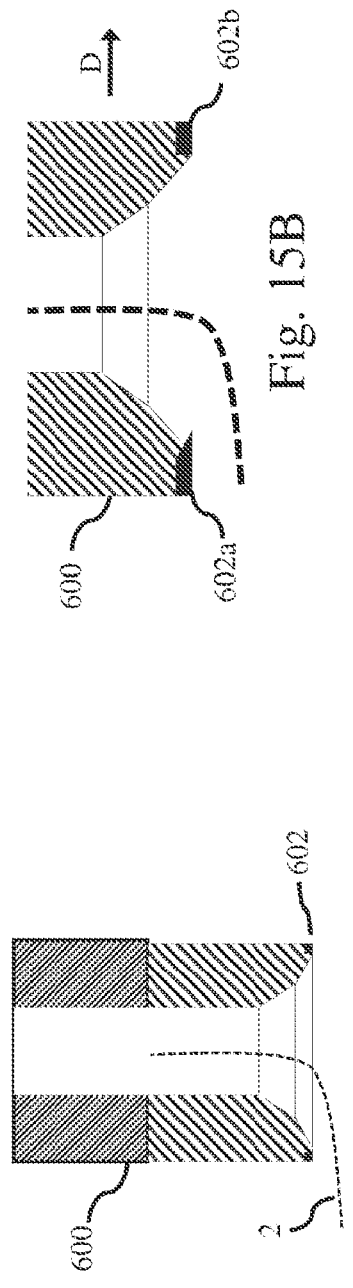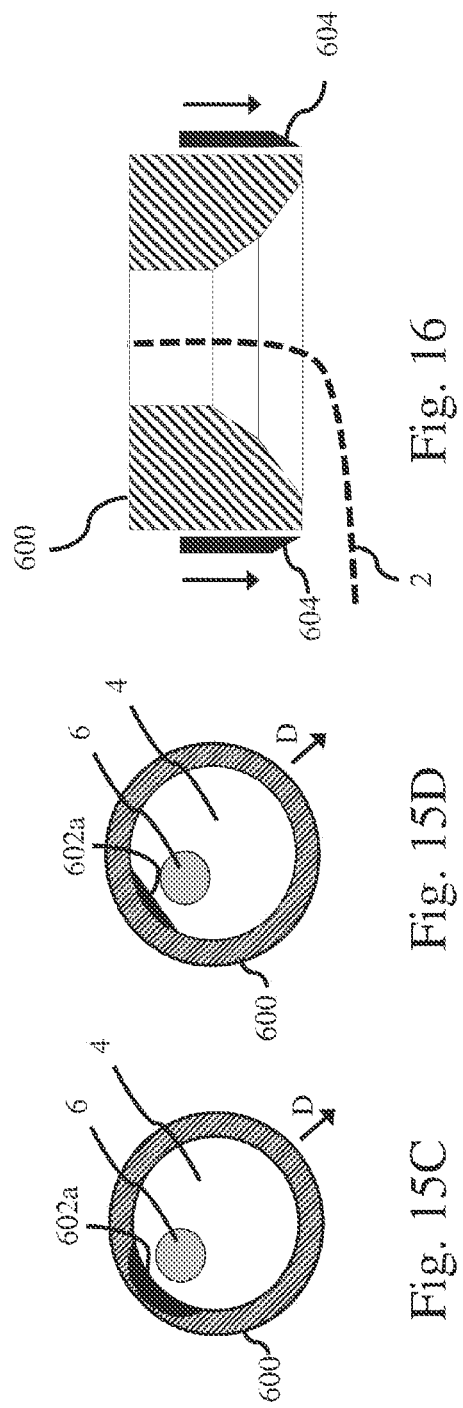

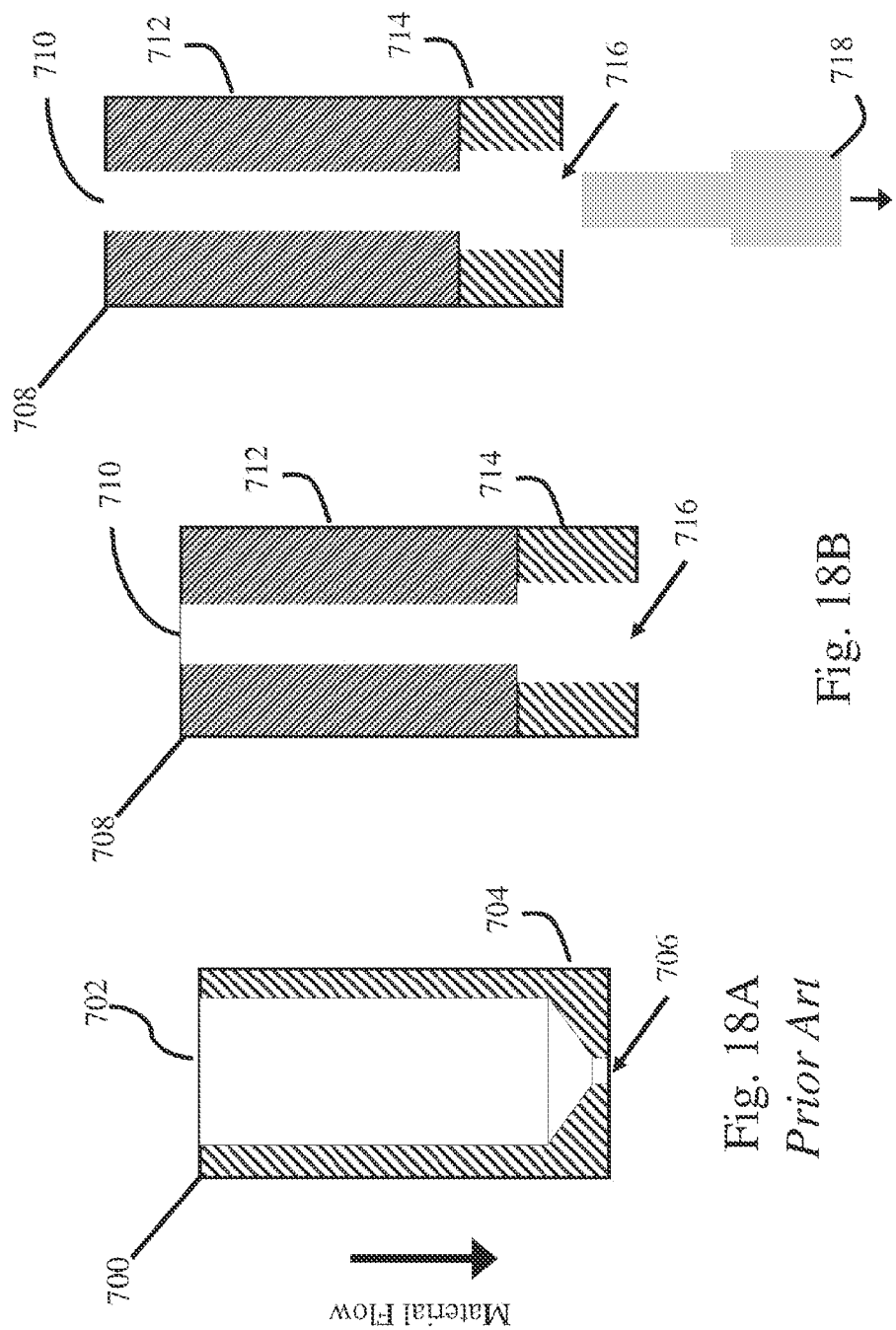

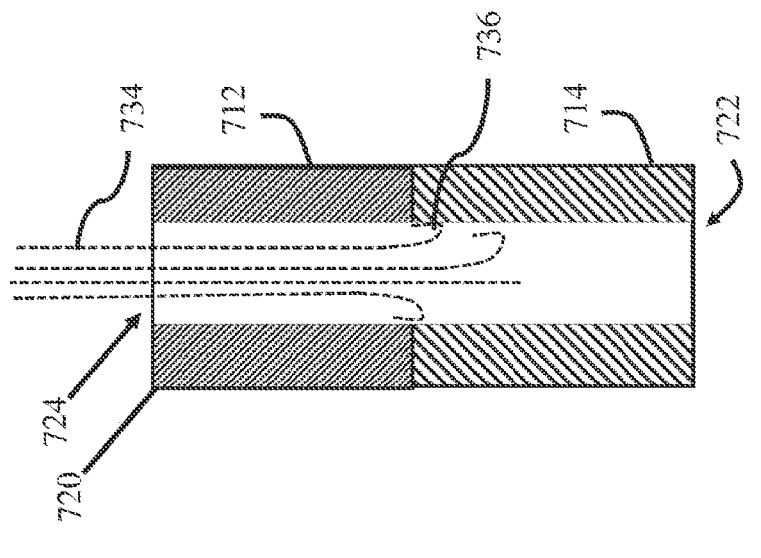
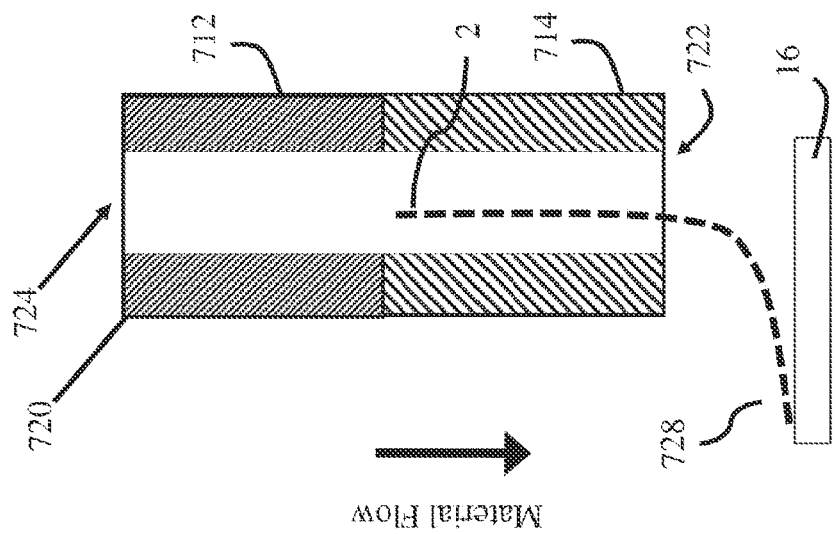
Fig. 19B
Fig. 19A

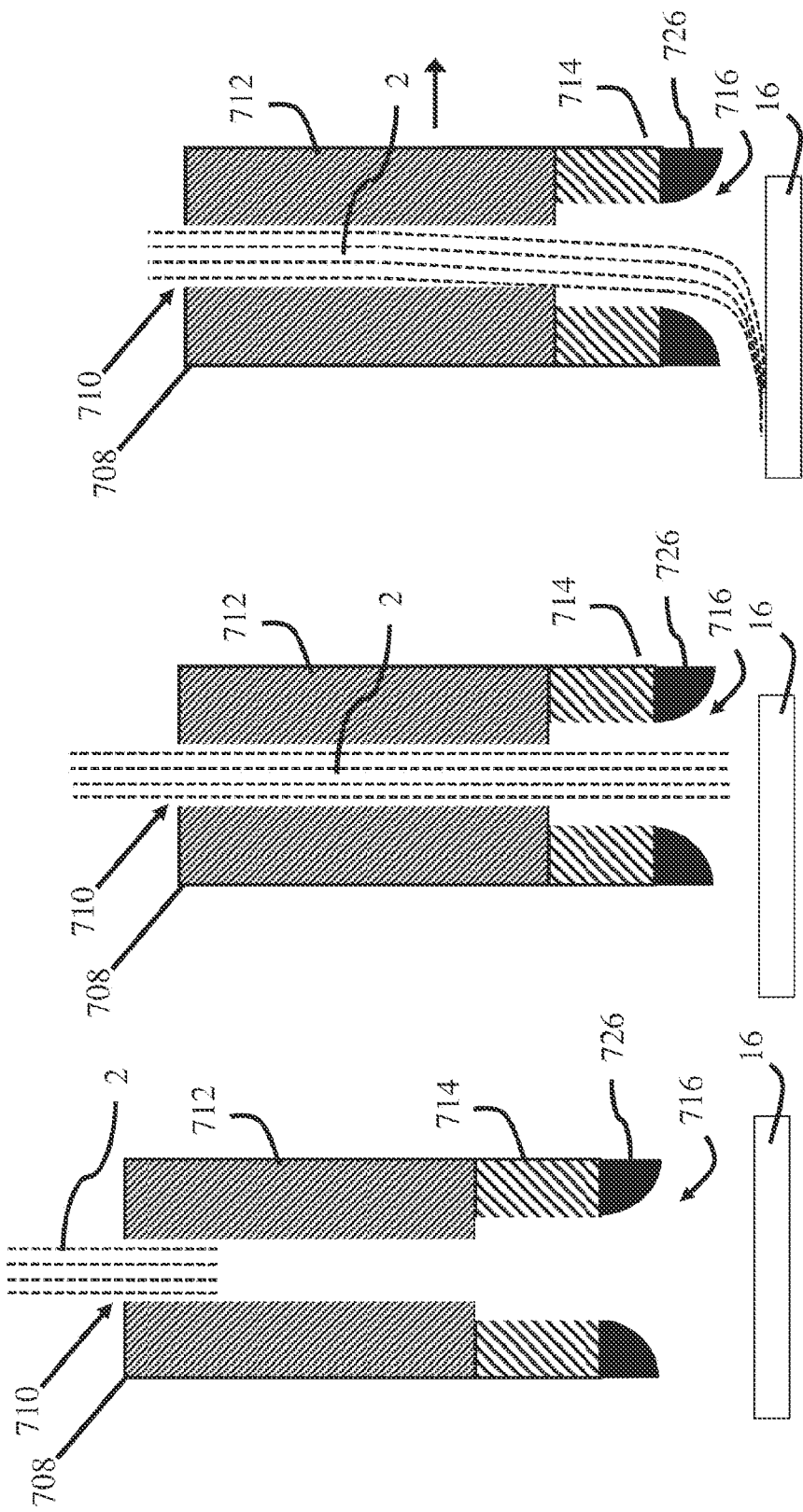

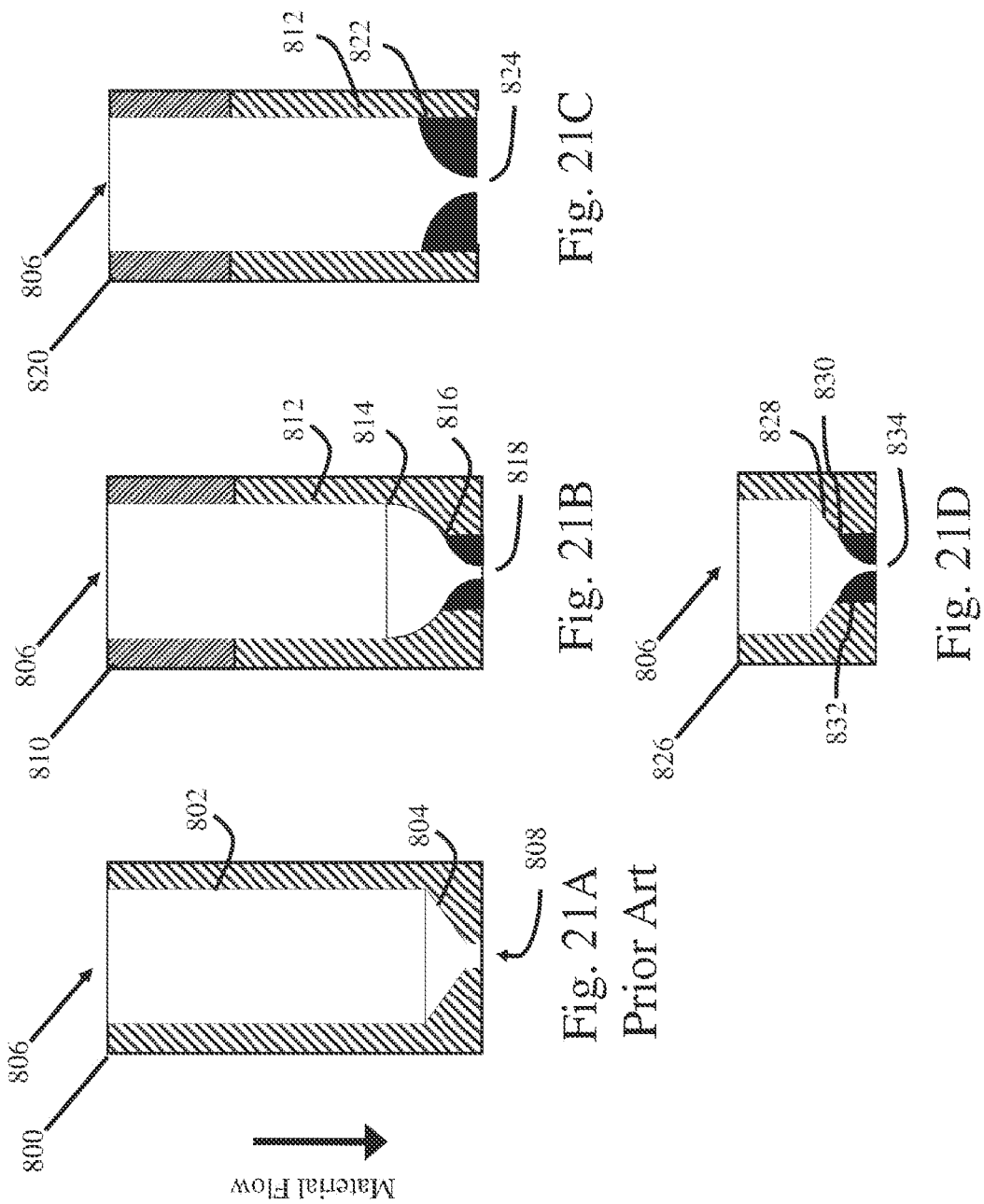

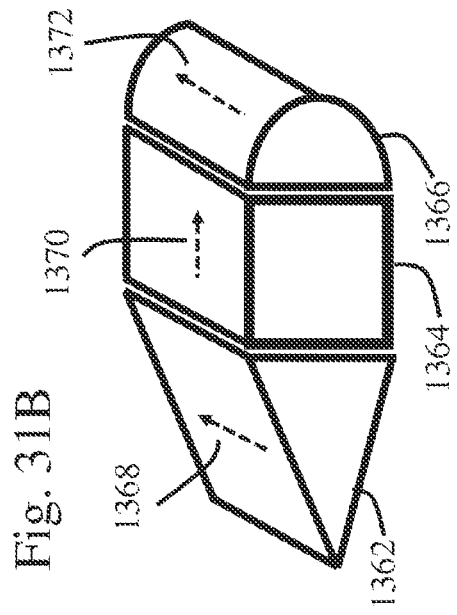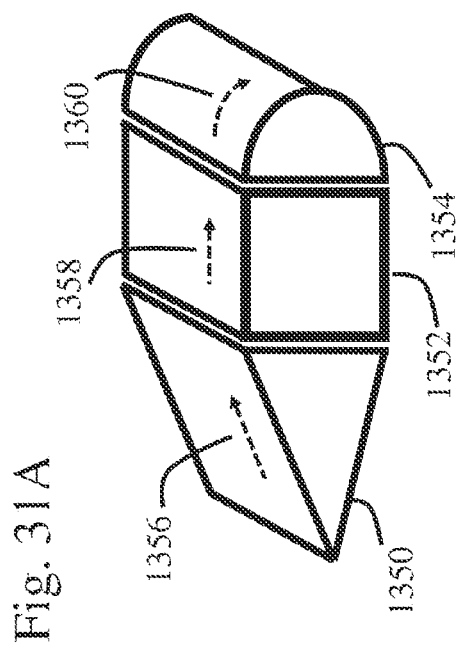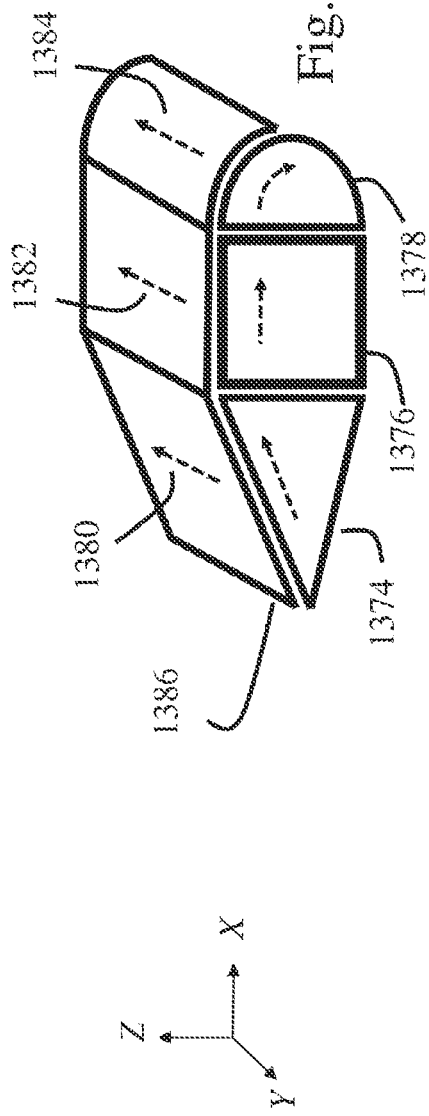

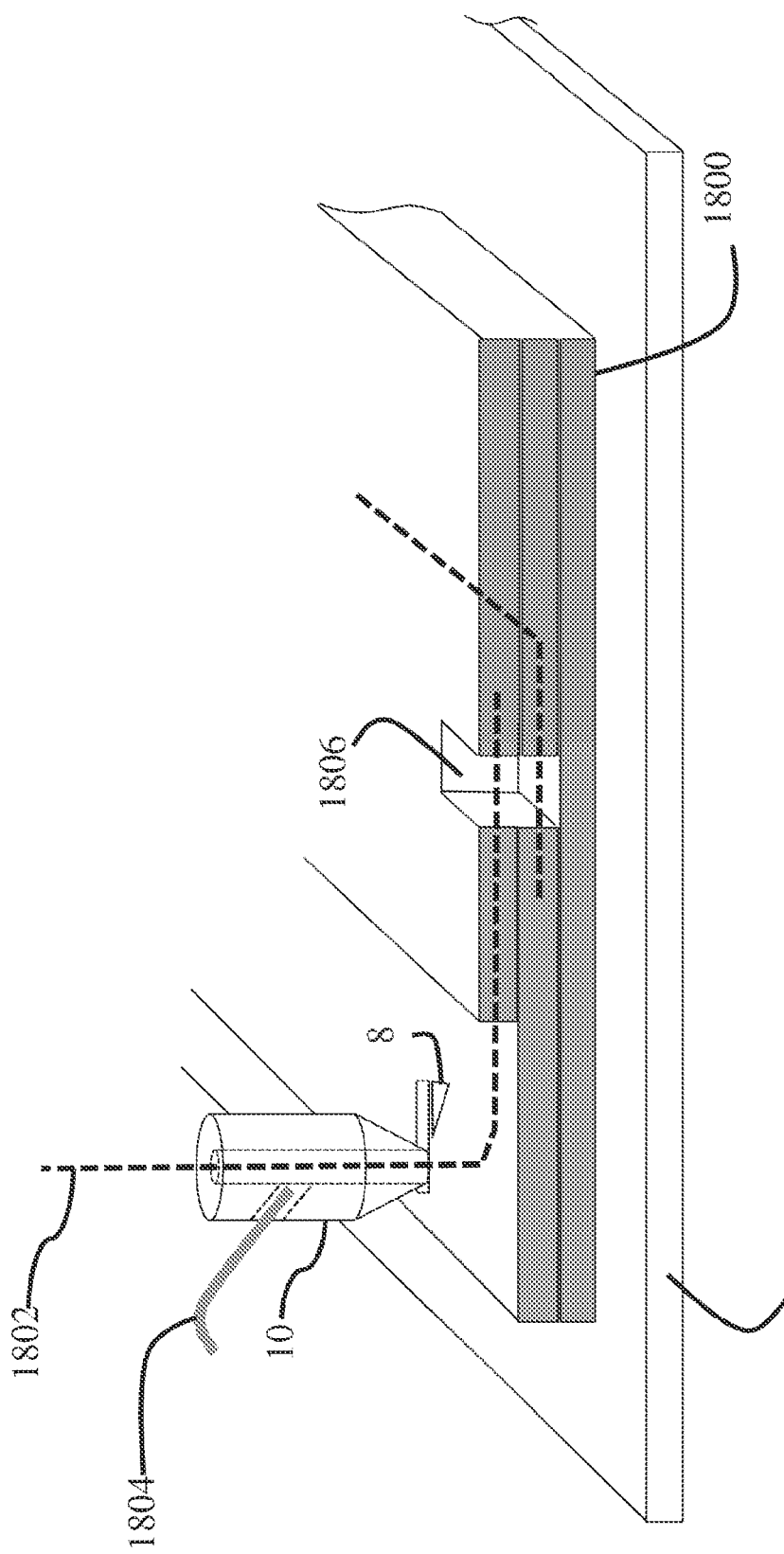

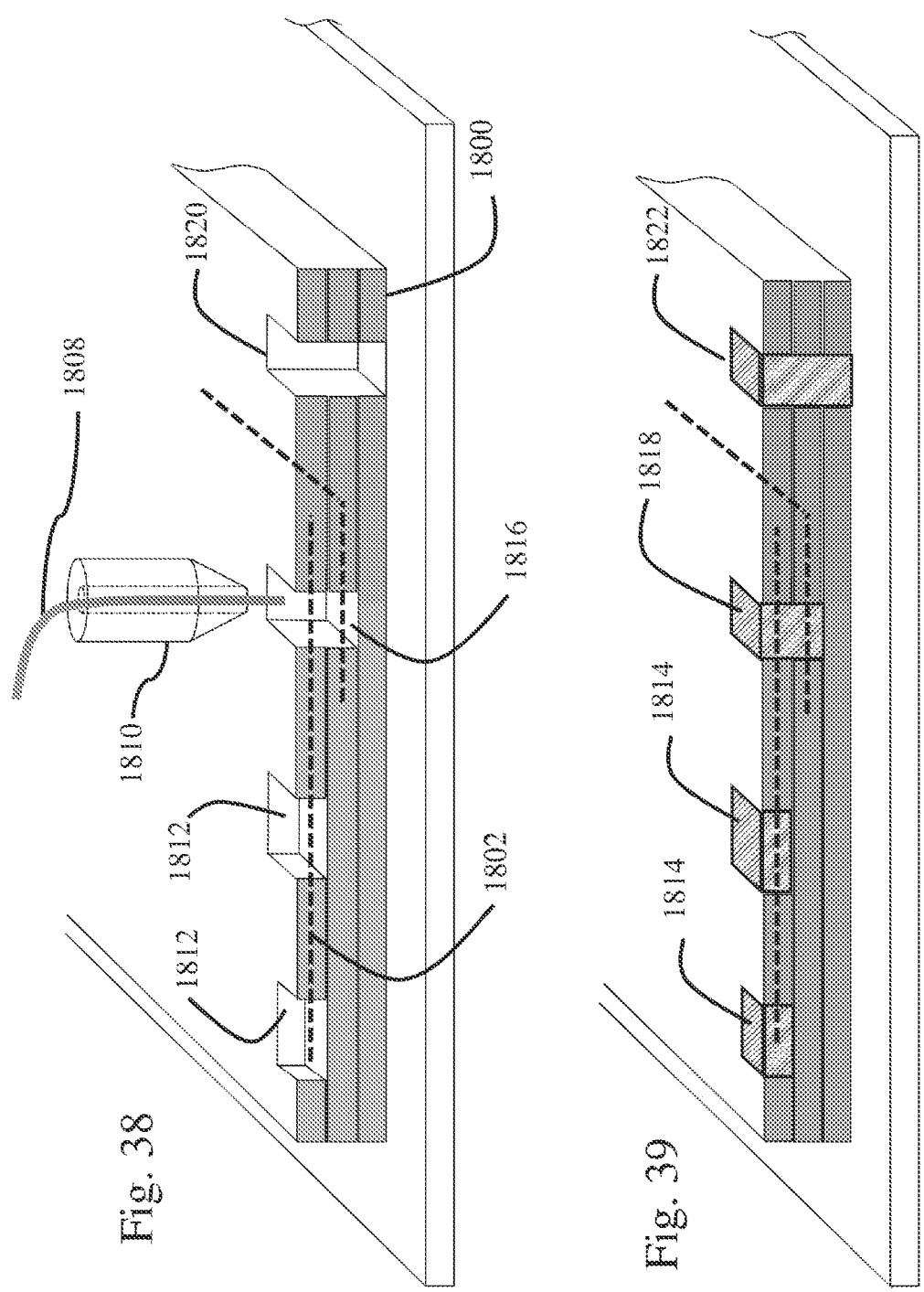

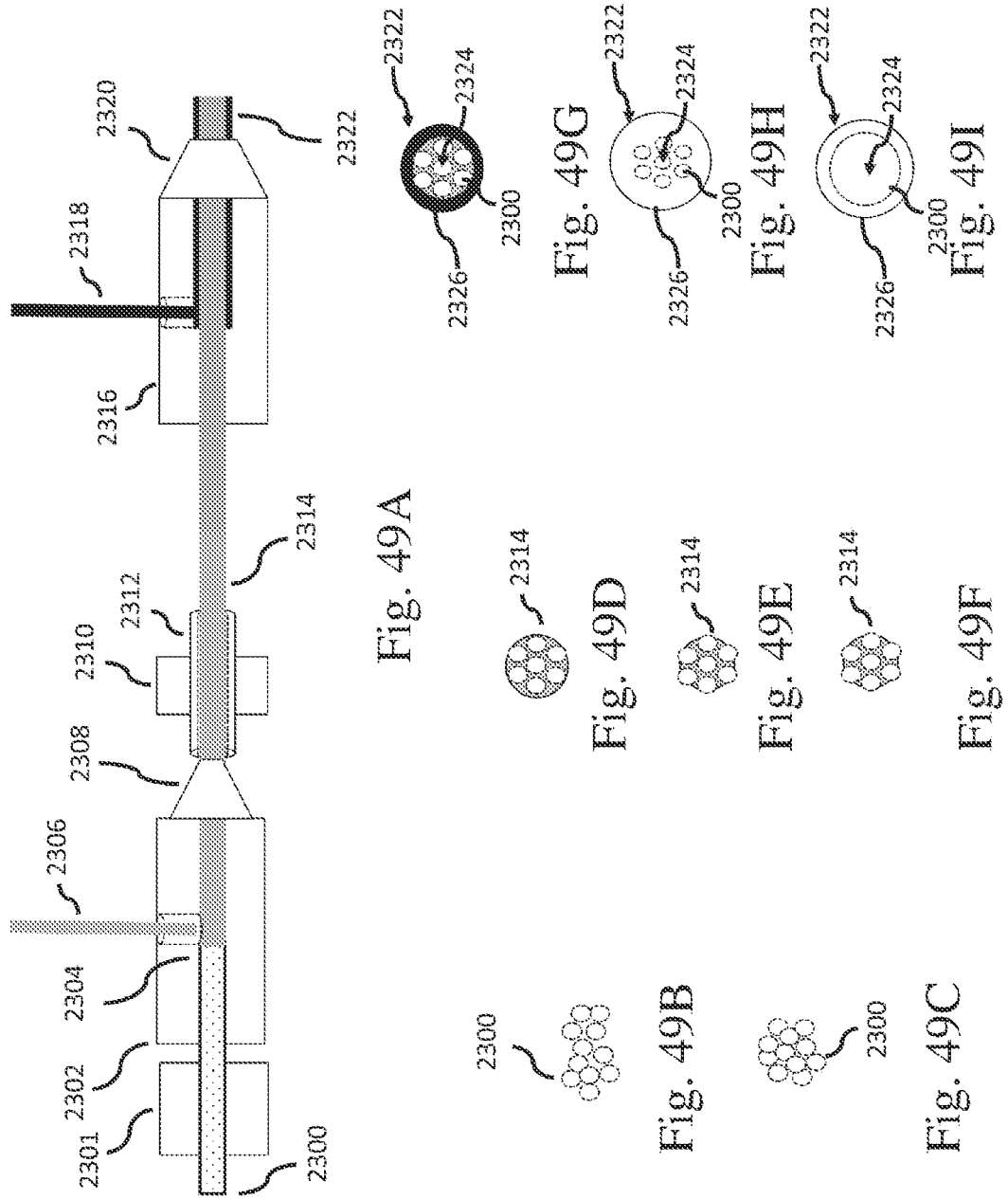

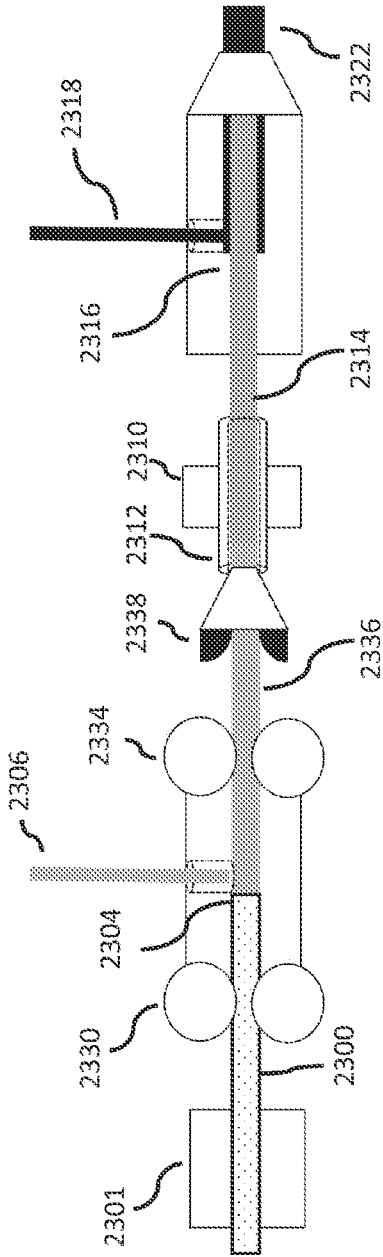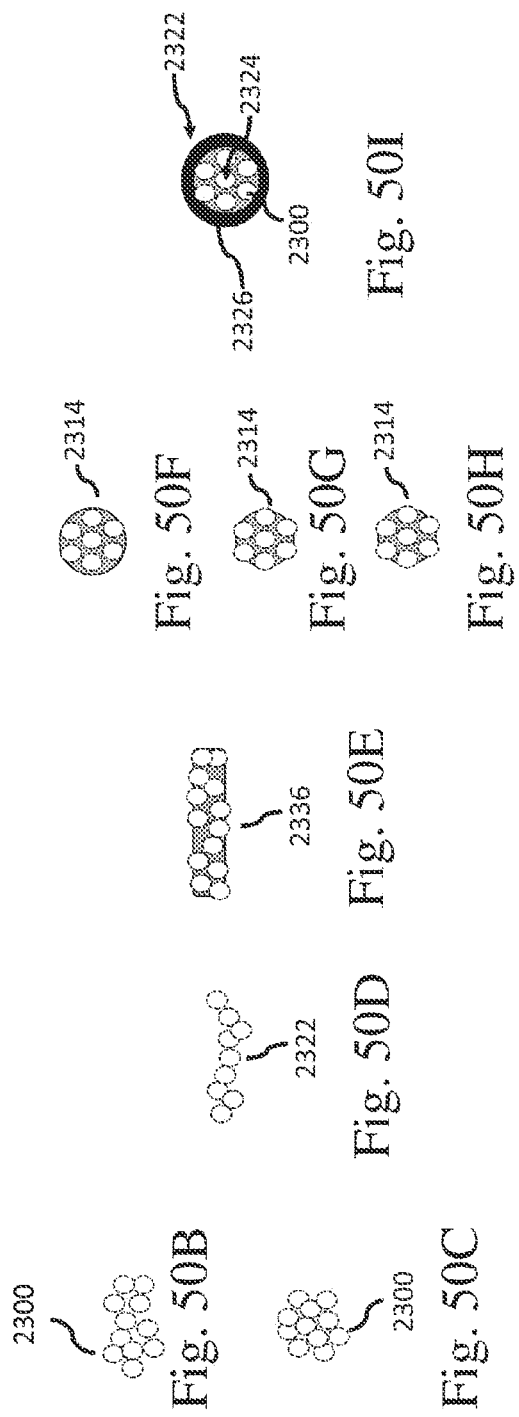

THREE DIMENSIONAL PRINTING

CROSS-REFERENCE TO RELATED APPLICATIONS

This application is a continuation of U.S. patent application Ser. No. 16/134,451, filed Sep. 18, 2018, which is a continuation of U.S. patent application Ser. No. 15/206,569, filed Jul. 11, 2016 [now U.S. Pat. No. 10,076,876], which is a continuation of U.S. patent application Ser. No. 15/179,223, filed Jun. 10, 2016, the disclosure of which is herein incorporated by reference in its entirety. The Ser. No. 15/179,223 application is a continuation of U.S. patent application Ser. No. 14/222,318, filed Mar. 21, 2014, the disclosure of which is herein incorporated by reference in its entirety. The Ser. No. 14/222,318 application claims the benefit under 35 U.S.C. § 119(e) of U.S. provisional application Ser. No. 61/804,235, filed Mar. 22, 2013, U.S. provisional application Ser. No. 61/815,531, filed Apr. 24, 2013, U.S. provisional application Ser. No. 61/831,600, filed Jun. 5, 2013, U.S. provisional application Ser. No. 61/847,113, filed Jul. 17, 2013, U.S. provisional application Ser. No. 61/878,029, filed Sep. 15, 2013, U.S. provisional application Ser. No. 61/880,129, filed Sep. 19, 2013, U.S. provisional application Ser. No. 61/881,946, filed Sep. 24, 2013, U.S. provisional application Ser. No. 61/883,440, filed Sep. 27, 2013, U.S. provisional application Ser. No. 61/902,256, filed Nov. 10, 2013, and U.S. provisional application Ser. No. 61/907,431, filed Nov. 22, 2013, the disclosures of which are incorporated by reference in their entirety.

FIELD

Aspects relate to three dimensional printing.

BACKGROUND

Since the initial development of three dimensional printing, also known as additive manufacturing, various types of three dimensional printing and printers for building a part layer by layer have been conceived. For example, Stereolithography (SLA) produces high-resolution parts. However, parts produced using SLA typically are not durable and are also often not UV-stable and instead are typically used for proof-of-concept work. In addition to SLA, Fused Filament Fabrication (FFF) three dimensional printers are also used to build parts by depositing successive filament beads of acrylonitrile butadiene styrene (ABS), or a similar polymer. In a somewhat similar technique, "towpregs" including continuous fiber reinforced materials including a resin are deposited in a "green state". Subsequently, the part is placed under vacuum and heated to remove entrapped air voids present in the deposited materials and fully cure the part. Another method of additive manufacturing, though not considered three-dimensional printing, includes preimpregnated (prepreg) composite construction where a part is made by cutting sheets of fabric impregnated with a resin binder into two-dimensional patterns. One or more of the individual sheets are then layered into a mold and heated to liquefy the binding resin and cure the final part. Yet another method of (non-three-dimensional printing) composite construction is filament winding which uses strands of composite (containing hundreds to thousands of individual carbon strands for example) that are wound around a custom mandrel to form a part. Filament winding is typically limited to concave shapes due to the filaments "bridging" any convex shape due to the fibers being under tension and the surrounding higher geometry supporting the fibers so that they do not fall into the underlying space.

SUMMARY

In one embodiment, a method for manufacturing a part includes: feeding a void free core reinforced filament into an extrusion nozzle, wherein the core reinforced filament comprises a core and a matrix material surrounding the core; heating the core reinforced filament to a temperature greater than a melting temperature of the matrix material and less than a melting temperature of the core; and extruding the core reinforced filament to form the part.

In another embodiment, a filament for use with a three dimensional printer includes a multifilament core and a matrix material surrounding the multifilament core. The matrix material is substantially impregnated into the entire cross-section of the multifilament core, and the filament is substantially void free.

In yet another embodiment, a method for manufacturing a part, the method includes: feeding a filament into a heated extrusion nozzle; and cutting the filament at a location at or upstream from an outlet of the heated nozzle.

In another embodiment, a three dimensional printer includes a heated extrusion nozzle including a nozzle outlet and a feeding mechanism constructed and arranged to feed a filament into the heated extrusion nozzle. The three dimensional printer also includes a cutting mechanism constructed and arranged to cut the filament at a location at, or upstream from, the heated nozzle outlet.

In yet another embodiment, a heated extrusion nozzle includes a nozzle inlet constructed and arranged to accept a filament and a nozzle outlet in fluid communication with the nozzle inlet. A cross-sectional area of the nozzle outlet transverse to a path of the filament is larger than a cross-sectional area of the nozzle inlet transverse to the path of the filament.

In another embodiment, a filament for use with a three dimensional printer includes a core including a plurality of separate segments extending in an axial direction of the filament and a matrix material surrounding the plurality of segments. The matrix material is substantially impregnated into the entire cross-section of the core, and the filament is substantially voidfree.

In yet another embodiment, a method includes: positioning a filament at a location upstream of a nozzle outlet where a temperature of the nozzle is below the melting temperature of the filament; and displacing the filament out of the nozzle outlet during a printing process.

In another embodiment, a method includes: feeding a filament from a first channel sized and arranged to support the filament to a cavity in fluid communication a nozzle outlet, wherein a cross-sectional area of the cavity transverse to a path of the filament is larger than a cross-sectional area of the first channel transverse to the path of the filament.

In yet another embodiment, a method for forming a filament includes: mixing one or more fibers with a first matrix material to form a core reinforced filament; and passing the filament through a circuitous path to impregnate the first matrix material into the one or more fibers.

In another embodiment, a method includes: coextruding a core reinforced filament and a coating matrix material to form an outer coating on the core reinforced filament with the coating material.

In yet another embodiment, a method for manufacturing a part includes: feeding a filament into a heated extrusion nozzle; extruding the filament from a nozzle outlet; and applying a compressive force to the extruded filament with the nozzle.

In another embodiment, a method for manufacturing a part includes: depositing a first filament into a layer of matrix material in a first desired pattern using a printer head; and curing at least a portion of the matrix layer to form a layer of a part including the deposited first filament.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 3A is a schematic representation of a continuous core reinforced filament including a solid continuous core and surrounding thermoplastic resin with a smaller proportion of solid continuous core:

FIG. 3B is a schematic representation of a continuous core reinforced filament including a solid continuous core surrounded by thermoplastic resin with a larger proportion of solid continuous core:

FIG. 3C is a schematic representation of a continuous core reinforced filament including a multifilament continuous core surrounded by thermoplastic resin with a smaller proportion of the multifilament continuous core;

FIG. 3D is a schematic representation of a continuous core reinforced filament including a multifilament continuous core surrounded by thermoplastic resin with a large proportion of the multifilament continuous core;

FIG. 3E is a schematic representation of a continuous core reinforced filament including a multifilament continuous core including elements with electrical, optical, or fluidic properties;

FIG. 4 is a schematic representation of a prior art nozzle and a towpreg including voids;

FIG. 5 is a schematic representation of fiber bunching within a prior art nozzle;

FIG. 6A is a schematic representation of a divergent nozzle utilized in some embodiments of the printing system;

FIG. 6B is a schematic representation of a straight nozzle utilized in some embodiments of the printing system;

FIG. 6C is a schematic representation of a rounded tip nozzle utilized in some embodiments of the printing system:

FIG. 8 is a schematic representation of a three dimensional printing system including a cutting mechanism and a printing process bridging an open space;

FIG. 9 is a schematic representation of a part formed by the three-dimensional printing system and/or process that includes an enclosed open space;

FIG. 12A is a schematic representation of a shear cutting head with optional indexing positions:

FIG. 12B is a schematic representation of the shear cutting head of FIG. 11A in a second indexing position:

FIG. 13 is a schematic representation of a multi-nozzle print head including shear cutting:

FIG. 14A is a schematic representation of a nozzle;

FIG. 14B is a schematic representation of a nozzle having a rounded outlet;

FIG. 14C is a schematic representation of another nozzle having a rounded outlet:

FIG. 15A is a schematic cross-sectional view of a cutting mechanism integrated with a nozzle tip;

FIG. 15B is a schematic cross-sectional view of the cutting mechanism integrated with a nozzle tip depicted in FIG. 14A rotated 90°;

FIG. 15C is a bottom view of one embodiment of a cutting mechanism integrated with a nozzle tip;

FIG. 15D is a bottom view of one embodiment of a cutting mechanism integrated with a nozzle tip;

FIG. 16 is a schematic cross-sectional view of a cutting mechanism integrated with a nozzle tip;

FIG. 18A is a schematic representation of a prior art nozzle:

FIG. 18B is a schematic representation of a divergent nozzle;

FIG. 18C is a schematic representation of the divergent nozzle of FIG. 18B shown in a feed forward cleaning cycle:

FIG. 19A is a schematic representation of a continuous core filament being printed with a straight nozzle;

FIG. 19B is a schematic representation of a green towpreg being printed with a straight nozzle;

FIGS. 19C-19E are schematic representations of a continuous core filament being stitched and printed with a divergent nozzle;

FIG. 21A is a schematic representation of a prior art nozzle;

FIGS. 21B-21D represent various embodiments of nozzle geometries;

FIG. 31A is a schematic representation of an airfoil formed with discrete subsections including fiber orientations in the same direction:

FIG. 31B is a schematic representation of an airfoil formed with discrete subsections including fiber orientations in different directions;

FIG. 31C is a schematic representation of an airfoil formed with discrete subsections and a shell formed thereon:

FIG. 37 is a schematic representation of a three dimensional printing system being used to form multiple layers in a printed circuit board;

FIG. 38 is a schematic representation of a three dimensional printing system being used to fill various voids in a printed circuit board with solder or solder paste;

FIG. 39 is a schematic representation of the print circuit board of FIG. 38 after the formation of vias and contact pads:

FIG. 49A is a schematic representation of a co-extrusion process to form a continuous core reinforced filament and an optional outer coating:

FIG. 49B is a schematic representation of a starting material used in the process depicted in FIG. 49A:

FIG. 49C is a schematic representation of a starting material used in the process depicted in FIG. 49A;

FIG. 49D is a schematic representation of one embodiment of a material after impregnation using the process depicted in FIG. 49A;

FIG. 49E is a schematic representation of one embodiment of a material after impregnation using the process depicted in FIG. 49A;

FIG. 49F is a schematic representation of one embodiment of a material after impregnation using the process depicted in FIG. 49A:

FIG. 49G is a schematic representation of one embodiment of a material including an optional outer coating using the process depicted in 49A:

FIG. 49H is a schematic representation of one embodiment of a material including an optional outer coating using the process depicted in 49A:

FIG. 49I is a schematic representation of one embodiment of a material including an optional outer coating using the process depicted in 49A:

FIG. 50A is a schematic representation of a co-extrusion process to form a continuous core reinforced filament and an optional outer coating;

FIG. 50B is a schematic representation of a starting material used in the process depicted in FIG. 50A:

FIG. 50C is a schematic representation of a starting material used in the process depicted in FIG. 49A;

FIG. 50D is a schematic representation of a starting material after being spread out using the process depicted in FIG. 50A:

FIG. 50E is a schematic representation of one embodiment of a material after impregnation using the process depicted in FIG. 50A;

FIG. 50F is a schematic representation of one embodiment of a material after shaping using the process depicted in FIG. 50A:

FIG. 50G is a schematic representation of one embodiment of a material after shaping using the process depicted in FIG. 50A:

FIG. 50H is a schematic representation of one embodiment of a material after shaping using the process depicted in FIG. 50A; and FIG. 50I is a schematic representation of one embodiment of a material including an optional outer coating using the process depicted in 50A.

DETAILED DESCRIPTION

Figure 1:
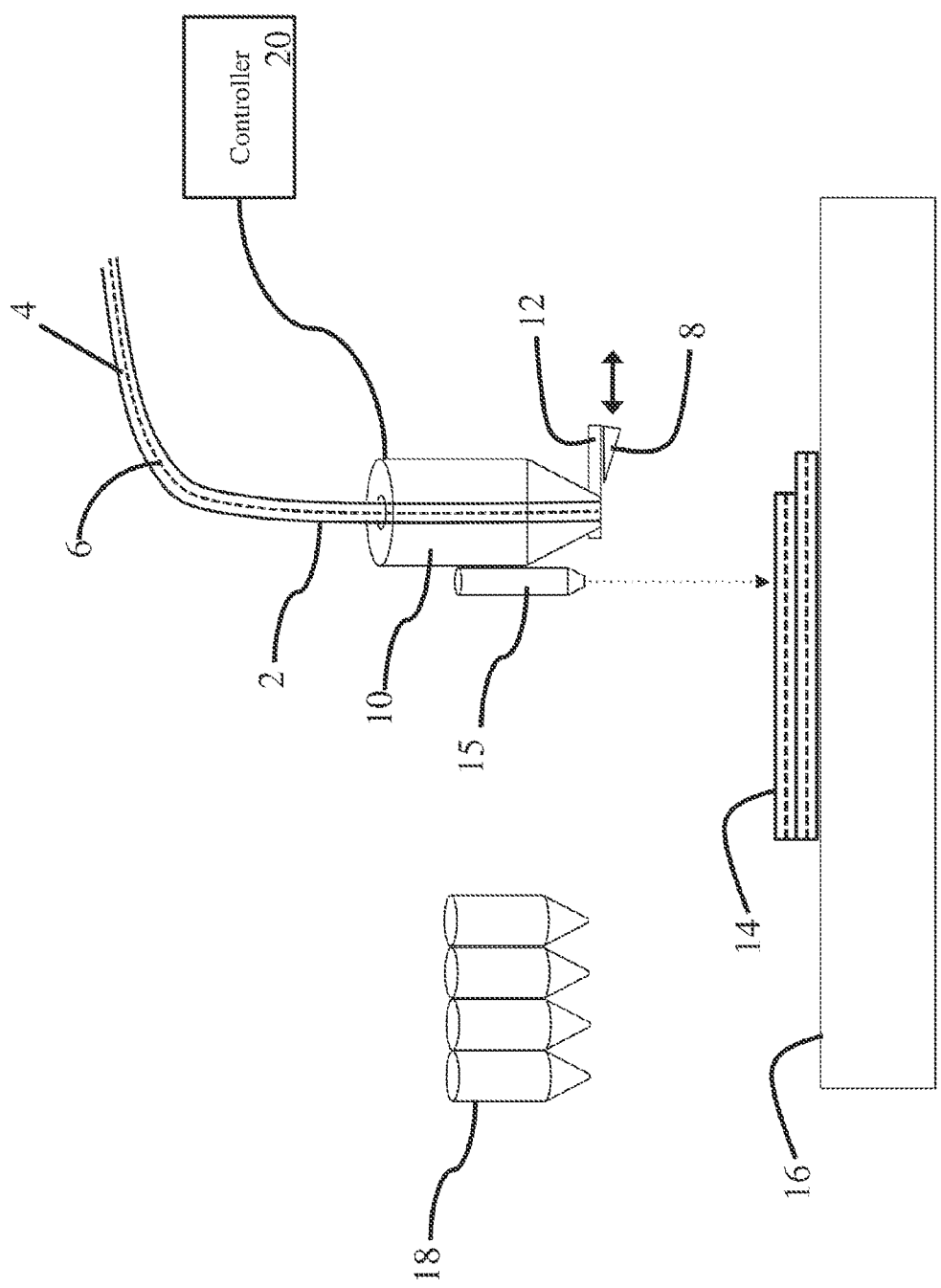
FIG. 1 is a schematic representation of a three dimensional printing system using a continuous core reinforced filament.

The inventors have recognized that one of the fundamental limitations associated with typical additive manufacturing methods is the strength and durability of the resulting part. For example, Fused Filament Fabrication results in a part exhibiting a lower strength than a comparable injection molded part. Without wishing to be bound by theory, this reduction in strength is due to weaker bonding between the adjoining strips of deposited material (as well as air pockets and voids) as compared to the continuous and substantially void free material formed, for example, during injection molding. The inventors have also recognized that the prepreg composite construction methods using a sheet-based approach to form a three dimensional part are both time consuming and difficult to handle resulting in higher expenses. Further, bending such sheets around curves, a circle for example, may cause the fibers to overlap, buckle, and/or distort resulting in undesirable soft spots in the resultant component. With regards to three dimensional printers using "towpregs" or "tows" including reinforcing fibers and a resin, the inventors have noted that the prior art deposited materials are often difficult to load in the machine, and further difficult to feed through the print head, due to their extremely flexible, and usually high-friction (sticky) initial state. Further, these green materials tend to entrap air and include air voids. Thus, without a subsequent vacuum and heating step, the resultant part also contains voids, and is substantially weaker than a traditional composite part constructed under a vacuum. Therefore, the additional steps associated with preparing a towpreg slow down the printing process and result in the entrapment of ambient air.

Due to the limitations associated with typical three dimensional printing systems noted above, the inventors have recognized a need to improve the strength of three dimensional printed composites. Further, there is a need for additive manufacturing construction techniques that allow for greater speed; removal or prevention of entrapped air in the deposited material: reduction of the need for subsequent vacuuming steps; and/or correct and accurate extrusion of the composite core material. The inventors have also recognized that it is desirable to provide the ability to deposit fibers in concave shapes, and/or construct discrete features on a surface or composite shell.

In view of the above, the inventors have recognized the benefits associated with providing a three dimensional printing system that prints structures using a substantially void-free preimpregnated (prepreg) material, or that is capable of forming a substantially void free material for use in the deposition process. For example, in one embodiment, a three dimensional printer uses a continuous core reinforced filament including a continuous multifilament core material with multiple continuous strands that are preimpregnated with a thermoplastic resin that has already been "wicked" into the strands, such a preimpregnated material is then used to form a three dimensional structure. Due to the thermoplastic resin having already wicked into the strands, the material is not "green" and is also rigid, low-friction, and substantially void free. In another embodiment, a solid continuous core is used and the thermoplastic resin wets the solid continuous core such that the resulting continuous core reinforced filament is also substantially void free. Additionally, embodiments in which a semi-continuous core is used in which a core extending through the length of a material is sectioned into a plurality of portions along the length is also contemplated. Such an embodiment may include either a solid core or multiple individual strands that are either evenly spaced from one another or include overlaps as the disclosure is not so limited. In either case, such a core material may also be preimpregnated or wetted as noted above. A substantially void free material may have a void percentage that is less than about 1%, 2%, 3%, 4%, 5%, 10%, 13%, or any other appropriate percentage. For example, the void free material may have a void percentage that is between about 1% and 5%. Additionally, due to the processing methods described below, parts printed using the above-noted void free material may also exhibit void percentages less than about 1%, 2%, 3%, 4%, 5%, 10%, or 13%.

While preimpregnated materials are discussed above, in one embodiment, a solid continuous core filament may be selectively combined with a resin in a nozzle outlet. Without wishing to be bound by theory, due to the regular and well-defined geometry of the solid core, the resin evenly coats the core and the resulting deposited composite material is substantially free from voids.

Within this application, core reinforced filaments are described as being either impregnated or wetted. For example, a solid core might be let with a matrix material, or a multifilament core may be both impregnated and fully wet with a matrix material. However, for the purposes of this application, a filament including a core that has been impregnated should be understood to refer to a filament including a core that has been fully impregnated and/or wet with matrix material. A person of ordinary skill would be able to understand how this might be interpreted for applications where a core material is a solid core.

In addition to the above, a core reinforced material as described throughout this application. For specific embodiments and examples, a continuous core and/or a semi-continuous core might be described for exemplary purposes. However, it should be understood that either a continuous and/or a semi-continuous core might be used in any particular application and the disclosure is not limited in this fashion. Additionally, with regards to a core reinforced material, the core may either be positioned within an interior of the filament or the core material may extend to an exterior surface of the filament as the disclosure is not limited in this fashion. Additionally, it should be understood that a court reinforced material also includes reinforcements provided by materials such as optical materials, fluid conducting materials, electrically conductive materials as well as any other appropriate material as the disclosure is not so limited.

In yet another embodiment, the inventors have recognized the benefits associated with providing a continuous or semi-continuous core combined with stereolithography (SLA), selective laser sintering (SLS), and other three dimensional printing processes using a matrix in liquid or powder form to form a substantially void free parts exhibiting enhanced strength. The above embodiments may help to reduce, or eliminate, the need for a subsequent vacuum step as well as improve the strength of the resulting printed structures by helping to reduce or eliminate the presence of voids within the final structure.

In addition to improvements in strength due to the elimination of voids, the inventors have recognized that the current limitation of laying down a single strip at a time in three dimensional printing processes may be used as an advantage in composite structure manufacturing. For example, the direction of reinforcing materials deposited during the printing process within a structure may be controlled within specific layers and portions of layers to control the directional strength of the composite structure both locally and overall. Consequently, the directionality of reinforcement within a structure can provide enhanced part strength in desired locations and directions to meet specific design requirements. The ability to easily tailor the directional strength of the structure in specific locations may enable both lighter and stronger resulting parts.

In embodiments, it may be desirable to include a cutting mechanism with the three dimensional printing system. Such a cutting mechanism may be used to provide selective termination in order to deposit a desired length of material. Otherwise, the printing process could not be easily terminated due to the deposited material still being connected to the material within the extrusion nozzle b, for example, a continuous core. The cutting mechanism may be located at the outlet of the associated printer nozzle or may be located upstream from the outlet. Further, in some embodiments, the cutting mechanism is located between a feeding mechanism for the core material and the outlet of the nozzle. However regardless of the specific configuration and location, the cutting mechanism enables the three dimensional printing system to quickly and easily deposit a desired length of material in a desired direction at a particular location. In contrast, systems which do not include a cutting mechanism continuously deposit material until the material runs out or it is manually cut. This limits both the complexity of the parts that can be produced, the speed of the printing process as well as the ability to deposit the material including the continuous core in a particular direction. Depending on the embodiment, the cutting mechanism may also interrupt the printer feed by blocking the nozzle or preventing the feeding mechanism from applying force or pressure to a portion of the material downstream from the cutting mechanism. While in some cases it may be desirable to include a cutting mechanism with the three dimensional printer, it should be understood that embodiments described herein may be used both with and without a cutting mechanism as the current disclosure is not limited in this fashion. Further, a cutting mechanism may also be used with embodiments that do not include a continuous core.

It should be understood that the substantially void free material described herein may be manufactured in any number of ways. However, in one embodiment, the material is formed by applying a varying pressure and/or forces in different directions during formation of the material. For example, in one embodiment, multiple strands of a polymer or resin and a core including a plurality of reinforcing fibers are co-mingled prior to feeding into a system. The system then heats the materials to a desired viscosity of the polymer resin and applies varying pressures and/or forces in alternating directions to the comingled towpreg to help facilitate fully impregnating the fibers of the towpreg with the polymer or resin. This may be accomplished using a smooth circuitous path including multiple bends through which a green towpreg is passed, or it may correspond to multiple offset rollers that change a direction of the towpreg as it is passed through the system. As the towpreg passes through this circuitous path, the varying forces and pressures help to fully impregnate the polymer into the core and form a substantially void free material. While a co-mingled towpreg including separate strands of reinforcing fibers and polymer resin are described above, embodiments in which a solid core and/or multiple reinforcing fibers are comingled with polymer particles, or dipped into a liquid polymer or resin, and then subjected to the above noted process are also contemplated. In addition to the above, after impregnating the core with the polymer, the substantially void free material may be fed through a shaping nozzle to provide a desired shape. The nozzle may be any appropriate shape including a circle, an oval, a square, or any other desired shape. While a continuous core is noted above, embodiments in which a semi-continuous core is used are also contemplated. Additionally, this formation process may either be performed under ambient conditions, or under a vacuum to further eliminate the presence of voids within the substantially void free material.

In some embodiments, it may be desirable to provide a smooth outer coating on a towpreg corresponding to the substantially void free material noted above. In such an embodiment, a substantially void free material, which is formed as noted above, or in any other appropriate process, is co-extruded with a polymer through an appropriately shaped nozzle. As the substantially void free material and polymer are extruded through the nozzle, the polymer forms a smooth outer coating around the substantially void free material.

The materials used with the currently described three dimensional printing processes may incorporate any appropriate combination of materials. For example appropriate resins and polymers include, but are not limited to, acrylonitrile butadiene styrene (ABS), epoxy, vinyl, nylon, polyetherimide (PEI), Polyether ether ketone (PEEK), Polylactic Acid (PLA), Liquid Crystal Polymer, and various other thermoplastics. The core may also be selected to provide any desired property. Appropriate core filaments include those materials which impart a desired property, such as structural, conductive (electrically and/or thermally), insulative (electrically and/or thermally), optical and/or fluidic transport. Such materials include, but are not limited to, carbon fibers, aramid fibers, fiberglass, metals (such as copper, silver, gold, tin, steel), optical fibers, and flexible tubes. It should be understood that the core filaments may be provided in any appropriate size. Further, multiple types of continuous cores may be used in a single continuous core reinforced filament to provide multiple functionalities such as both electrical and optical properties. It should also be understood that a single material may be used to provide multiple properties for the core reinforced filament. For example, a steel core might be used to provide both structural properties as well as electrical conductivity properties.

In some embodiments, in addition to selecting the materials of the core reinforced filament, it is desirable to provide the ability to use core reinforced filaments with different resin to reinforcing core ratios to provide different properties within different sections of the part. For example, a low-resin filler may be used for the internal construction of a part, to maximize the strength-to-weight ratio (20% resin by cross sectional area, for example). However, on the outer cosmetic surface of the part, a higher, 90% resin consumable may be used to prevent the possible print through of an underlying core or individual fiber strand of the core. Additionally, in some embodiments, the consumable material may have zero fiber content, and be exclusively resin. Therefore, it should be understood that any appropriate percentage of resin may be used.

The core reinforced filaments may also be provided in a variety of sizes. For example, a continuous or semi-continuous core reinforced filament may have an outer diameter that is greater than or equal to about 0.001 inches and less than or equal to about 0.4 inches. In one specific embodiment, the filament is greater than or equal to about 0.010 inches and less than or equal to about 0.030 inches. In some embodiments, it is also desirable that the core reinforced filament includes a substantially constant outer diameter along its length. Depending on the particular embodiment, different smoothnesses and tolerances with regards to the core reinforced filament outer diameter may be used. Without wishing to be bound by theory, a constant outer diameter may help to provide constant material flow rate and uniform properties in the final part.

As described in more detail below, the ability to selectively print electrically conductive, optically conductive, and/or fluidly conductive cores within a structure enables the construction of desired components in the structure. For example, electrically conductive and optically conductive continuous cores may be used to construct strain gauges, optical sensors, traces, antennas, wiring, and other appropriate components. Fluid conducting cores might also be used for forming components such as fluid channels and heat exchangers. The ability to form functional components on, or in, a structure offers multiple benefits. For example, the described three dimensional printing processes and apparatuses may be used to manufacture printed circuit boards integrally formed in a structure; integrally formed wiring and sensors in a car chassis or plane fuselage; as well as motor cores with integrally formed windings to name a few.

Turning now to the figures, specific embodiments of the disclosed materials and three dimensional printing processes are described.

FIG. 1 depicts an embodiment of a three dimensional printer using continuous strands of composite material to build a structure. In the depicted embodiment, the continuous strand of composite material is a continuous core reinforced filament 2. The continuous core reinforced filament 2 is a towpreg that is substantially void free and includes a polymer 4 that coats or impregnates an internal continuous core 6. Depending upon the particular embodiment, the core 6 may be a solid core or it may be a multifilament core including multiple strands.

The continuous core reinforced filament 2 is fed through a heated nozzle, such as extrusion nozzle 10. As the continuous core reinforced filament is fed through the extrusion nozzle it is heated to a preselected extrusion temperature. This temperature may be selected to effect any number of resulting properties including, but not limited to, viscosity of the extruded material, bonding of the extruded material to the underlying layers, and the resulting surface finish. While the extrusion temperature may be any appropriate temperature, in one embodiment, the extrusion temperature is greater than the melting temperature of the polymer 4, but is less than the decomposition temperature of the resin and the melting or decomposition temperature of the core 6. Any suitable heater may be employed to heat the nozzle, such as a band heater or coil heater.

After being heated in the heated extrusion nozzle 10, the continuous core reinforced filament 2 is extruded onto a build platen 16 to build successive layers 14 to form a final three dimensional structure. The position of the heated extrusion nozzle 10 relative to the build platen 16 during the deposition process may be controlled in any appropriate fashion. For example, the position and orientation of the build platen 16 or the position and orientation of the heated extrusion nozzle 10 may be controlled by a controller 20 to deposit the continuous core reinforced filament 2 in the desired location and direction as the current disclosure is not limited to any particular control method. Also, any appropriate movement mechanism may be used to control either the nozzle or the build platen including gantry systems, robotic arms, H frames, and other appropriate movement systems. The system may also include any appropriate position and displacement sensors to monitor the position and movement of the heated extrusion nozzle relative to the build platen and/or a part being constructed. These sensors may then communicate the sensed position and movement information to the controller 20. The controller 20 may use the sensed X, Y, and/or Z positions and movement information to control subsequent movements of the heated extrusion head or platen. For example, the system might include rangefinders, displacement transducers, distance integrators, accelerometers, and/or any other sensing systems capable of detecting a position or movement of the heated extrusion nozzle relative to the build platen. In one particular embodiment, and as depicted in the figure, a laser range finder 15, or other appropriate sensor, is used to scan the section ahead of the heated extrusion nozzle in order to correct the Z height of the nozzle, or fill volume required, to match a desired deposition profile. This measurement may also be used to fill in voids detected in the part. Additionally, the range finder 15, or another range finder could be used to measure the part after the material is extruded to confirm the depth and position of the deposited material.

Depending on the embodiment, the three dimensional printer includes a cutting mechanism 8. The cutting mechanism 8 advantageously permits the continuous core reinforced filament to be automatically cut during the printing process without the need for manual cutting or the formation of tails as described in more detail below. By cutting the continuous core reinforced filament during the deposition process, it is possible to form separate features and components on the structure as well as control the directionality of the deposited material in multiple sections and layers which results in multiple benefits as described in more detail below. In the depicted embodiment, the cutting mechanism 8 is a cutting blade associated with a backing plate 12 located at the nozzle outlet, though other locations are possible. While one embodiment of the cutting mechanism including a cutting blade is shown, other types of cutting mechanisms as described in more detail below are also possible, including, but not limited to, lasers, high-pressure air, high-pressure fluid, shearing mechanisms, or any other appropriate cutting mechanism. Further, the specific cutting mechanism may be appropriately selected for the specific feed material used in the three dimensional printer.

FIG. 1 also depicts a plurality of optional secondary print heads 18 that are employed with the three dimensional printer in some embodiments. A secondary print head 18 may be used to deposit inks, or other appropriate optional coatings, on the surface of a three dimensional printed part. In one embodiment, the secondary print head is similar to an existing inkjet printer. Such a print head may be used to print photo-quality pictures and images on the part during the manufacturing process. The print head might use UV resistant resins for such a printing process. Alternatively, the print head may be used to print protective coatings on the part. For example, the print head might be used to provide a UV resistant or a scratch resistant coating.

Figure 2:
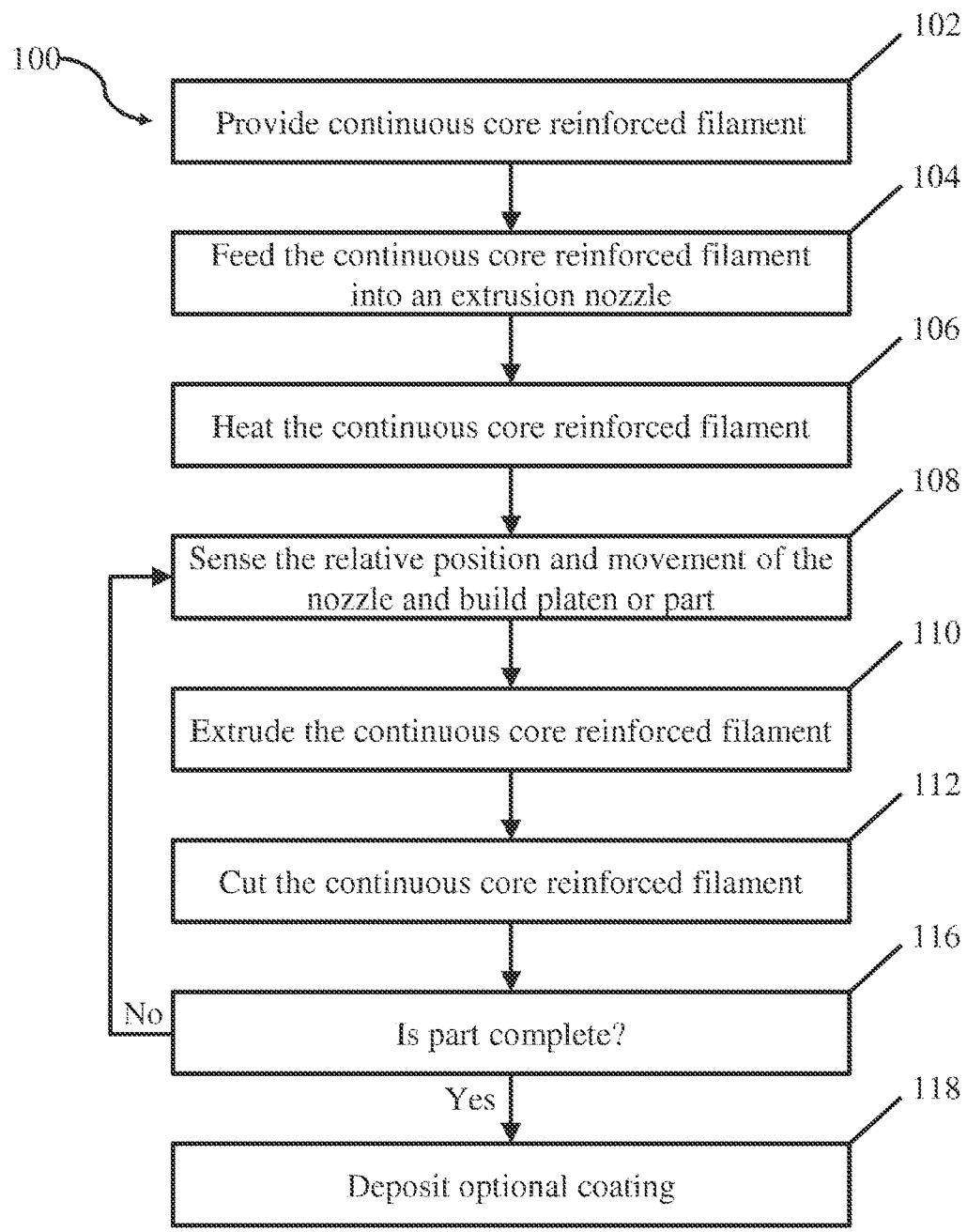
FIG. 2 is a representative flow chart of a three dimensional printing process.

FIG. 2 presents a schematic flow diagram of a three dimensional printing process using the system and controller depicted in FIG. 1. Initially a continuous core reinforced filament is provided at 102. The continuous core reinforced filament is then fed into the heated extrusion nozzle and heated to a desired temperature that is greater than a melting temperature of the resin and is less than a melting temperature of the continuous core at 104 and 106. The three dimensional printer then senses a position and movement of the heated extrusion nozzle relative to the build platen or part at 108. After determining the position and movement of the heated extrusion nozzle, the nozzle is moved to a desired location and the continuous core reinforced filament is extruded at the desired location and along a desired path and direction at 110. Embodiments are also envisioned in which the build platen or part are moved relative to the nozzle. After reaching the desired termination point, the continuous core reinforced filament is cut at 112. The controller may then determine if the three dimensional part is completed. If the printing process is not completed the controller may return to 108 during which it senses the current position and movement of the nozzle prior to depositing the next piece of continuous core reinforced filament. If the part is completed, the final part may be removed from the build platen. Alternatively, an optional coating may be deposited on the part using a secondary print head at 116 to provide a protective coating and/or apply a figure or image to the final part. It should be understood that the above noted steps may be performed in a different order than presented above. Further, in some embodiments, additional steps may be used and/or omitted as the current disclosure is not limited to only the processes depicted in FIG. 2.

FIGS. 3A-3E depict various embodiments of core configurations of a continuous core reinforced filaments 2. In addition to the specific core configurations, the materials are processed to be substantially void-free which helps with both the binding of the individual layers and resulting strength of the final structures.

FIGS. 3A and 3B depict the cross-section of a continuous core reinforced filament including a solid core 6a encased in a surrounding polymer 4 or resin. There are substantially no voids present either in the polymer or between the polymer and solid core. FIG. 3A depicts a continuous core reinforced filament that includes a cross section with a larger proportion of polymer. FIG. 3B depicts a cross section with a larger solid core and correspondingly larger proportion of reinforcing core material. It should be understood that any appropriate proportion of continuous core area to polymer area may be used. Further, without wishing to be bound by theory, materials with a larger proportion of polymer may result in smoother surface finishes and better adhesion between the layers. Conversely, larger proportions of the continuous core filament may be used to increase the strength to weight ratio of the final constructed component since the fiber material constitutes the bulk of the strength of the composite and is present in a larger proportion. A larger core may also be advantageous when the core is made from copper or another appropriate electrically or optically conductive material, since it may be desirable to have a large core to increase the conductivity of the deposited material.

FIGS. 3C and 3D depict yet another embodiment in which the core material of the continuous core reinforced filament 2 is a continuous multifilament core material 6b surrounded by and impregnated with a polymer 4 which is wicked into the cross section of the multifilament core. FIG. 3C depicts a smaller proportion of multifilament core material 6b surrounded by and impregnated with the polymer 4. FIG. 3D illustrates an embodiment with a very small amount of resin and a large proportion of multifilament core material 6b such that the multifilament core material fills virtually the entire cross section. In such an embodiment, the polymer 4 acts more as a binder impregnated into the multifilament core material 6b to hold it together. Similar to the above noted solid cores, any appropriate proportion of resin to multifilament core material may be used to provide a selected strength, surface finish, conductivity, adhesion, or other desired property to the resulting continuous core reinforced filament 2.

FIG. 3E, depicts a variation of the continuous multifilament core. In this embodiment, the continuous core reinforced filament 2 still includes a continuous multifilament core material 6b surrounded by and impregnated with a polymer 4. However, the core also includes one or more secondary strands of core materials 6c and 6d. These secondary core materials might be optically conducting, electrically conducting, thermally conducting, fluid conducting, or some combination of the above. These secondary core materials could be used to conduct power, signals, heat, and fluids as well as for structural health monitoring and other desired functionalities.

In order to avoid the entrapment of voids within the core reinforced filament 2 described above, the polymer material is processed such that the molten polymer or polymer resin wicks into the reinforcing fibers during the initial production of the material. In some embodiments, the polymer is substantially wicked into the entire cross-section of a multifilament core which helps to provide a substantially void free material. To produce the desired core reinforced filaments, the core reinforced filament may be pre-treated with one or more coatings to activate the surface, and subsequently exposed to one or more environmental conditions such as temperature, pressure, and/or chemical agents such as plasticizers, to aid the polymer or resin wicking into the cross section of the multifilament core without the formation of any voids. In some embodiments, this process may be performed prior to entering a feed head of the three dimensional printer. However, in other embodiments, the core reinforced filament is formed on a completely separate machine prior to the printing process and is provided as a consumable printing material. Since the subsequent deposition process does not need to be run at temperatures high enough to wet the core materials with the polymer or resin, the deposition process can be run at lower temperatures and pressures than required in typical systems. While the above process may be applied to both the solid and multifilament cores, it is more beneficial to apply this process to the multifilament cores due to the difficulty associated with wicking into the multifilament core without forming voids. Further, by forming the core reinforced filament either separately or prior to introduction to the nozzle, the material width and proportions may be tightly controlled resulting in a more constant feed rate of material when it is fed into a three dimensional printer.

In contrast to the above materials formed substantially without voids, the prior art has employed "green" deposition processes including reinforcing filaments that have been dipped into a resin or molten polymer and wicked with the multifilament cores during the extrusion process itself might also be use. In order to do this, the resin or polymer is heated substantially past the melting point, such that the viscosity is sufficiently low to allow the resin or polymer to wick into the reinforcing fibers. This process may be aided by a set of rollers which apply pressure to the materials to aid in wicking into the reinforcing fibers. However, due to the arrangement of the rollers and the temperature of the temperature of the towpreg as it exits the rollers, this process typically results in voids being entrapped in the material prior to final formation. After the resin or polymer has wicked into the reinforcing fibers, the resulting "towpreg" or "tow" is typically cooled to just above the melting point prior to extrusion. However, this process is typically done in air which combined with the air present in the material when it is inserted into the nozzle results in ambient air being entrapped in the material as described in more detail below.

Such a wicking process during the extrusion of a typical towpreg is depicted in FIG. 4. As depicted in the figure, prior to the wicking and extrusion process, a green towpreg 22 includes multiple green matrix resin particles or filaments 24 mixed with multiple reinforcing fibers 28 as well as a surrounding amount of air 24. As depicted in the figure, the reinforcing fibers 28 are distributed randomly across the cross section. As the towpreg 22 passes through heating zone 30 of the extrusion nozzle, the material is heated to induce fiber wetting and form a cured resin 32. The surrounding air 26 also becomes entrapped in the towpreg forming air voids 34. These entrapped air voids 34 then become embedded in the resultant printed part. Additionally, the air voids 34 may result in non-bonded sections 36 of the fibers. Since these non-bonded sections of the reinforcing fibers are not in contact with the polymer, the resulting composite material will be weaker in this location. In contrast, the continuous core reinforced filament in the illustrative embodiment depicted in FIGS. 3A-3E are substantially free from voids and in at least some embodiments the cores are centrally located within the surrounding resin. Without wishing to be bound by theory, this results in a stronger more uniform material and resultant part.

While the currently described three dimensional printer systems are primarily directed to using the preimpregnated or wetted core reinforced filaments described herein, in some embodiments the three dimensional printer system might use a material similar to the green comingled towpreg 22 depicted in FIG. 4. However, as noted above, it is desirable to avoid the formation of entrapped air voids during curing of the material within the nozzle. One possible way to avoid the formation of air voids in the deposited material, is to provide a vacuum within the nozzle. By providing a vacuum within the nozzle, there is no air to entrap within the towpreg when it is heated and cured within the nozzle. Therefore, in some embodiments, the nozzle is configured to allow the introduction of a continuous green material including a solid or multifilament core while under vacuum. The continuous green material may then be heated to an appropriate temperature above the melting temperature of a resin or polymer within the continuous green material while under vacuum to facilitate wicking of the resin or polymer into the core to produce a substantially void free material. Another method is the use of a circuitous path, which may be provided by offset rollers or other configurations as described below, to mechanically work out the entrapped air. Optionally, a vacuum may also be applied in conjunction with the mechanical removal of air bubbles through the circuitous path.

In addition to the material used for printing the three dimensional part, the specific nozzle used for depositing the core reinforced filament also has an effect on the properties of the final part. For example, the extrusion nozzle geometry used in typical three dimensional printers is a convergent nozzle, see FIG. 5. Convergent nozzles used in typical three dimensional printers typically have feed stock that is about 0.060 inches to 0.120 inches (1.5 mm-3 mm) in diameter. This stock is squeezed through a nozzle that typically necks down to about a 0.008 inch to 0.016 inch (0.2 mm-0.4 mm) tip orifice. However, such a nozzle may not be desirable for use with feed stock including a continuous core for the reasons described below.

Without wishing to be bound by theory, as the stock material is fed into the converging nozzle, the constraining geometry causes the fluid polymer matrix material to accelerate relative to the continuous core. Additionally, the matrix and core generally have different coefficients of thermal expansion. Since the matrix material is a polymer it generally has a larger coefficient of thermal expansion. Therefore, as the matrix material is heated it also accelerates relative to the fiber due to the larger expansion of the matrix material within the confined space of the converging nozzle. The noted acceleration of the matrix material relative to the fiber results in the matrix material flow rate $v_{matrix}$ being less than the fiber material flow rate $v_{fiber}$ near the nozzle inlet. However, the matrix material flow rate at the outlet $v_{matrix}$, is equal to the fiber material flow rate $v_{fiber}$. As illustrated in the figure, these mismatched velocities of the matrix material and fiber within the converging nozzle may result in the fiber collecting within the nozzle during the deposition process. This may lead to clogging as well as difficulty in controlling the uniformity of the deposition process. It should be understood that while difficulties associated with a converging nozzle have been noted above, a converging nozzle may be used with the embodiments described herein as the current disclosure is not limited in this fashion.

In view of the above, it is desirable to provide a nozzle geometry that is capable of maintaining a matched velocity of the individual strands of multifilament core material 6b, or other appropriate core, and the polymer 4 or other matrix material throughout the nozzle for a given matrix and core combination. For example, FIG. 6A depicts a divergent nozzle 200 with an increasing nozzle diameter that matches the thermal expansion of the matrix material. As depicted in the figure, the nozzle 200 includes an inlet 202 with a diameter D1, a section with an increasing diameter 204, and an outlet 206 with a diameter D2 that is greater than the diameter D1. Without wishing to be bound by theory, by matching the nozzle diameter to the expected expansion of the matrix material within the nozzle, the matrix and the continuous core reinforcing are kept at substantially the same velocity relative to one another throughout the entire nozzle. Therefore, the linear extrusion rate of the matrix material and the continuous core is the same and the continuous core does not build up within the nozzle.

In addition to the above, in some embodiments, the matrix material and the continuous core have relatively low coefficients of thermal expansion (such as carbon fiber and Liquid Crystal Polymer). In such an embodiment, since the matrix material and reinforcing fibers stay substantially the same size, the nozzle 200 may include an inlet 202 and outlet 206 that have substantially the same diameter D3, see FIG. 6B. Therefore, while some nozzle designs may have divergent geometries, in some embodiments the nozzle geometry may be substantially linear and may have substantially similar inlet and extrusion areas.

In addition to controlling the relative sizing of the nozzle inlet and outlet, a nozzle 200 may also include a rounded nozzle outlet 208, see FIG. 6C. The rounded nozzle outlet 208 may have any appropriate form and size. For example, the rounded nozzle outlet 208 may be embodied by an outwardly extending lip, a chamfer, a filet, an arc, or any other appropriate geometry providing a smooth transition from the nozzle outlet. Without wishing to be bound by theory, a rounded nozzle outlet providing a smooth transition from the nozzle internal bore may help to avoid applying excessive stresses to, and/or scraping, the continuous material as it is extruded from the nozzle 200. This smooth transition provided by the rounded nozzle outlet may help to avoid fracturing the continuous core filament during deposition.

Figure 7:
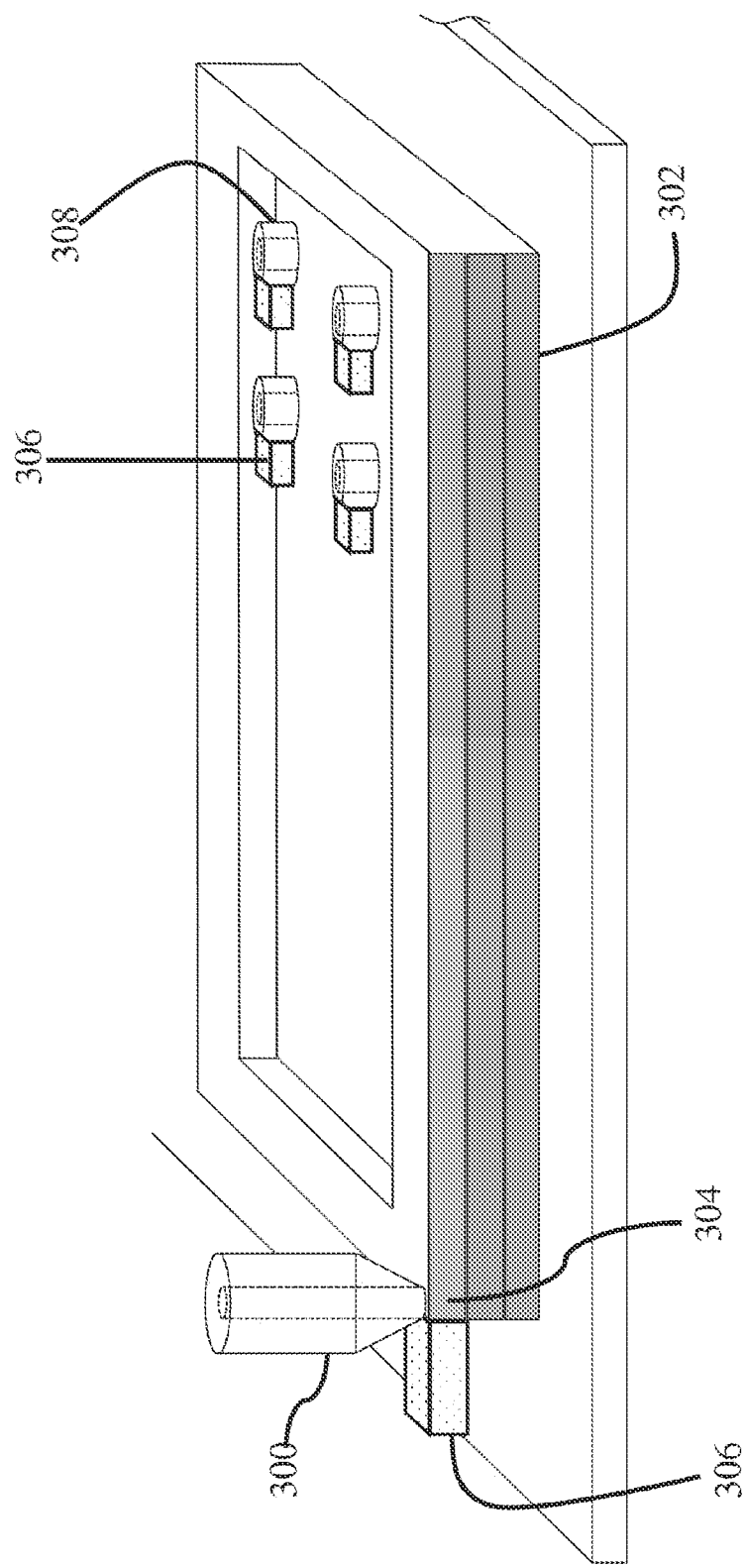
FIG. 7 is a schematic representation of a prior art three dimensional printing system.

FIG. 7 illustrates a potential disadvantage with printing a continuous core reinforced filament without an integrated cutter in the print head. As depicted in the figure, print head 300 is forming part 302, and is shown having deposited the last section of material layer 304. Since typical Fused Filament Fabrication (FFF), also known as Fused Deposition Modeling (FDM), techniques place the print head close to the underlying part, and often touching the top of the extruded plastic, there is little to no room in which to introduce an external cutting mechanism. Indeed, without a near zero-thickness blade, the print head needs to print a tag-end over-run 306 not specified in the part in order to enable a separate cutting mechanism, or person, to cut the continues core and terminate the printing process. However, this leaves undesirable tag-end over-runs 306 at each fiber termination point. As shown in FIG. 7, a plurality of internal features, such as hard mounting bosses 308 would all have a tag-end over-run 306 at each layer within the boss. In view of the above, an integrated cutting mechanism may enable less post-processing, and would allow the machine to simply print the intended part with smaller and fewer tag-end over-runs. Further, in some embodiments, and as described in more detail below, the cutting mechanism may eliminate the presence of tag-end over-runs altogether.

FIG. 8 depicts two embodiments of a cutting mechanism for use with a three dimensional printer. As depicted in the figure, an appropriate feed material, which in this example is a continuous core reinforced filament 2a, though other suitable filaments may be used, is removed from a spool 38 and passed through a feeding mechanism such as driving roller 40 and idle wheel 42. The driving roller 40, or any other appropriate feeding mechanism, is constructed and arranged to apply a force directed in a downstream direction to, in this example, the continuous core reinforced filament 2a. Therefore, the continuous core reinforced filament 2a may be at a temperature such that it is in a solid or semi solid state when this force is applied. For example, the force may be applied to the material when it is at room temperature, below a glass transition temperature of the material, between room temperature in the glass transition temperature, or any other appropriate temperature at which the material is capable of supporting the applied force. The applied downstream force results in the continuous core reinforced filament 2a entering and being extruded from a heated nozzle 10 to build up a three dimensional part. While a driving roller has been depicted, it should be understood, that any appropriate feeding mechanism might be used.

In the first embodiment, a cutting mechanism 8a, such as a blade, is positioned at the outlet of the heated extrusion nozzle 10. Such a configuration allows actuation of the cutting mechanism to completely cut the deposited strip by severing the internal continuous core. Additionally, in some embodiments, the nozzle pressure is maintained during the cutting process, and the cutting blade is actuated to both cut the internal strand, and to prevent further extrusion of the continuous fiber reinforced material and dripping by physically blocking the nozzle outlet. Thus, the cutting mechanism enables the deposition of continuous core reinforced filament, as well as unreinforced materials, with precisely selected lengths as compared to traditional three dimensional printers.

In the second depicted embodiment shown integrated with the same system, a cutting mechanism 8b is located upstream from the nozzle outlet. More specifically, the cutting mechanism 8b may be located within the hot end of the nozzle, or further upstream before the continuous core reinforced filament has been heated. In some embodiments, the cutting mechanism 8b is located between the nozzle outlet and the feeding mechanism 40. Such an embodiment may permit the use of a smaller gap between the nozzle outlet and the part since the cutting mechanism does not need to be accommodated in the space between the nozzle outlet and the part. Depending on the particular location, the cutting mechanism 8b may cut the continuous core filament and the surrounding matrix while the temperature is below the melting or softening temperature and in some embodiments below the glass transition temperature. Without wishing to be bound by theory, cutting the continuous core reinforced filament while it is below the melting, softening, and/or glass transition temperatures of the polymer may reduce the propensity of the resin to stick to the blade which may reduce machine jamming. Further, cutting when the resin or polymer is below the melting point may help to enable more precise metering of the deposited material. The position of a cut along the continuous core reinforced filament may be selected to eliminate the presence of tag-end over-runs in the final part which may facilitate the formation of multiple individual features.

As shown in the figure, the downstream portion 2b of the continuous core reinforced filament can be severed from the upstream portion 2a of the continuous core reinforced filament by the upstream cutting mechanism 8b. By maintaining a close fit between the feed material, and the guiding tube within which it resides, the downstream portion 2b of the cut strand can still be pushed through the machine by the upstream portion 2a which is driven by the drive roller 40 or any other appropriate feeding mechanism. Without wishing to be bound by theory, the previously deposited and cooled material is also adhered to the previously deposited layer and will drag the continuous core reinforced filament 2b out of the heated extrusion nozzle 10 when the print head is moved relative to the part which will apply a force to the continuous core located in the downstream portion of the cut strand. Therefore, a combination of upstream forces from the feeding mechanism and downstream forces transferred through the continuous core may be used to deposit the cut section of material. Again, the position of a cut along the continuous core reinforced filament may be selected to eliminate the presence of tag-end over-runs in the final part.

While embodiments including an integrated cutting mechanism have been depicted above, embodiments not including a cutting mechanism are also possible as the current disclosure is not limited in this fashion. For example embodiments in which a part is printed in a contiguous string fashion, such that termination of the continuous material is not required might be used. In once such embodiment, the three dimensional printing machine might not be able to achieve fiber termination, and would therefore print a length of material until the part was complete, the material ran out, or a user cuts the deposited material.

While cutting of the continuous fiber reinforced material helps to eliminate the presence of tag-end over-runs, it is also desirable to prevent buckling of the material to help ensure a uniform deposition and prevent machine jams. Without wishing to be bound by theory, the stiffness of a material is proportional to the diameter of the material squared. Therefore, continuous materials with large diameters do not need as much support to be fed into an inlet of the nozzle as depicted in the figure. However, as the diameter of the continuous material decreases, additional features may be necessary to ensure that buckling of the continuous material and any continuous core filament contained within it does not buckle. For example, a close-fitting guide tube as described in more detail below, may be used in combination with positioning the feeding mechanism closer to the inlet of the nozzle or guide tube to help prevent buckling of the material. Therefore, in one embodiment, the feeding mechanism may be located within less than about 20 diameters, 10 diameters, 8 diameters, 6 diameters, 5 diameters, 4 diameters, 3 diameters, 2 diameters, 1 diameter, or any other appropriate distance from a guide tube or inlet to the nozzle.

In addition to preventing buckling, in some embodiments, the maximum tension or dragging force applied to the deposited reinforcing fibers is limited to prevent the printed part from being pulled up from a corresponding build plane or to provide a desired amount of tensioning of the continuous core. The force limiting may be provided in any number of ways. For example, a one-way locking bearing might be used to limit the dragging force. In such an embodiment, the drive motor may rotate a drive wheel though a one-way locking bearing such that rotating the motor drives the wheel and extrudes material. If the material dragging exceeds the driven speed of the drive wheel, the one-way bearing may slip, allowing additional material to be pulled through the feeding mechanism and nozzle, effectively increasing the feed rate to match the head traveling speed while also limiting the driving force such that it is less than or equal to a preselected limit. The dragging force may also be limited using a clutch with commensurate built-in slip. Alternatively, in another embodiment, the normal force and friction coefficients of the drive and idler wheels may be selected to permit the continuous material to be pulled through the feeding mechanism above a certain dragging force. Other methods of limiting the force are also possible. In yet another environment, an AC induction motor, or a DC motor switched to the "off" position (e.g. depending on the embodiment this may correspond to either a small resistance being applied to the motor terminals or opening a motor terminals) may be used to permit the filament to be pulled from the printer. In such an embodiment, the motors may be allowed to freewheel when a dragging force above a desired force threshold is applied to allow the filament to be pulled out of the printer. In view of the above, a feeding mechanism is configured in some form or fashion such that a filament may be pulled out of the printer nozzle when a dragging force applied to the filament is greater than a desired force threshold. Additionally, in some embodiments, a feeding mechanism may incorporate a sensor and controller loop to provide feedback control of either a deposition speed, printer head speed, and/or other appropriate control parameters based on the tensioning of the filament.

A printer system constructed to permit a filament to be pulled out of a printer nozzle as described above, may be used in a number of ways. However, in one embodiment, the printing system drags a filament out of a printer nozzle along straight printed sections. During such operation a printer head may be displaced at a desired rate and the deposited material which is adhered to a previous layer or printing surface will apply a dragging force to the filament within the printing nozzle. Consequently, the filament will be pulled out of the printing system and deposited onto the part. When printing along curves and/or corners, the printing system extrudes and/or pushes the deposited filament onto a part or surface. Of course embodiments in which a filament is not dragged out of the printing system during operation and/or where a filament is dragged out of a printer head when printing a curve and/or corner are also contemplated.

The currently described three dimensional printing methods using continuous core reinforced filaments also enable the bridging of large air gaps that previously were not able to be spanned by three dimensional printers. Without wishing to be bound by theory, the deposition of tensioned continuous core reinforced filaments including a non-molten, i.e. solid, continuous core enables the deposited material to be held by the print head on one end and adhesion to the printed part on the other end. The print head can then traverse an open gap, without the material sagging. Thus, the printer can print in free space which enables the printer to jump a gap, essentially printing a bridge between two points. This enables the construction of hollow-core components without the use of soluble support material.

FIG. 8 depicts free-space printing enabled by the continuous core reinforced filament. With the continuous core reinforced filament 2b attached to the part at point 44, and held by the print head at point 46, it is possible to bridge the gap 48. In typical FFF printers, the extruded material will sag, and fall into the gap 48 because it is molten and unsupported. However, having a continuous core of non-molten material supporting the molten polymer enables printing in free-space, advantageously enabling many new types of printing. For example, a closed section box shown in FIG. 9 is formed by a section 50 which is bridges gap 48 and is affixed to opposing sections 52 and 54. While this example shows a closed section bridge, the free-space printing could also be used to produce cantilevers, and unsupported beams, that cannot be printed with typical unsupported materials.

In some embodiments, a cooling mechanism such as a jet of cooling air may be applied to the extruded material to further prevent sagging by solidifying the polymer material surrounding the core. The extruded material may either be continuously cooled while building a component with sections over gaps. Alternatively, in some embodiments, the extruded material might only be cooled while it is being extruded over a gap. Without wishing to be bound by theory, selectively cooling material only while it is over a gap may lead to better adhesion with previously deposited layers of material since the deposited material is at an elevated temperature for a longer period which enhances diffusion and bonding between the adjacent layers.

In the above noted embodiments, a cutting blade is located upstream of the nozzle to selectively sever a continuous core when required by a printer. While that method is effective, there is a chance that a towpreg will not "jump the gap" correctly between the cutting mechanism and the nozzle. Consequently, in at least some embodiments, it is desirable to increase the reliability of rethreading the core material after the cutting step.

As described in more detail below, in some embodiments, a cutting mechanism is designed to reduce or eliminate the unsupported gap after the cutting operation. In such an embodiment, a tube-shaped shear cutter may be used. As described in more detail below, a towpreg is contained within two intersecting tubes that shear relative to each other to cut the towpreg. In such an embodiment, a gap sufficient to accommodate movement of the two tilted to each other. The tubes are subsequently moved back into alignment to resume feeding the material. In this mechanism there is effectively no gap to jump after the cutting operation since the tubes are realigned after cutting. In some embodiments, the gap required for the cutting operation is reduced or eliminated by moving the guide tubes axially together after the cut, thus, eliminating the gap and preventing the fiber from having to jump the gap. In other embodiments, and as described in more detail below, the cutting mechanism may be integrated into a tip of a printer head nozzle to eliminate the need for a gap.

Figure 10:
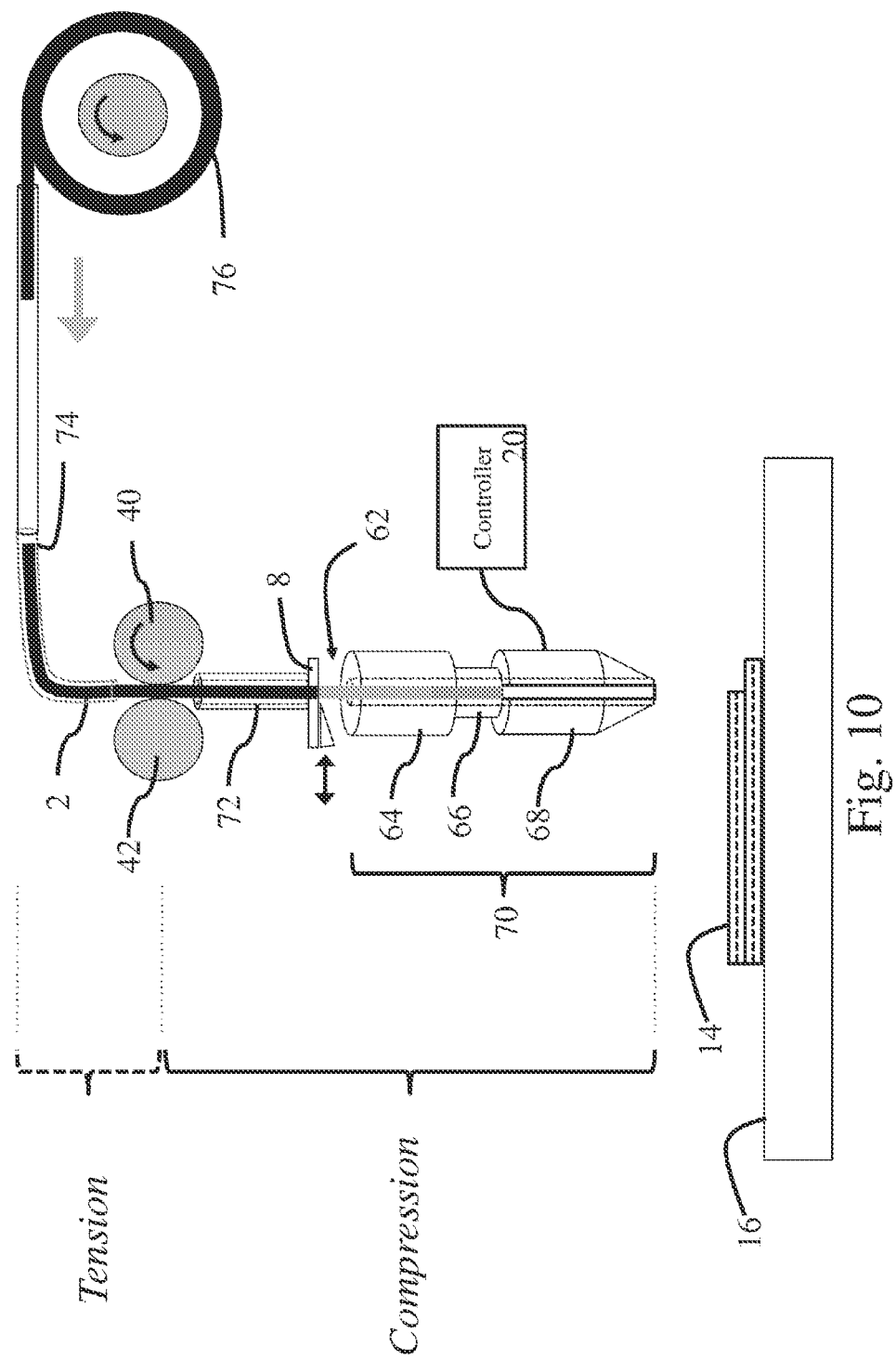
FIG. 10 is a schematic representation of a three-dimensional printing system including a guide tube.
Figure 11:
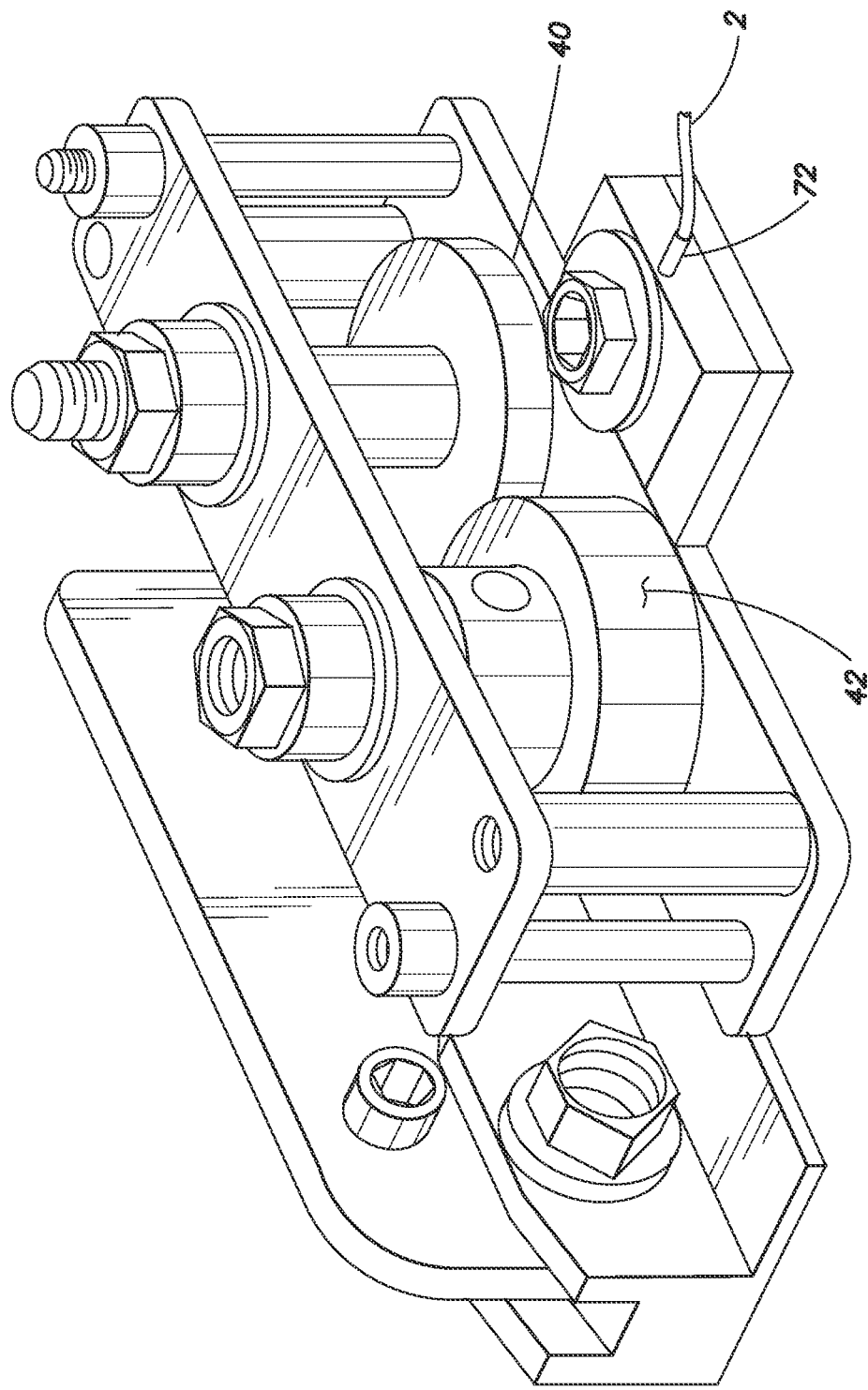
FIG. 11 is a photograph of a three dimensional printing system including a guide tube.

FIG. 10 depicts a compression-based continuous-core print head. As depicted in the figures, the input material is a towpreg such as a continuous core filament 2 which is drawn into the feed rollers 40 and 42 under tension. To facilitate guiding and maintaining alignment of the continuous core filament 2 with the rollers 40 and 42, in some embodiments, the continuous core filament 2 passes through a guide tube 74 positioned upstream of the rollers. After passing through the rollers, the continuous core filament 2 is placed in compression. As noted above, depending on a length of the material under compression as well as a magnitude of the applied force, the continuous core filament 2 may buckle. Consequently, in some embodiments, the continuous core filament 2 passes through a close-fitting guide tube 72 positioned downstream of the rollers and upstream of the nozzle. The guide tube 72 will both guide and substantially prevent buckling of the continuous core filament 2. Similar to the above embodiments, a cutting mechanism 8 corresponding to a blade is positioned downstream of the guide tube 72. The gap 62 present between the printer head 70 and the cutting mechanism 8 is illustrated in the figure. When the continuous core filament 2 is cut by the cutting mechanism 8, the material is "rethreaded" by passing from one side of the gap 62 to the other side and into receiving tube 64. In some embodiments, the receiving tube 64 is advantageously below the glass transition temperature of the material, such that the entirety of the cutting operation occurs within solid material. In the depicted embodiment, a thermal spacer 66 is located between the receiving tube 64 and the hot melt nozzle 68. The thermal spacer 66 reduces the heat transfer to the receiving tube 64 from the hot melting nozzle 68. Similar to the previous embodiment, the continuous-core material 2 is deposited, layer-by-layer 14 onto a build plate 16. FIG. 11 is a photograph of a system including the above-noted components.

In some embodiments, the filament used with the device depicted in FIG. 10 is provided on a spool 76. When provided in this form, the material is preformed, substantially solid, and substantially rigid. For example, a preimpregnated core reinforced filament might be provided. Since the material has already been formed, it is less likely to stick to the various components and/or delaminate during use as might be the case for a green towpreg which may or may not include an uncured resin. By providing the filament in a preformed state, the filament is able to support compressive forces in addition to being easier to manipulate. This facilitates both handling during threading of the system as well as applying compressive forces to the material during deposition using a compression-based printer head as described herein.

Without wishing to be bound by theory, the difficulty in jumping the gap 62 depicted in FIG. 10 stems from a few key areas. The first difficulty in rethreading is due to the fact that the filament is inherently more flexible during threading when the end is unsupported, than after it has been threaded and both ends are fully supported and constrained. More specifically, the bending mode is second order when rethreaded, which is inherently stiffer, and less prone to bending or buckling, than a filament constrained only at the upstream end corresponding to a first order bending mode. Additionally, after the filament has been threaded, the downstream portion serves to guide all the subsequent flowing material into the tube. Finally, cutting a filament introduces deformation to the feed material which may result in misalignment of the filament and the receiving tube 64. This misalignment may result in the filament not appropriately feeding into the receiving tube 64 after cutting. This deformation can be minimized through the use of stiff matrix material, and a sharp cutting blade. However, blade wear, and the desire to use different types of materials, means that in some applications it may be desirable to use a different cutting mechanism or additional features to increase threading reliability.

There are several ways to improve the reliability of threading the filament past a cutting mechanism. For example, in one embodiment, the gap 62 is selectively increased or decreased to permit the introduction of the blade. In such an embodiment, when not in use, the cutting mechanism 8 is removed from the gap 62 and the guide tube 72 is displaced towards the receiving tube 64. This reduces, and in some embodiments, eliminates the gap 62 during rethreading. Alternatively, the guide tube 72 may be constructed and arranged to telescope, such that a portion of the guide tube moves towards the receiving tube 64 while another portion of the guide tube stays fixed in place to reduce the gap. In another embodiment, rethreading error is reduced using a flow of pressurized fluid, such as air, that is directed axially down the guide tube 72. The pressurized fluid exits the guide tube 72 at the cutting mechanism 8 as depicted in the figure. Without wishing to be bound by theory, as the continuous core filament 2, or other appropriate material, is advanced through gap 62, the axial fluid flow will center the material within the fluid flow thus aiding to align the material with the receiving end 16. Such an embodiment may also advantageously serve to cool the guide tube 72 tube during use. This may help facilitate high-speed printing and/or higher printing temperatures. The fluid flow may also help to reduce friction of the material through the guide tube.

FIG. 12A depicts one embodiment of a shear cutting mechanism. The shear cutting mechanism also eliminates the gap 62 of FIG. 10 which will increase the reliability of threading. Similar to the above, the continuous filament 400 is driven in compression by drive wheel 408, and received by a close-fitting guide tube 420. The material is driven in compression through an upper shear cutting block guide 406, lower shear cutting head 402, and heated print head 404. The upper shear cutting block 406 and lower shear cutting head 402 are displaced relative to each other to apply a shearing force to the filament to cut it. While a particular mechanism has been depicted in the figures, it should be understood that any configuration capable of providing a shearing force to the material might be used. For example, first and second shearing elements may include aligned channels that are shaped and size to accept a filament. The first and/or second shearing elements may then be displaced relative to one another to take the channels formed in the first and second shearing elements out of alignment and apply a shear force to the filament to cut it. Additionally, the shear cutting mechanism may located within a print head, or upstream of the print head, as the disclosure is not so limited.

FIG. 12B shows the upper shear cutting block 406 translated relative to shear cutting head 402. As noted above, when the upper shear cutting block is translated relative to the shear cutting head, the filament segment 422 is sheared off from the continuous filament 400. If a simple cut is desired, the shear head 402 can return to the original position relative to the upper cutting block 406. In the presented diagram, the upper block moves. However, either block, or both blocks, could move depending on the particular design. The shear cut and return action is the simplest cutting formation. After the shear cut and return, the end of the filament 400 is entirely captive in the guiding tube. Therefore, there is no gap to jump, thus, increasing the reliability of feeding the filament forward for the next section of the part.

In addition to simply performing sheer cutting of a material, in some embodiments, it may be desirable to provide printing capabilities with multiple types of materials and/or operations. FIG. 12A illustrates one embodiment of a system including optional indexing stations 414 and 416. When shear head 402 is translated over to either station, a plurality of useful operations can additionally occur. In one embodiment, station 416 is a cleaning station and includes a cleaning material 410, that can be fed through the print head 404 to clean the nozzle. In one example, the material is a metal like brass, copper, stainless steel, aluminum, or the like. This enables the nozzle to be heated, and purged with a material having a higher melting temperature than the feed stock. In one embodiment, the print head 404 is moved to a print cleaning station, for example, the back corner or other appropriate location. The print head 404 is then heated up and indexed to station 416. The cleaning material 410 is then fed through the nozzle to clear any obstructions present. The shear cutting action of the upper sheer cutting block 406 and the lower shear cutting head 402 can then sever the sacrificial cleaning pieces to prevent them from being dragged back up the nozzle, and thereby introducing contaminants to the nozzle. In some instances, however, the cleaning agent may be cyclically pushed down, and pulled back up through the nozzle. In another embodiment, the cleaning station 416 is used to push any number of cleaning agents such as high-pressure air, liquids, solids, gasses, plasmas, solvents or the like, through the nozzle in order to perform the desired cleaning function.

In addition to the above, in some embodiments, the three-dimensional printing system also includes a station 414 corresponding to a different material 412. Depending on the particular application, the second material may be an electrically conductive material such as copper, an optically conductive material such as fiber optics, a second core reinforced filament, plastics, ceramics, metals, fluid treating agents, solder, solder paste, epoxies, or any other desired material as the disclosure is not so limited. In such an embodiment, the print nozzle 404 is indexed from one of the other stations to the station 414 to deposit the second material 412. When the printing function using the second material is finished, the print nozzle 404 is then indexed from station 414 to the desired station and corresponding material.

FIG. 13 shows a shear cutting block 402 including multiple nozzles 404 and 424 formed in the shear cutting block. In one embodiment, the nozzle 404 has a larger print orifice than the nozzle 424, enabling larger diameter towpregs and/or pure polymer materials to be deposited at a more rapid volume. In another embodiment, the second nozzle 424 is substantially the same as nozzle 404. Consequently, the second nozzle 424 may be used as a replacement nozzle that can be automatically switched into use if nozzle 404 becomes clogged. Having an additional nozzle would decrease the down time of the machine, especially in unattended printing (e.g. overnight). Similar to the above, the first and second nozzles 404 and 424 may be indexed between different stations.

FIG. 14A depicts a nozzle 500 including an inlet 502 and an outlet 504. The geometry of the nozzle outlet 504 includes a sharp exit corner. While some embodiments may use a nozzle with a sharp corner at the outlet, a sharp corner may lead to cutting of fibers in continuous core printing. Further, it may scrape off plating of metal cores, and treatments applied to fiber optic cables incorporated in a core. Consequently, in some embodiments, it is desirable to provide a smooth transition at an outlet of a nozzle. FIG. 14B depicts a chamfered nozzle outlet 506, which reduced shear cutting of fibers in testing. Smoothly rounded nozzle exit 508 advantageously reduces shearing and cutting of non-molten continuous cores. It should be appreciated that the particular design of a transition at an outlet of a nozzle includes aspects such as chamfer angle, fillet angle and degree, length of the transition, and other appropriate considerations that will vary depending on the particular material being used. For example, Kevlar is extremely strong in abrasion, while fiberglass is weak. Therefore, while a nozzle including a 45 degree chamfer may be sufficient for Kevlar, it may result in broken strands when used with fiber glass. However, by using additional chamfers, or other features, it is possible to eliminate breakage of the fiberglass cores during printing.

As depicted in the figures, nozzle outlet geometries 506 and 508 provide a smooth transition from the vertical to the horizontal plane to avoid accidently cutting the core materials. However, in some embodiments, it may be desirable to sever the continuous core to cut the filament. One method of severing the continuous core at the tip of the nozzle 500 is to push the nozzle down in the vertical Z direction, as shown by arrow 210. As depicted in FIG. 14C, in some embodiments, the corner of the nozzle outlet 508 is sharpened and oriented in the Z direction to enable the outlet to sever the continuous core as the outlet impinges on and cuts through the material. In order to facilitate cutting of the material using such a method, it may be desirable to place the material under tension. This tension may be provided in any number of ways including, for example, providing a firm hold of the material using the feeding mechanism, reversing the feeding mechanism and/or moving the print head. Alternatively, the nozzle 500 might be kept stationary while the feeding mechanism is reversed in order to pull the material against the edge of the nozzle outlet and cut it. In another embodiment, the cutting can be achieved by simply "breaking" the strand at the corner point where it exits the nozzle by advancing the print head, without feeding, thereby building tension until the core is severed. Typically this will occur at the corner point of the nozzle exit. In this embodiment, a compromise nozzle design may be selected. The nozzle exit geometry may be slightly sharpened in order to enhance cutting.

In another embodiment, a portion of a nozzle may be sharpened and directed towards an interior of the nozzle outlet to aid in cutting material output through the nozzle. As depicted in in FIGS. 15A-15D, a nozzle 600 contains a continuous core filament 2, or other appropriate material, exiting from a chamfer style nozzle. As depicted in the figures the nozzle 600 is smoothly chamfered. Additionally, the nozzle 600 includes a ring 602 located at a distal outlet of the nozzle. The majority of the ring 602 is a non-cutting portion of the ring and is shaped and arranged such that it does not interfere with material being output from the nozzle. However, the ring 602 also includes a cutting portion 602a which is sharpened and oriented inwards towards the material contained within the nozzle 600, see FIGS. 15B-15D. Depending on the particular embodiment, the cutting portion 602a is a sharp cutting blade. The cutting portion may be made of a cutting steel, a stainless steel, a carbide, a ceramic, or any appropriate material. As illustrated in FIG. 15D, in some embodiments, the cutting portion 602a occupies a fraction of the nozzle outlet area. In such an embodiment, the cutting portion 602a may either be permanently attached in the indicated position within the nozzle outlet, or it may be selectively retracted during the printing process and deployed into a cutting position when it is desired to cut the printed material as the disclosure is not so limited. Alternatively, in other embodiments, the cutting portion 602a is recessed into a perimeter of the nozzle outlet such that it does not impinge upon material exiting the nozzle during normal operation. For example, the cutting portion 602a may form a part of the perimeter of the nozzle exit as depicted in FIG. 15C. Other arrangements of the cutting portion 602a relative to the nozzle outlet are also contemplated. Additionally, while the cutting portion 602a has been depicted as being incorporated with a ring attached to a nozzle, embodiments in which the cutting portion is either formed with the nozzle outlet and or directly attached to the nozzle outlet are also contemplated.

With regards to the embodiment shown in FIGS. 15A-15D, when it is desired to cut material being extruded from the nozzle, such as, for example, the continuous core filament 2, the nozzle is translated in a direction D relative to a part being constructed on a surface, see the arrows depicted in the figures. During this translation, the continuous core filament 2 is not fed through the nozzle. Consequently, the continuous core filament 2, and the core contained within it, is effectively held in place. This results in the tensioning of the core material 6 which is displaced towards the cutting portion 602a through the surrounding polymer matrix 4. As increasing tension is applied to the continuous core filament 2, the core 6 is cut through by the cutting portion 602a. Alternatively, in some embodiments, the surface and/or part is translated relative to the nozzle as the disclosure, or the continuous core filament 2 is retracted using the feeding mechanism to apply the desired tension to the core material 6 to perform the severing action.

While a solid core with a particular size has been depicted in the figures, it should be understood that the disclosure is not so limited. Instead, such a cutting mechanism may be used with solid cores, multi-filament cores, continuous cores, semi-continuous cores, pure polymers, or any other desired material. Additionally, the core material 6 may be any appropriate size such that it corresponds to either a larger or smaller proportion of the material depicted in the figures. In addition to the above, for some materials, such as fiber optic cables, the cutting portion 602a forms a small score in the side the core 6, and additional translation of the nozzle relative to the part completes the cut. For other materials, such as composite fibers, the rounded geometry of the nozzle results in the core 6 being directed towards the cutting portion 602a when it is placed under tension as described above. Therefore, the resulting consolidation (e.g. compaction) of the core towards the cutting portion enables cutting of a large fiber with a relatively smaller section blade. In yet another embodiment, the core 6 is either a solid metallic core or includes multiple metallic strands. For example, the core may be made from copper. In such an embodiment, the cutting portion 106a creates enough of a weak point in the material that sufficient tensioning of the core breaks the core strand at the nozzle exit. Again, tensioning of the core may be accomplished through nozzle translation relative to the part, backdriving of the material, or a combination thereof.

In yet another embodiment, the cutting portion 602a is a high temperature heating element that heats the core in order to sever it, which in some applications is referred to as a hot knife. For example, the heating element might heat the core to a melting temperature, carbonization temperature, or to a temperature where the tensile strength of the core is low enough that it may be broken with sufficient tensioning. It should be understood that, the heating element may heat the core either directly or indirectly. Additionally, in some embodiments, the element is a high-bandwidth heater, such that it heats quickly, severs the core, and cools down quickly without imparting deleterious heat to the printed part. In one particular embodiment, the heating element is an inductive heating element that operates at an appropriate frequency capable of heating the core and/or the surrounding material. In such an embodiment, the inductive heater heats the core to a desired temperature to sever it. Such an embodiment may be used with a number of different materials. However, in one embodiment, an inductive heater is used with a continuous core filament including a metallic core such as copper. The inductive heating element heats the metallic core directly in order to severe the strand. In instances where the heating element indirectly heats the core, it may not be necessary to tension the material prior to severing the core. Instead, the core may be severed and the nozzle subsequently translated to break the material off at the nozzle outlet.

FIG. 16 presents another embodiment of a nozzle tip-based cutting mechanism m the depicted embodiment, a cutting element 604 is disposed on a distal end of the nozzle 600. While any appropriate arrangement might be used, in the depicted embodiment a cutting ring disposed around the distal end of the nozzle as depicted in the figure. The cutting ring 604 includes a sharp and edge oriented towards the deposited continuous core filament 2 depicted in the figure. In such an embodiment, the cutting element 604, or a subsection thereof, is actuated downwards towards the deposited material in order to sever the core of the continuous core filament 2. In another version, the internal nozzle 600 is translated upwards relative to the cutting element 604. In such an embodiment, the extrusion nozzle 600 may be spring loaded down. Therefore, a cut can be executed by driving the feed head into the part, thereby depressing the inner feed head, relative to the cutting ring, and enabling the cutting ring to sever the core material. In either case, the continuous core filament 2 is brought into contact with the cutting element 604, and the core material 6 is severed.

While several different types of cutting mechanisms are described above, it should be understood that any appropriate cutting mechanism capable severing the core and/or surrounding matrix might be used. Therefore, the disclosure should not be limited to just the cutting mechanisms described here core the particular core material and structure described in these embodiments.

As noted above, tension-based three-dimensional printing systems exhibit several limitations, including the inability to make planar or convex shapes as well as difficulty associated with threading the printed material through the system initially and after individual cuts. In contrast, a compression-based three-dimensional printing system offers multiple benefits including the ability to make planar and convex shapes as well as improved threading of the material. However, as noted previously, in some modes of operation, and/or in some embodiments, material may be deposited under tension by a system as the disclosure is not so limited.

Referring again to FIG. 10, a three-dimensional printing system may include a feeding mechanism such as a roller 40 capable of applying a compressive force to the continuous core filament 2 fed into a printer head 70. However, as noted above, extruding a towpreg, strand, fiber, or other similar material using a compressive force may result in buckling. Consequently, it is desirable to prevent buckling of the material when it is under compression. Without wishing to be bound by theory, composite fibers are incredibly stiff when constrained in place such as when they are held in place by a matrix. However, composite fibers are easily flexed when dry in a pre-impregnated form when they are not constrained from moving in off axis directions. Therefore in some embodiments, it is desirable to constrain movement of the material in off axis directions. While this may be accomplished in a number of ways, in one embodiment, and as noted above, one or more close fitting guide tubes 72 are located between the feeding mechanism and the receiving tube 64 or other inlet of the nozzle. The one or more close fitting guide tubes 72 located along the fiber length help to prevent buckling. The distance between the feeding mechanism, such as the roller 40, and an inlet of the guide tube 72 may be selected to substantially avoid buckling of the material as well. In some embodiments, it is desirable that the guide tubes are close fitting and smooth such that their shape and size are substantially matched to the continuous core filament 2. In one specific embodiment, the guide tube is a round hypodermic tube. However, embodiments in which the guide tube is sized and shaped to accept an ovular, square, tape-like material, or any other appropriately shaped material are also contemplated. In some embodiments, and as described in more detail below, the continuous core filament 2 may include a smooth outer coating and/or surface, which is in contrast to tension wound systems where the core may poke through the outer jacket. This smooth outer surface may advantageously reduce the friction the material within the close fitting guide tubes.

In some embodiments, the three-dimensional printing system does not include a guide tube. Instead, the feeding mechanism may be located close enough to an inlet of the nozzle, such as the receiving tube 64, such that a length of the continuous core filament 2 from the feeding mechanism to an inlet of the nozzle is sufficiently small to avoid buckling. In such an embodiment, it may be desirable to limit a force applied by the feeding mechanism to a threshold below an expected buckling force or pressure of the continuous core filament, or other material fed into the nozzle.

Figure 17B:
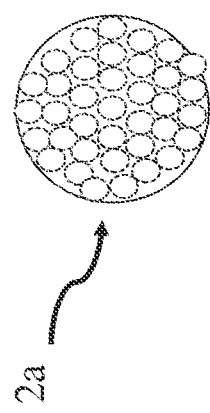
FIG. 17B is a schematic representation of a continuous core reinforced filament to be utilized with the printing system prior to deposition.
Figure 17C:
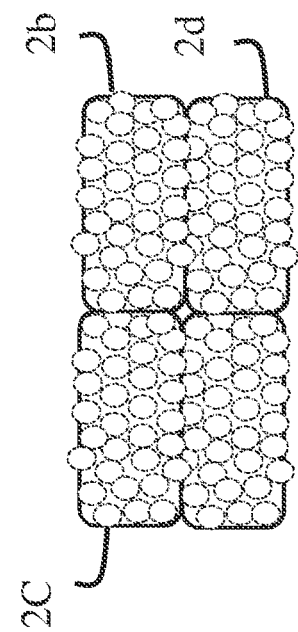
FIG. 17C is a schematic representation of the continuous core reinforced filament and surrounding beads of materials after deposition using compaction pressure.
Figure 17A:
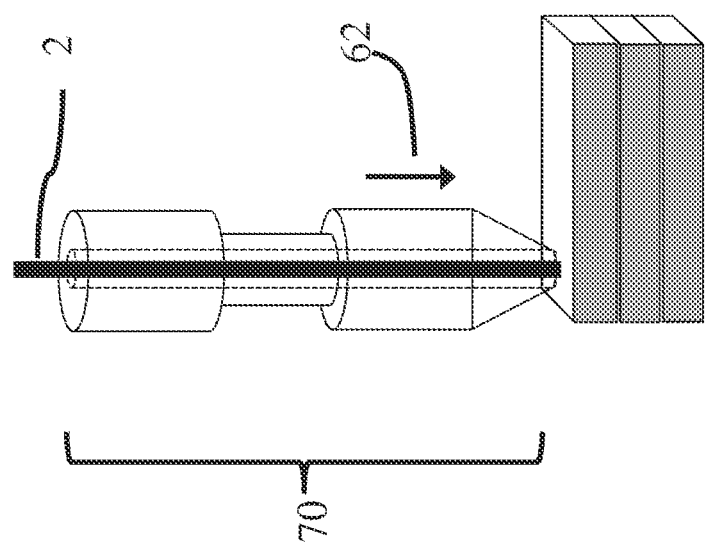
FIG. 17A is a schematic representation of a three-dimensional printing system applying a compaction pressure during part formation.

In addition to depositing material using compression, the currently described three dimensional printers may also be used with compaction pressure to enhance final part properties. For example, FIG. 17A shows a composite material, such as the continuous core reinforced filament 2, that is extruded through a printer head 60 with an applied compaction force or pressure 62. The compaction pressure compresses the initial continuous core reinforced filament 2a with an initial shape, see FIG. 17B, into the preceding layer below and into a second compacted shape, see FIG. 17C. The compressed continuous core reinforced filament 2b both spreads into adjacent strands 2c on the same layer and is compressed into the underlying strand of material 2d. This type of compaction is typically achieved in composites through pressure plates, or a vacuum bagging step, and reduces the distance between reinforcing fibers, and increases the strength of the resultant part. While the printer head 70 may be used to apply a compression pressure directly to the deposited material other methods of compressing the deposited materials are possible. For example the deposited materials might be compacted using: pressure applied through a trailing pressure plate behind the head; a full width pressure plate spanning the entire part that applies compaction pressure to an entire layer at a time; and/or heat may be applied to reflow the resin in the layer and achieve the desired amount of compaction within the final part.

As noted above, and referring to FIG. 18A, nozzles 700 used in Fused Filament Fabrication (FFF) three dimensional printers typically employ a constriction at the tip of the nozzle to trap the solid, non-molten plastic when it first enters the nozzle at inlet 702 and passes into the heated block 704. The converging nozzle outlet 706 applies backpressure, or retarding force, that only enables material to pass through the nozzle once it has melted, and can squeeze through the significantly smaller diameter outlet 706. One of the problems associated with Fused Filament Fabrication is the eventual clogging and jamming of the print head (nozzle) due to the convergent nozzle design trapping material with no means of ejecting it. Further, degraded plastic builds up within the nozzle which eventually clogs the nozzle or alters the extruded print bead. Additionally, in order to clean a convergent nozzle, the feeding filament must be reversed backwards up through the nozzle, potentially contaminating the feed path back to the filament spool. After reversing through the entire feed path, the contaminated tip of the feed material must be cut off from the feed spool, and the spool must be re-threaded through the machine. For these reasons, the nozzles on most FFF three-dimensional printers are considered wear items that are replaced at regular intervals.

Having realized these limitations associated with convergent nozzles, the inventors have recognized the benefits associated with a divergent nozzle. In a divergent nozzle, the inflowing material expands as it transitions from the feed zone, to the heated melt zone, thereby enabling any particulate matter that has entered the feed zone to be ejected from the larger heated zone. Additionally, a divergent nozzle is both easier to clean and may permit material to be removed and a feed forward manner where material is removed through the nozzle outlet as compared to withdrawing it through the entire nozzle as described in more detail below.

FIG. 18B shows a nozzle 708 including a material inlet 710, fluidly connected to cold-feed zone 712. In the depicted embodiment, the inlet 710 and the cold feed zone 712 correspond to a cavity or channel with a first size and shape. The cold feed zone 712 is disposed on top of him fluidly connected to a heated zone 714. A cross-sectional area of the cavity or channel depicted in the heated zone 714 that is transverse to a path of the filament when positioned therein is greater than a cross-sectional area of the cavity or channel located in the cold-feed zone 712 that is transverse to the path of the filament. Additionally, in some embodiments, a cross-sectional area of the nozzle outlet transverse to the path of the filament is greater than a cross-sectional area of the nozzle inlet transverse to the path of the filament. The nozzle also includes a nozzle outlet 716. During use, material passes from the nozzle inlet 710, through the cold feed zone 712, and into the heated zone 714. The material is then output through the nozzle outlet 716. In some embodiments, the cold-feed zone 712 is constructed of a material that is less thermally conductive than a material of the heated zone 714. This may permit the material to pass through the cold feed zone 712 and into the heated zone 714 without softening. In one particular embodiment, a divergent nozzle is formed by using a low-friction feeding tube, such as polytetrafluoroethylene, that is fed into a larger diameter heated zone located within a nozzle such that a portion of the heated zone is uncovered downstream from the tube. Additionally, depending on the embodiment, one or both of the cool feeding zone and heating zone may be constructed from, or coated with, a low friction material such as polytetrafluoroethylene. While a sharp transition between the cold feed zone and the heated zone has been depicted in the figures, embodiments of a divergent nozzle in which there is a gradual transition from a smaller inlet to a larger outlet are also contemplated.

One of the common failure modes of FFF is the eventual creep up of the molten zone into the cold feeding zone, called "plugging". When the melt zone goes too high into the feed zone, and then cools during printing, the head jams. Having a divergent nozzle greatly reduces the likelihood of jamming, by enabling molten plastic to be carried from a smaller channel, into a larger cavity of the divergent nozzle. Additionally, as described below, a divergent nozzle is also easier to clean.

FIG. 18C depicts an instance where a divergent nozzle 708 has been obstructed by a plug 718 that has formed within the heated zone 714 and been removed. Advantageously, a divergent nozzle can be cleaned using a forward-feeding cleaning cycle. In one embodiment, a forward feeding cleaning cycle starts by extruding a portion of plastic onto a print bed such that the plastic adheres to the print bed. Alternatively, the system may deposit the material onto a cleaning area located at a back of the printing system away from the normal build platform or on any other appropriate surface as the disclosure is not so limited. After attaching to the surface, the system is cooled down to permit the material located within the heated zone 714 to cool below the melting temperature of the material. After solidification, the print bed and nozzle are moved relative to each other to extract the plug 718 from the nozzle 708. For example, the print bed might be moved down in the z direction. Alternatively, a printer head including the nozzle might be moved in a vertical z direction away from the print bed. Additionally, in some embodiments, a feeding mechanism associated with the feed material is driven to apply an additional force to the material as the plug is pulled out of the nozzle. Either way, the plug is then pulled out of the nozzle, advantageously removing debris previously stuck to the wall, and is done without having to retract the feed material from the nozzle through the feed path. While any appropriate material may be used with a divergent nozzle, in some embodiments, a divergent nozzle is used with a material including nylon. This may be beneficial because the coefficient of thermal expansion for nylon causes it to pull away from the nozzle slightly during cooling and nylons exhibit low coefficient of friction. Again, the use of polytetrafluoroethylene within one, or both of the cold feed zone and the heated zone, may help facilitate the easy removal of plugs formed within the nozzle.

While a method of use in which the divergent nozzle is cleaned by attaching a plug to a surface, in another embodiment, a cleaning cycle is performed by simply extruding a section of plastic into free air. The plastic may then be permitted to cool prior to being removed by hand or using an automated process. When the material is removed, any plug attached to that material is also removed.

In another embodiment, a forward feeding cleaning cycle is used with a slightly convergent nozzle. For example, convergent nozzles with an outlet to inlet ratio of 60% or more might be used, though other outlet to inlet ratios are also possible. The forward extrusion cleaning method for such a nozzle includes extruding a section of molten material, and optionally attaching it to the print bed. The heated nozzle is then allowed to cool. During the cooling process, the ejected portion of material is pulled such that the material located within the heated zone is stretched, thereby reducing a diameter of the material. The material may be stretched to a degree such that the diameter of the material located within the heated zone is less than a diameter of the nozzle outlet. Additionally, once the material has cooled, further pulling enables diameter contraction through the Poisson's ratio of the material, thereby further facilitating removal of the remnant located within the nozzle. In some embodiments, the material is stretched by applying a force by hand, or other external means, to the extruded material. In other embodiments where the material is attached to a surface, the printer head and/or surface are displaced relative to each other as noted above to apply a force to the material to provide the desired structure. The above described method enables the feed forward cleaning of a slightly convergent nozzle to be cleaned with forward material flow.

While a divergent nozzle has been discussed above, embodiments in which a straight nozzle is used for FFF printing are also contemplated. FIG. 19A depicts a nozzle 720 including an inlet 724 that is substantially the same size as nozzle outlet 722. A material such as a continuous core filament 2 passes through a cold feed zone 712 and into a heated zone 714. In one embodiment, the cold feed zone is a low friction cold-feed zone made from a material with a low coefficient of thermal conduction such as polytetrafluoroethylene. Correspondingly, the heated zone 714 is made from a more thermally conductive material such as copper, stainless steel, brass, or the like. Regardless of the specific construction, after melting, the continuous core filament 2 is deposited on, and attached to, a build platen 16 or other appropriate surface. Straight nozzles are ideally suited to small diameter filaments, on the order of about 0.001" up to 0.2". However, embodiments in which materials with diameters both greater than and less than those noted above are used with a substantially straight nozzle are also contemplated. Without wishing to be bound by theory, the low thermal mass associated with these small filaments permits them to heat up quickly. Additionally, the small dimensions permit these materials to be extruded at substantially the same size as they are fed into the print head. Similar to a divergent nozzle, a substantially straight nozzle offers the advantages of forward feeding cleaning cycles that enables a cooled plug to be removed from the tip and substantially avoiding collecting particles and debris within the nozzle.

A nozzle similar to that described in FIG. 19A can also be used with a typical green towpreg 734. However, this may result in clogging similar to typical three dimensional printing systems using a green towpreg. The clogging is a result of trying to "push" a flexible composite strand through a nozzle in the initial stitching operation. FIG. 19B illustrates what happens when a green towpreg is output through nozzle 720 during an initial stitching operation to attach it to a part or build plate. Namely, instead of being pushed through the nozzle as intended, the individual fibers in the green towpreg 734 tend to stick to the walls of the nozzle and commensurately start to bend and curl up at 736. Put another way, the flexible fibers located within a green or flexible towpreg are likely to delaminate and become clogged in the nozzle. Flexible materials may include, but are not limited to, a molten thermoplastic and/or un-cured plastic for two part mixed epoxy or laser cured resins, though other flexible materials are also possible.

In contrast to the above, a stitching process associated with a preimpregnated continuous core filament within a divergent nozzle does not suffer the same limitations. More specifically, FIGS. 19C-19E illustrate a method of stitching using a rigid preimpregnated continuous core filament fed through a divergent nozzle, such that clogging is reduced, or substantially eliminated. FIG. 19C shows a continuous core filament 2 located within the cold feed zone 712. Depending on the particular embodiment, the material may be located on the order of 5 inches or more from the heated zone 714, though other distances are also contemplated. Additionally, in embodiments where the material has a larger thermal capacity and/or stiffness, it may be located closer to the heated zone 714 to provide pre-heating of the material prior to stitching. While located within the cold feed zone 712, which is below a melting temperature of the matrix, the continuous core filament 2 remains substantially solid and rigid. The continuous core filament 2 is maintained in this position until just prior to printing. At that point, the continuous core filament 2 is quickly stitched through the nozzle, i.e. displaced through the nozzle outlet, see FIG. 19D. Since the cold-feed zone 712 feeds into a larger cavity corresponding to the heated zone 714, when the material is stitched, the continuous core filament 2 is constrained from touching the walls of the heated zone 714 by portion of the filament still located in the outlet of the cold feed zone, see FIG. 19D. By performing the stitching quickly, melting of the matrix may be minimized to maintain a stiffness of the composite material. By maintaining a stiffness of the material and preventing melting until the material has been stitched, it is possible to prevent fibers from peeling off, curling and/or clogging within the nozzle. This may enable the feed material to be more easily pushed into, and through, the hot-melt zone. In some embodiments, a blast of compressed air may be shot through the nozzle prior to and/or during stitching in order to cool the nozzle to reduce the chance of sticking to the sides of the nozzle. Additionally, heating of the heated zone 714 of the nozzle may be reduced or eliminated during a stitching process to also reduce the chance of sticking to the sides of the nozzle.

As feeding of the continuous core filament 2 continues, the continuous core filament 2 eventually contacts the build platen 16, or other appropriate surface. The continuous core filament 2 is then dragged across the surface by motion of the nozzle relative to the build platen 16. This results in the continuous core filament 2 contacting the walls of the heated zone 714 as illustrated in FIG. 19E. Alternatively, instead of translating the printer head, the material could be driven to a length longer than a length of the nozzle. When the outlet of the nozzle is blocked by a previous layer of the part, or by the print bed, the material will buckle and contact the walls of the heated zone 714. Regardless of the particular method employed, after contacting the walls of the heated zone 714, the continuous core filament 2 is heated up to a desired deposition temperature capable of fusing the deposited material to a desired surface and/or underlying previously deposited layers thus enabling three-dimensional printing. For example, once translation of the print head begins, the matrix material contacts a wall of the heated zone and is heated to a melting temperature of the matrix material. Stitching speeds obtained with a system operated in the manner described above, was capable of stitching speeds between about 2500 mm/min and 5000 mm/min. However, the stitching speed will vary based on nozzle heating, matrix material, and other appropriate design considerations. While a particular stitching method has been described above, it should be noted that other types of stitching and melting techniques could also be employed as the disclosure is not limited to any particular technique.

Figure 20A:
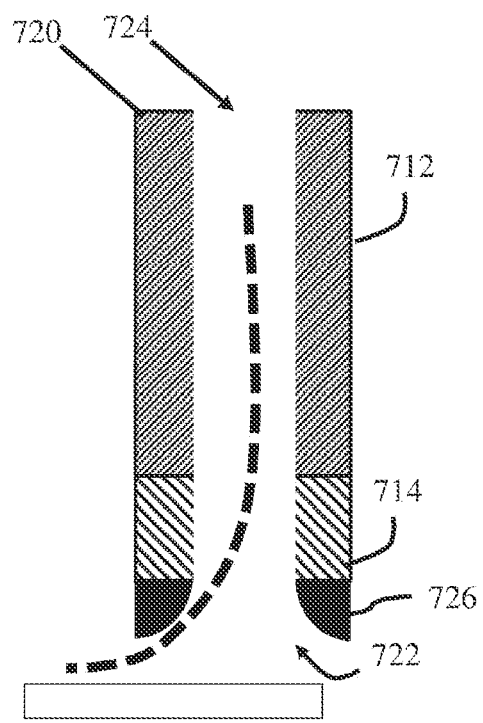
FIG. 20A is a schematic representation of a multi-material nozzle with a low friction cold feeding zone.

As also depicted in FIGS. 19C-19E, in some embodiments, the nozzle 708 may include a rounded or chamfered lip 726, or other structure, located at a distal end of the nozzle outlet 716. This may serve two purposes. First, as noted previously, a gradual transition at the nozzle outlet may help to avoid fracturing of the continuous core. Additionally, in some embodiments, the lip 726 is positioned such that the lip applies a downward force to the continuous core filament 2 as it is deposited. This may in effect applying a compaction force to the material as it is deposited which may "iron" the continuous core filament down to the previous layer. As noted above compaction forces applied to the material may offer multiple benefits including increased strength and reduced void space to name a few. This compaction force may be provided by positioning the lip 726 at a distance relative to a deposition surface that is less than a diameter of the continuous core filament 2. However, compaction forces provided using distances greater than a diameter of the continuous core filament are also possible for sufficiently stiff materials. This distance may be confirmed using an appropriate sensor, such as a range finder as noted above. In some embodiments, the lip 726 is incorporated with a substantially straight nozzle 720 or a slightly convergent nozzle as the disclosure is not so limited, see FIG. 20A.

Figure 20B:
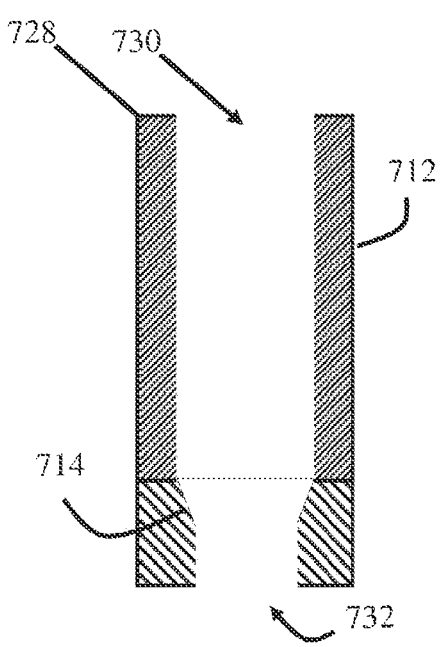
FIG. 20B is a schematic representation of a slightly convergent nozzle including a low friction cold feeding zone.

While the above embodiments have been directed to divergent and straight nozzles including a cold feed zone and a separate heated zone, embodiments in which a convergent nozzle includes a separate cold feed zone and heated zone are also contemplated. For example, FIG. 20B shows an nozzle 728 including a nozzle inlet 730 that feeds into a cold feed zone 712 which is in fluid communication with a heated zone 714. The heated zone 714 is incorporated with a convergent nozzle outlet 732.

In embodiments using a high-aspect ratio convergent nozzle, it may be desirable to use a nozzle geometry that is optimized to prevent the buildup of feed material and/or to reduce the required feed pressure to drive the material through the nozzle outlet. FIG. 21A shows a typical FFF nozzle 800 including an inlet 806 that is aligned with an internal wall 802. The internal wall 802 extends up to a convergent section 804 that leads to a nozzle outlet 808 with an area that is less than an area of the inlet 806. FIGS. 21B-21D depict various geometries including smooth transitions to reduce a back pressure generated within the nozzle.

In one embodiment, as depicted in FIG. 21B, a nozzle 810 includes an inlet 806 and an internal wall 812 with a first diameter. Initially, the internal wall 812 is vertical and subsequently transitions to a tangential inward curvature 814. After about 45 degrees of curvature, an inflection point 816 occurs and the internal wall reverses curvature and curves until the internal wall 812 is vertical. The resulting nozzle outlet 818 is aligned with the inlet 810, but has a reduced second diameter. Additionally, the resulting exit flow from the outlet will be aligned with the inlet flow, though flows through the outlet that are not aligned with the inlet are also contemplated.

When a lower degree of alignment of polymer chains is desirable, the first inward curving section 814 depicted in FIG. 21B can be eliminated, such that the final geometry that turns the flow back into the extruded direction does so after a more typical chamfered inlet. One such embodiment is depicted in FIG. 21C. As depicted in the figure, a nozzle 820 includes an internal wall that transitions to a downwards oriented curvature 822 directed towards the nozzle outlet 824. FIG. 4D depicts another embodiment in which a nozzle 826 transitions to a standard chamfered nozzle section 828 which extends up to a point 830 where it transitions to a downwards oriented curvature 832 to define a nozzle outlet 834. While particular nozzle geometries have been depicted in figures and described above, should be understood that other types of nozzle geometries might also be used as the disclosure is not so limited.

Figure 22:
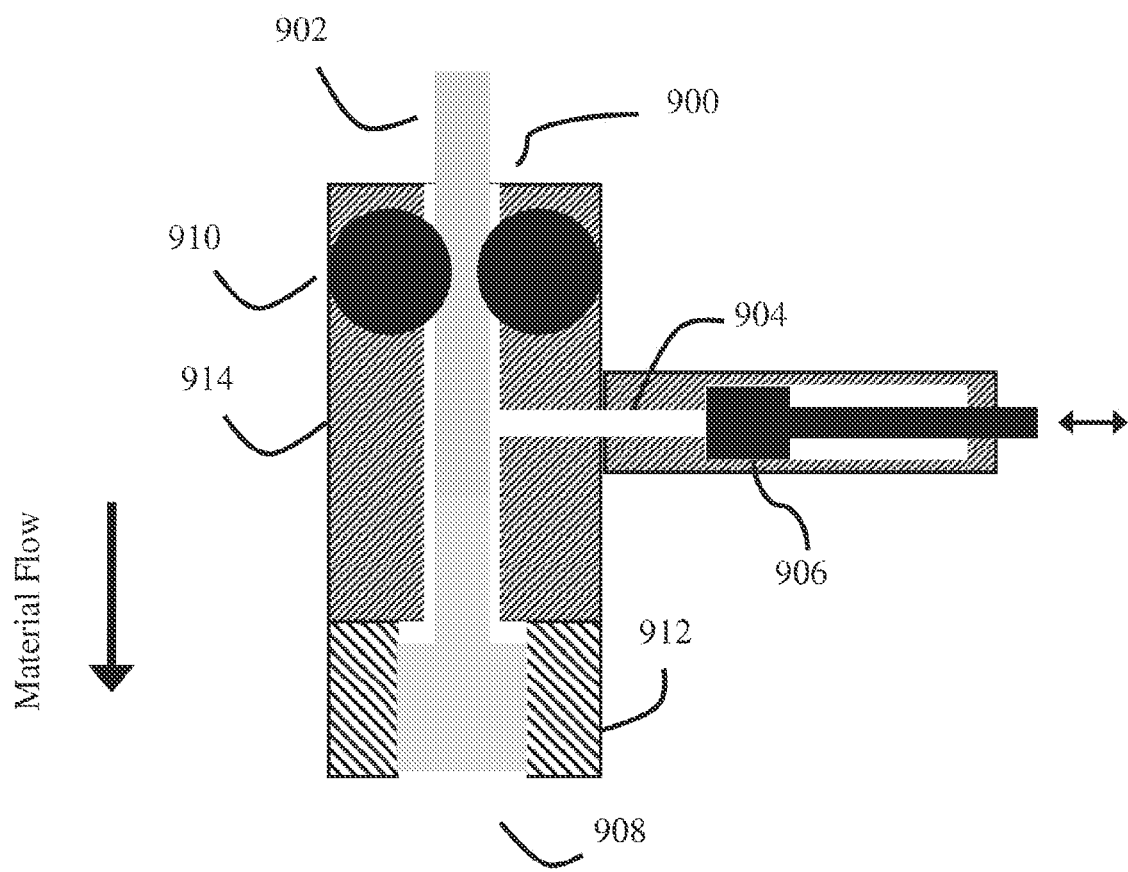
FIG. 22 is a schematic representation of an anti-drip nozzle and pressure reduction system.
Figure 23:
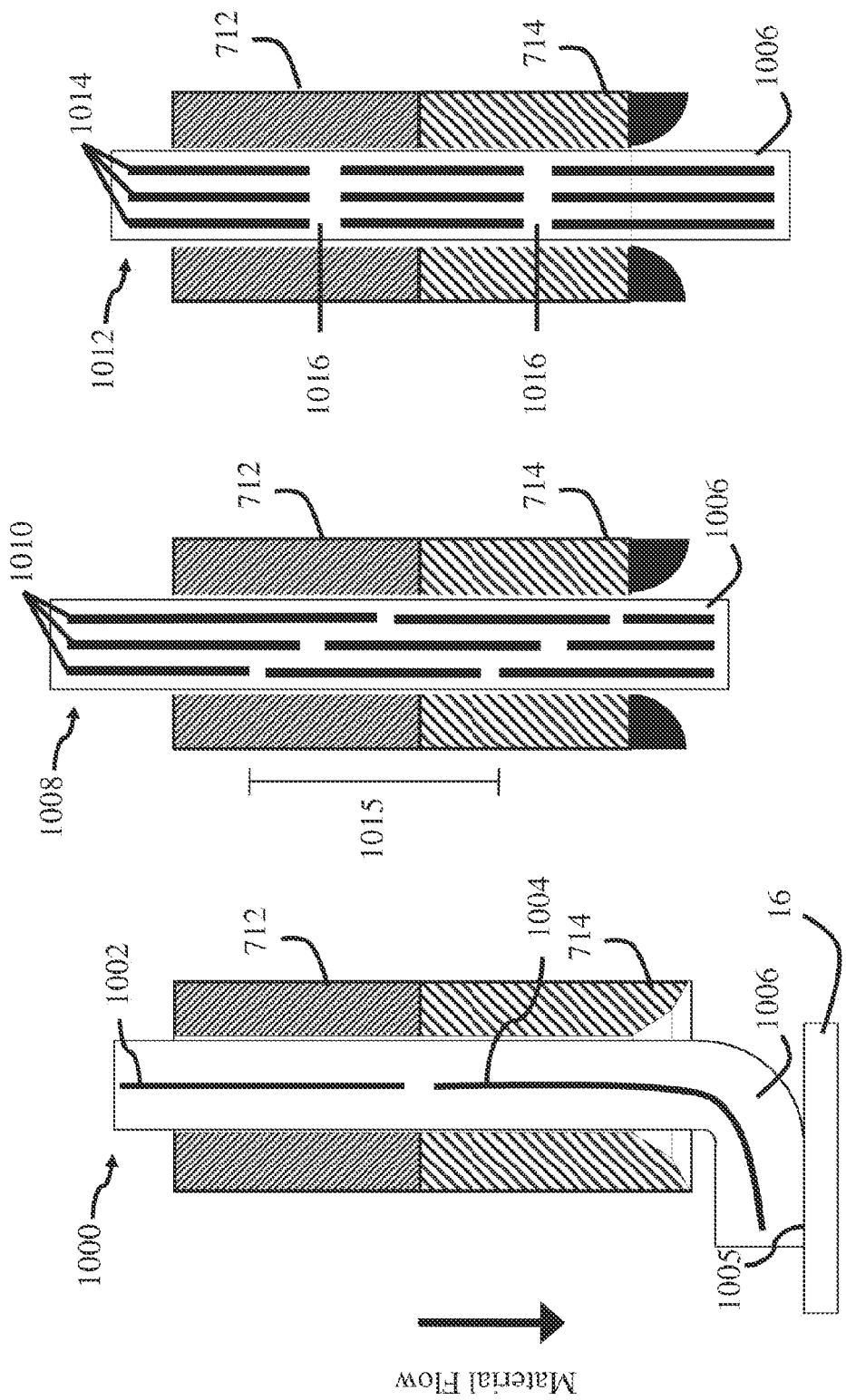
FIG. 23A is a schematic representation of a semi-continuous core filament positioned within a nozzle.
FIG. 23B is a schematic representation of a semi-continuous core filament with overlapping strands positioned within a nozzle.
FIG. 23C is a schematic representation of a semi-continuous core filament with aligned strands and positioned within a nozzle.
Figure 24:
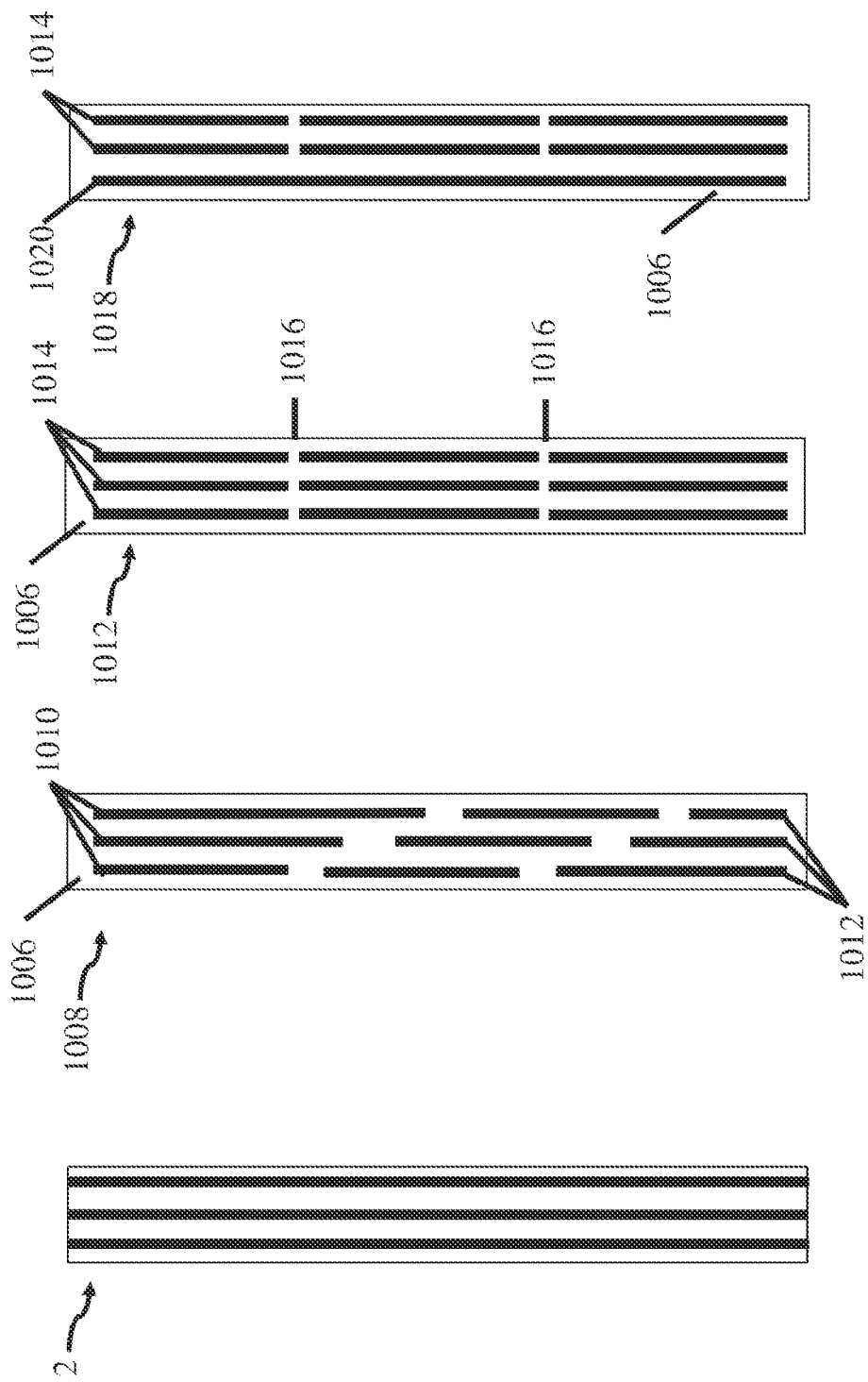
FIG. 24A is a schematic representation of a multifilament continuous core.
FIG. 24B is a schematic representation of a semi-continuous core filament with offset strands.
FIG. 24C is a schematic representation of a semi-continuous core filament with aligned strands.
FIG. 24D is a schematic representation of a semi-continuous core filament with aligned strands and one or more continuous strands.

In some embodiments, a nozzle includes one or more features to prevent drips. For example, a nozzle may include appropriate seals such as one or more gaskets associated with a printing nozzle chamber to prevent the inflow of air into the nozzle. This may substantially prevent material from exiting the nozzle until material is actively extruded using a feeding mechanism. In some instances, it may be desirable to include other features to prevent dripping from the nozzle as well while printing is stopped. In one specific embodiment, a nozzle may include a controllable heater that can selectively heat the nozzle outlet to selectively start and stop the flow of material form the nozzle. In this regard, a small amount of the resin near the outlet may solidify when the heater is power is reduced to form a skin or small plug to prevent drooling from the outlet. Upon reenergizing or increasing the heater power, the skin/plug re-melts to allow the flow of material from the nozzle. In another embodiment, the nozzle includes features to selectively reduce the pressure within the nozzle to prevent dripping. This can be applied using a vacuum pump, a closed pneumatic cylinder, or other appropriate arrangement capable of applying suction when nozzle dripping is undesirable. The pneumatic cylinder is then returned to a neutral position, thus eliminating the suction, when printing is resumed. FIG. 22 depicts one such embodiment. In the depicted embodiment, an extrusion nozzle 900 has a material 902 that is fed past one or more gaskets 910 and into a cold feed zone 914 and heated zone 912 prior to exiting nozzle outlet 908. An air channel 904 is connected to the cold feed zone 914 and is in fluid communication with a pneumatic cylinder 906. As depicted in the figure, a gap is present between the material 902 and the cold feed zone 914 through which air may pass. Therefore, the air channel 904 is in fluid communication with both the cold feed zone 914 as well as with material located within the heated zone 912. During operation, the pneumatic cylinder 906 is actuated from a first neutral position to a second position to selectively applying suction to the air channel 904 when printing is stopped. Since the air channel 904 is in fluid communication with material within the heated zone 912, the suction may substantially prevent dripping of polymer melt located within the heated zone. Once printing resumes, the pneumatic cylinder 906 may be returned to the neutral position.

While various embodiments of nozzles in cutting mechanisms are described above, in some embodiments, it is desirable to use a towpreg, or other material, that does not require use of a cutting mechanism to cut. In view of the above, the inventors have recognized the benefits associated with using a material including a semi-continuous core strand composite with a three-dimensional printer. In such an embodiment, a material including a semi-continuous core has a core that has been divided into plurality of discrete strands These discrete strands of the core may either correspond to a solid core or they may correspond to a plurality of individual filaments bundled together as the disclosure is not so limited. Additionally, as described in more detail below, these discrete segments of the core may either be arranged such that they do not overlap, or they may be arranged in various other configurations within the material. In either case, the material may be severed by applying a tension to the material as described in more detail below. The tension may be applied by either backdriving a feed mechanism of the printer and/or translating a printer head relative to a printed part without extruding material from the nozzle.

In one embodiment a material including semi-continuous core includes segments that are sized relative to a melt zone of an associated three-dimensional printer nozzle such that the individual strands may be pulled out of the nozzle. For example, the melt zone could be at least as long as the strand length of the individual fibers in a pre-preg fiber bundle, half as long as the strand length of the individual fibers in a pre-preg fiber bundle, or any other appropriate length. In such an embodiment, at the termination of printing, the material including a semi-continuous core is severed by tensioning the material. During tensioning of the material, the strands embedded in material deposited on a part or printing surface provide an anchoring force to pull out a portion of the strands remaining within the nozzle. When the individual strands are appropriately sized relative to a melt zone of the nozzle as noted above, strands that are located within both the extruded material and with the nozzle are located within the melt zone of the nozzle. Consequently, when tension is applied to the material, the segments located within the melt zone are pulled out of the melt zone of the nozzle to sever the material. In embodiments where longer strands are used, instances where at least some strands are pulled out of a molten zone of the deposited material and retained within the nozzle are also contemplated. The above noted method may result in vertically oriented strands of core material. This vertical strands may optionally be pushed over by the print head, or they are subsequently deposited layers. By strategically placing vertically oriented strands within a material layer, it may be possible to increase a strength of the resulting part in the z direction by providing enhanced bonding between the layers.

In another embodiment, a semi-continuous core embedded in a corresponding matrix material includes a plurality of strands that have discrete, indexed strand lengths. Therefore, termination of the semi-continuous core occurs at pre-defined intervals along the length of the material. Initially, since the terminations are located at predefined intervals, the strand length may be larger than a length of the melt zone of an associated nozzle. For example, in one specific embodiment, a semi-continuous core might include individual strands, or strand bundles, that are arranged in 3-inch lengths and are cleanly separated such that the fibers from one bundle do not extend into the next. When using such a material, a three-dimensional printer may run a path planning algorithm to lineup breaks in the strand with natural stopping points in the print. In this embodiment, there is a minimum fill size which scales with the semi-continuous strand length because the printer cannot terminate the printing process until a break in the semi-continuous strand is aligned with the nozzle outlet. Therefore, as the strand length increases, in some embodiments, it may be advantageous to fill in the remainder of the layer with pure resin which has no minimum feature length. Alternatively, a void may be left in the part. In many geometries, the outer portion of the cross section provides more strength than the core. In such cases, the outer section may be printed from semi-continuous strands up until the last integer strand will not fit in the printing pattern, at which point the remainder may be left empty, or filled with pure resin.

In another embodiment, a material may include both of the above concepts. For example, indexed continuous strands may be used, in parallel with smaller length bundles located at transition points between the longer strands, such that the melt zone in the nozzle includes sufficient distance to drag out the overlapping strands located in the melt zone. The advantage of this approach is to reduce the weak point at the boundary between the longer integer continuous strands. During severance of a given core and matrix material, it is desirable that the severance force is sufficiently low to prevent part distortion, lifting, upstream fiber breaking, or other deleterious effects. In some cases, strands may be broken during the extraction, which is acceptable at the termination point. While the strand length can vary based on the application, typical strand lengths may range from about 0.2" up to 36" for large scale printing.

FIGS. 23A-24D depict various embodiments of a semi-continuous core filament being deposited from a nozzle. As contrasted to the continuous core filament 2 depicted in FIG. 24A.

As depicted in the FIG. 23A, a semi-continuous core filament 1000 including a first strand 1002 and a second strand 1004 located within the matrix material 1006. The semi-continuous core filament 1000 enters a cold feeding zone 712 of a nozzle which is advantageously below the glass transition temperature of the matrix material. The semi-continuous material 1000 subsequently flows through heated zone 714, sometimes referred to as a melt zone. The matrix material 1006 present in the semi-continuous material 1000 is melted within the heated zone 714 prior to deposition. Upon exit from the nozzle, semi-continuous core filament 1000 is attached to a part or build platen 16 at anchor point 1005. The severance procedure can then occur in a number of ways. In one embodiment, severance occurs by moving the print head forward relative to the anchor point 1005, without advancing the semi-continuous core filament 1000. Alternatively, the print head may remain stationary, and the upstream semi-continuous core filament 1000 is retracted to apply the desired tension. Again by appropriately sizing the strand length to a length of the heated zone to ensure that an entire length of the strand located within the nozzle is in the heated zone 714, the tension provided by the anchor point 1005 permits the remaining portion of the second strand 1004 located within the nozzle to pull the remnant of the embedded strand from the heated nozzle.

While FIG. 23A showed two individual strands, FIGS. 23B and 24B show a semi-continuous core filament 1008 including a distribution of similarly sized strands 1010 embedded in a matrix material 1006 and located in a printer head similar to that described above. While three strands are shown in a staggered line, it should be understood that this is a simplified representation of a random, or staggered, distribution of strands. For example, material may include about 1,000 strands of carbon fiber (a 1 k tow). While a distribution of strand lengths 1015 and positioning of the individual strands is to be expected, the strands 214 may be sized and distributed such that there are many overlapping strands of substantially similar length. By ensuring that heated zone 714 is proportional to a strand length 1015, the fiber remnant can be more easily pulled from the nozzle. For example, and without wishing to be bound by theory, the strands that are located further downstream, i.e. mostly deposited within a part, will pull out from the nozzle easily. The strands that are mostly located in the nozzle will most likely remain within the nozzle. The strands that are half in the nozzle, and half out, will stochastically stay in the nozzle or get pulled out by the anchor point 1005 due to the roughly equivalent forces being applied to roughly equivalent lengths of the strands contained within the deposited material and the nozzle. The various parameters of the nozzle design such as the design of the cold feeding zone 714 and the nozzle outlet transition as well as the viscosity of the polymer melt, the degree of cooling of the printed semi-continuous core filament upon exit from the nozzle outlet, as well as other appropriate considerations will determine how the semi-continuous core filament is severed when a tension is applied to the material.

Figure 25:
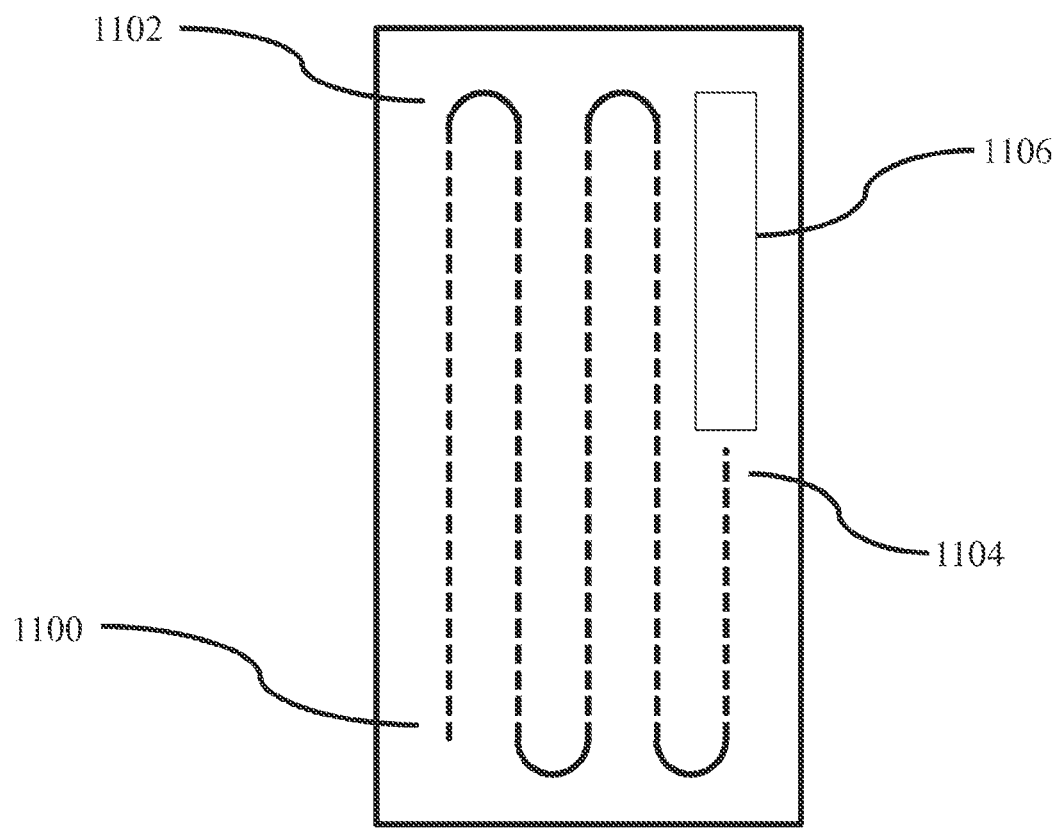
FIG. 25 is a schematic representation of a fill pattern using a semi-continuous core filament.

FIGS. 23C and 24C shows an indexed semi-continuous core filament 1012 where the termination of the core material is substantially complete at each section, thereby enabling clean severance at an integer distance. As depicted in the figures, the material includes individual sections of one or more core segments 1014 embedded within a matrix material 1006. The individual sections of core material are separated from adjacent sections of core material at pre-indexed locations 1016. Such an embodiment advantageously permits the clean severance of the material at a prescribed location. This is facilitated by the individual strands in different sections not overlapping with each other. This also enables the use of strand lengths that are larger than a length of the associated heated zone 714 of the nozzle. This also permits use of the smaller heated zone 714 in some embodiments. However, in addition to the noted benefits, since the individual strands in different sections do not overlap, the material will exhibit a reduced strength at these boundary locations corresponding to the pre-indexed locations 1016 depicted in the figures. FIG. 25 illustrates the use of such a semi-continuous core filament. As depicted in the figure, multiple strands 1100 are deposited onto a part or build platen. The strands 1100 are deposited such that they form turns 1102 as well as other features until the print head makes it final pass and severs the material at 1104 as described above. Since the individual strands are longer than the remaining distance on the part, the remaining distance 1106 may either be left as a void or filled with a separate material such as a polymer.

FIG. 24D shows an example of a hybrid approach between a semi-continuous core filament and a continuous core filament. In the depicted embodiment, a material 1018 includes multiple discrete sections including one or more core segments 1014 embedded within a matrix 1006 that are located at pre-indexed locations similar to the embodiment described above in regards to FIGS. 24C and 25C. The material also includes a continuous core 1020 embedded within the matrix 1006 extending along a length of material. The continuous core 1020 may be sized such that it may be severed by a sufficient tensile force to enable severing of the material at the pre-indexed locations simply by the application of a sufficient tensile force. Alternatively, any of the various cutting methods described above might also be used.

While the above embodiments have been directed to materials that may be severed without the use of a cutting mechanism. It should be understood that semi-continuous core filaments may also be used with three dimensional printing systems including a cutting mechanism as the disclosure is not so limited.

Figure 26:
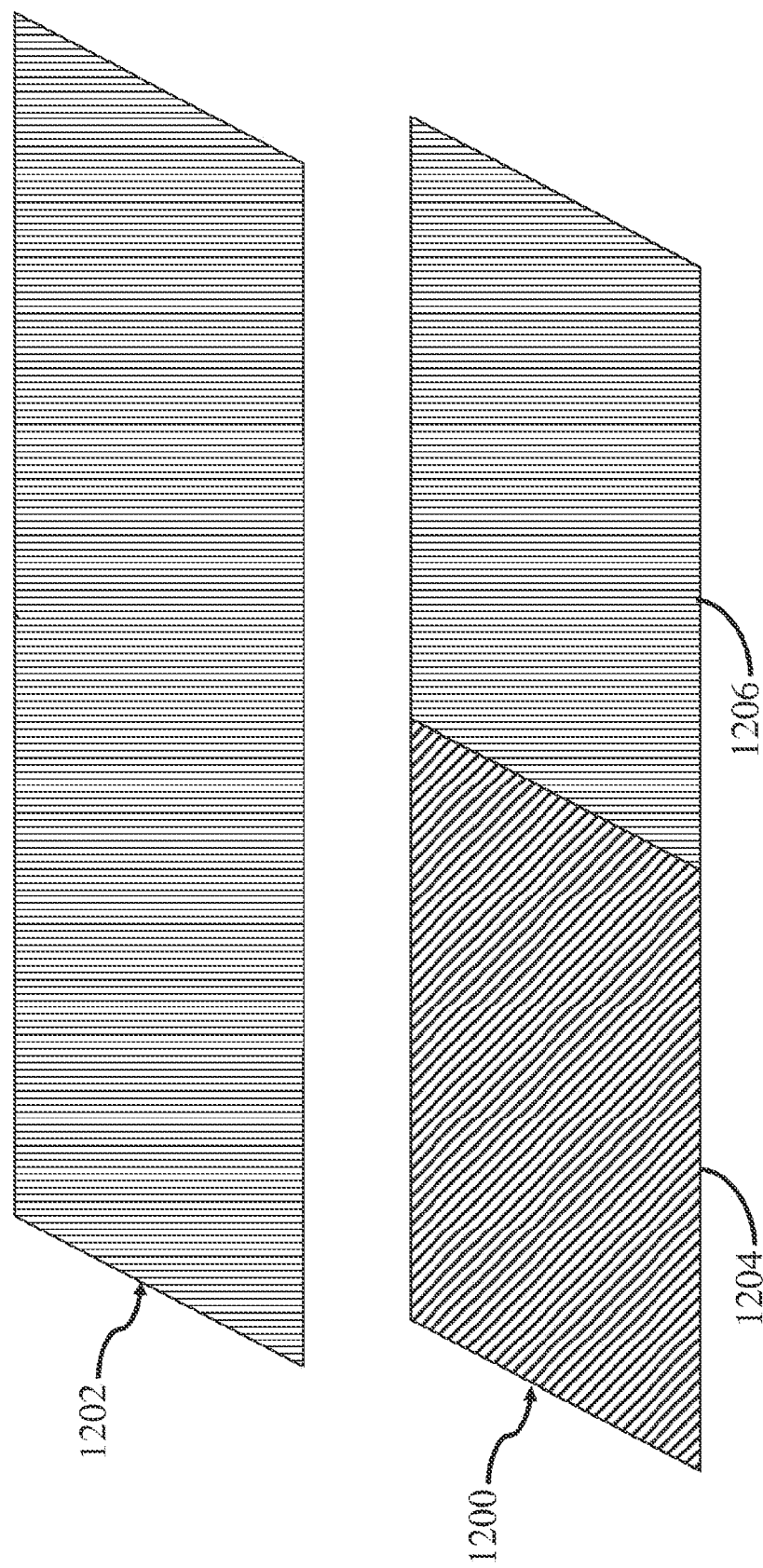
FIG. 26 is a schematic representation of multiple printed layers formed by the three-dimensional printing system and/or process with the different layers and different portions of the layers including different fiber directions.

In traditional composite construction successive layers of composite might be laid down at 0°, 45° 90° and other desired angles to provide the part strength in multiple directions. This ability to control the directional strength of the part enables designers to increase the strength-to-weight ratio of the resultant part. Therefore, in another embodiment, a controller of a three dimensional printer may include functionality to deposit the reinforcing fibers with an axial alignment in one or more particular directions and locations. The axial alignment of the reinforcing fibers may be selected for one or more individual sections within a layer, and may also be selected for individual layers. For example, as depicted in FIG. 26 a first layer 1200 may have a first reinforcing fiber orientation and a second layer 1202 may have a second reinforcing fiber orientation. Additionally, a first section 1204 within the first layer 1200, or any other desired layer, may have a fiber orientation that is different than a second section 1206, or any number of other sections, within the same layer.

Figure 27:
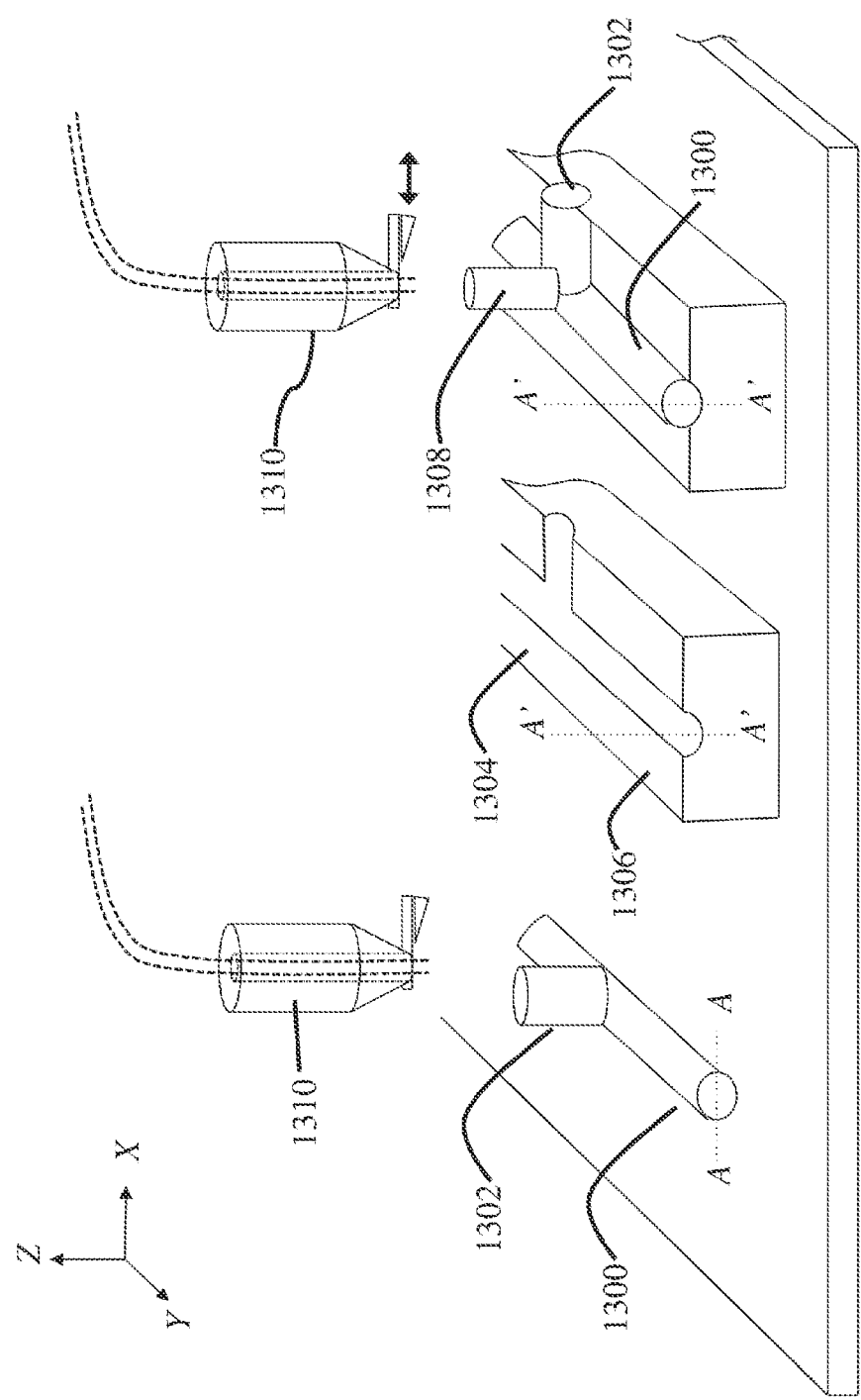
FIG. 27A is a schematic representation of a three dimensional printing process for forming a component in a first orientation.
FIG. 27B is a schematic representation of a fixture to use with the part of FIG. 27A.
FIG. 27C is a schematic representation of a three dimensional printing process for forming a component on the part of FIG. 27A in a second orientation.

The concept of providing axial orientation of the reinforcing fibers to provide directional strength within the part may be taken further with three dimensional printers. More specifically, FIGS. 27A-27C show a method of additive manufacturing of an anisotropic object with a printer head 1310, such as an electric motor or other part that may benefit from anisotropic properties. In the depicted embodiment, a part 1300 has a vertically oriented subcomponent 1302 that is printed with the part oriented with Plane A aligned with the XY print plane in a first orientation. In this particular example, the printed material includes a conductive core such that the printed subcomponent 1302 forms a wound coil of a motor. In the depicted embodiment, the coils are wound around the Z direction. While a particular material for use in printing a motor coil is described, it should be understood that other materials might be used in an anisotropic part for any number of purposes as the current disclosure is not limited to any particular material or application.

In order to form another coil, or other anisotropic subcomponent, on the part 1300, a fixture 1304, shown in FIG. 27B, is added to the print area though embodiments in which this feature is printed during, before, or after the formation of part 1300 are also possible. In one embodiment, the fixture 1304 is positioned at, or below, the print plane 1306 and is contoured to hold the part 1300 during subsequent deposition processes. The fixture may also include vacuum suction, tape, mechanical fasteners, printed snap fits, or any other appropriate retention mechanism to further hold the part during subsequent print processes.

After positioning the fixture 1304, the part 1300 is positioned on fixture 1304, which then holds the part 1300 in a second orientation, with plane A rotated to plane A' such that the next subcomponent 1308 can be added to the part 1300. The subcomponent 1308 is again deposited in the Z direction, but is out of plane with subcomponent 1302, as shown in FIG. 27C. While this example has been described with regards to forming the coiled windings of a motor, any anisotropic object could be formed using a series of fixture rotations of the part, or print head, to enable the continuous core reinforced filaments to be aligned in an optimal direction for various purposes.

Figure 28:
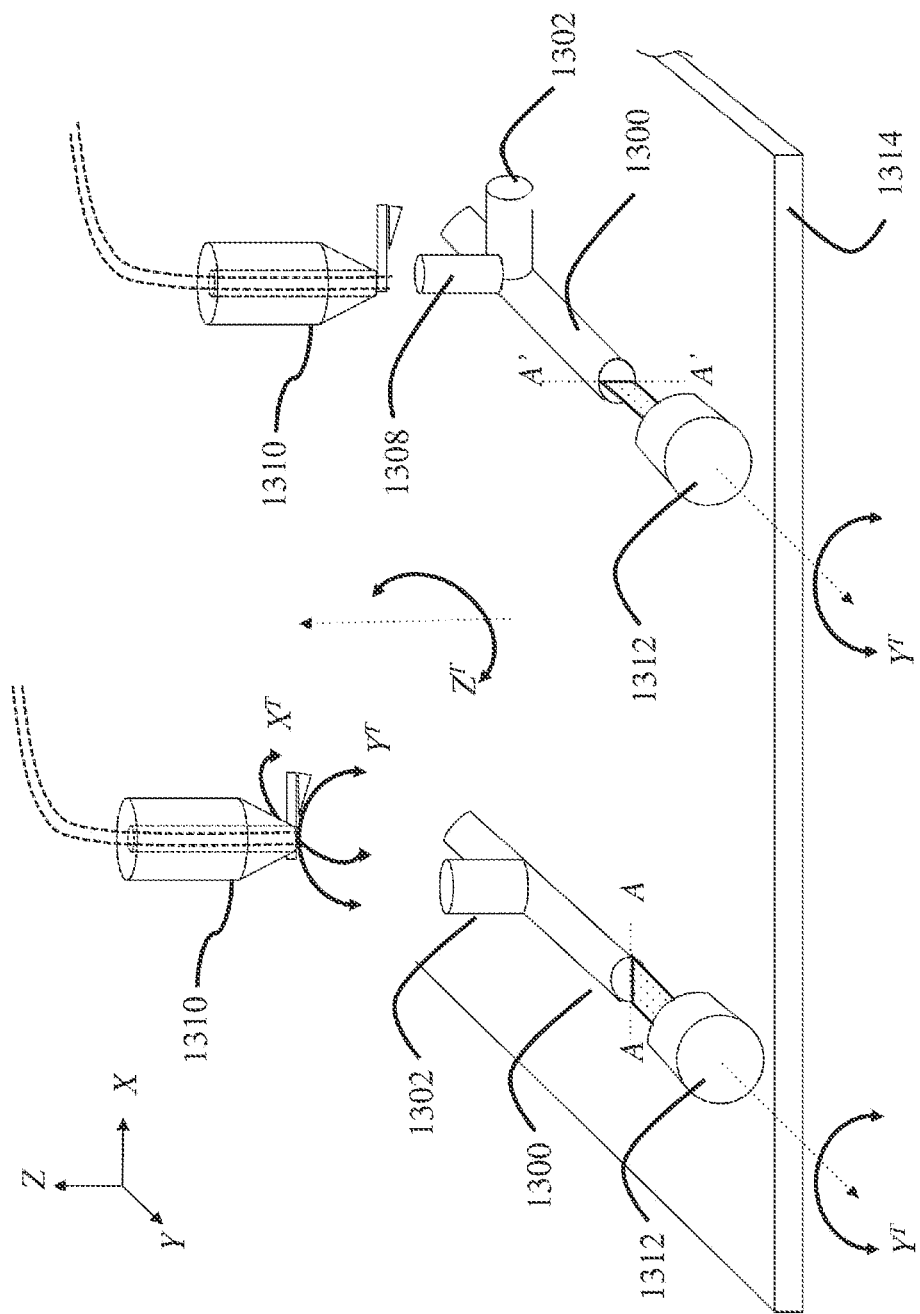
FIG. 28A is a schematic representation of a three dimensional printing process using a multiaxis system in a first orientation.
FIG. 28B is a schematic representation of forming a component in another orientation on the part of FIG. 28A.

FIG. 28A shows the same anisotropic part as formed in the process described in FIGS. 27A-27C, however, instead of making use of a plurality of fixtures, the three dimensional printer is capable of rotating the part 1300 as well as the printer head 1310 about one or more axes. As depicted in the figure, part 1300 is held in place by a rotating axis 1312, which sets and controls the orientation of plane A. In FIG. 28B, rotating axis 1312 has been rotated by 90° to form subcomponent 1308 in a direction that is perpendicular to subcomponent 1302. Conversely, printer head 510 could be pivoted about the XT and/or yT axes to achieve a similar result. As FIGS. 28A-28B show, there are many ways to achieve anisotropic printing. Namely, the part may be moved and rotated, the printer head may be moved and rotated, or a combination of both may be used to print an anisotropic part. It should be understood, that additional degrees of freedom could be added to either the rotation and movement of the part 1300 or the printer head 1310 based on the machine objectives, and part requirements. For example, in an automotive application, rotating axis 1312 may correspond to a rotisserie, enabling rotation of the vehicle frame about the yT axis to enable continuous fibers to be laid in the X-Y plane, the Z-Y plane, or any plane in between. Alternatively, a fluid rotation following the external contours of the vehicular body might be used to continuously deposited material on the vehicle as it is rotated. Such a three dimensional printer might optionally add the XT axis to the printer head to enable full contour following as well as the production of both convex and concave unibody structures.

In addition to rotating the part 1300 and the printer head 1310, in some embodiments, a table 1314 supporting the part 1300 could be rotated about the zT axis to enable spun components of a given fiber direction. Such an embodiment may provide a consistent print are from the print head to the part for core materials that have unique feeding and deposition head requirements that prefer directional consistency.

In another embodiment, the core of a part may be built up as a series of two dimensional planes. The three-dimensional printer may then form, out of plane three dimensional shells over the interior core. The core supports the shells which enables the shells to be constructed on the outside of the core and may run up the sides of the part, over the top, and/or down the back sides of the part, or along any other location. Without wishing to be bound by theory, such a deposition method may aid in preventing delimitation and increase torsional rigidity of the part due to the increased part strength associated with longer and more continuous material lengths. Further running the continuous fiber reinforced materials out of plane provides an out-of-plane strength that is greater than a typical bonded joint.

Figure 29:
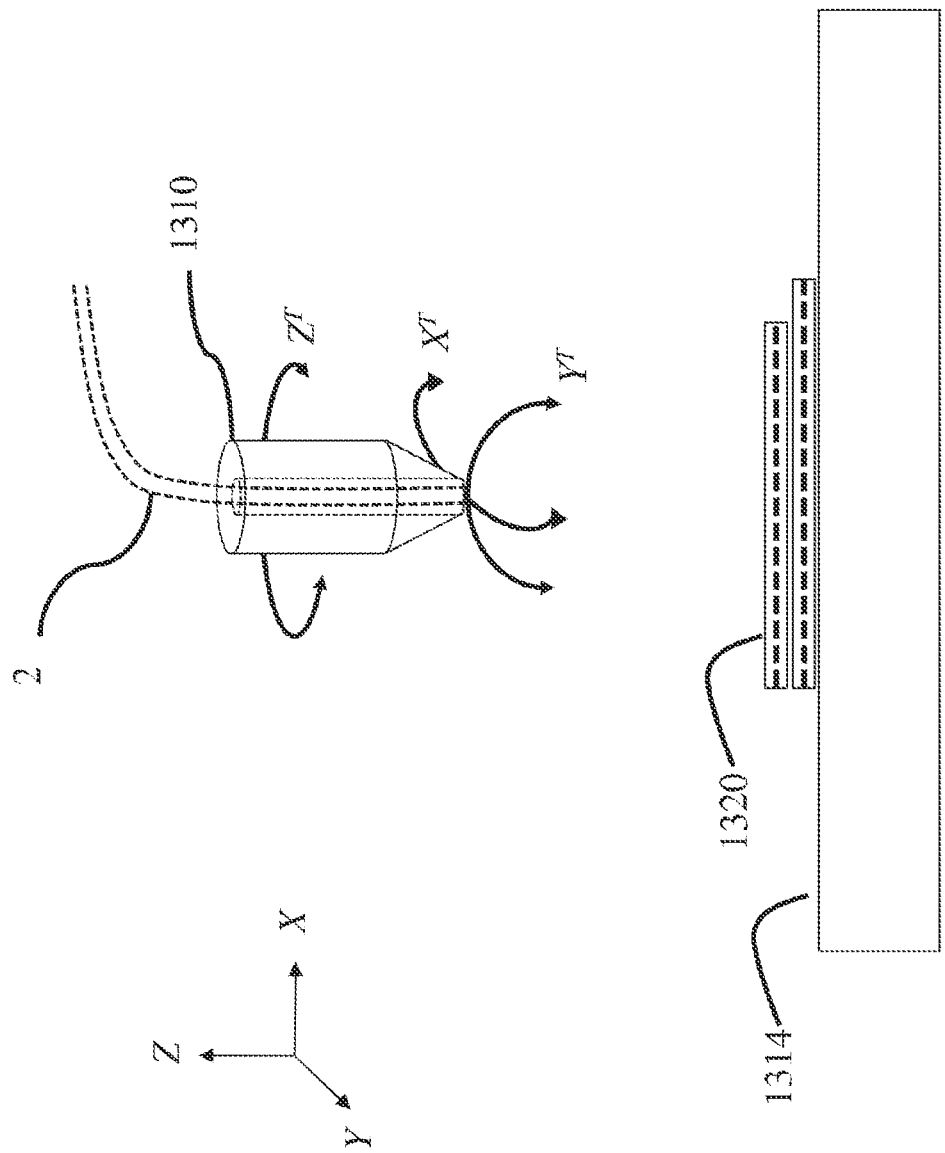
FIG. 29 is a schematic representation of a three dimensional printing system using a continuous core reinforced filament.

FIG. 29 shows a three dimensional printer head 1310 similar to that described above in regards to FIGS. 28A and 28B that can be used to form a part including a three dimensionally printed shell. The printer head 1310 deposits any appropriate consumable material such as a continuous core reinforced filament 2 onto the built platen 1314 in a series of layers 1320 to build a part. The printer head 1310 is capable of articulating in the traditional XYZ directions, as well as pivoting in the XT yT and zT directions. The additional degrees of freedom to pivot the printer head 1310 allow the printer to create shells, and other contiguous core reinforced out of plane layers, as well as two dimensional layers.

Figure 30A:
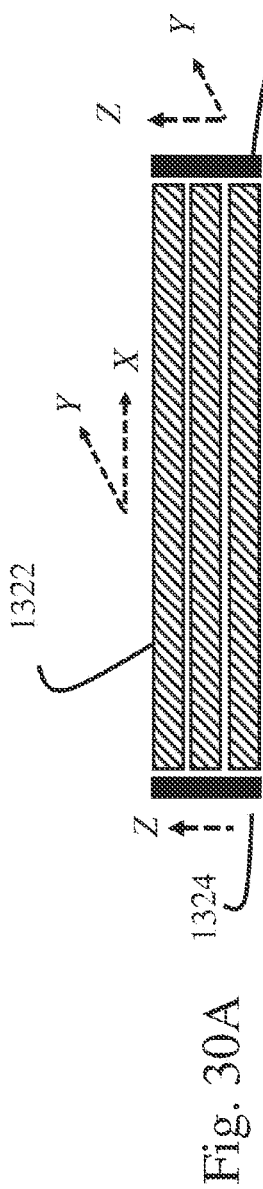
FIG. 30A is a schematic representation of a part including a shell applied to the sides using a three dimensional printing process.
Figure 30B:
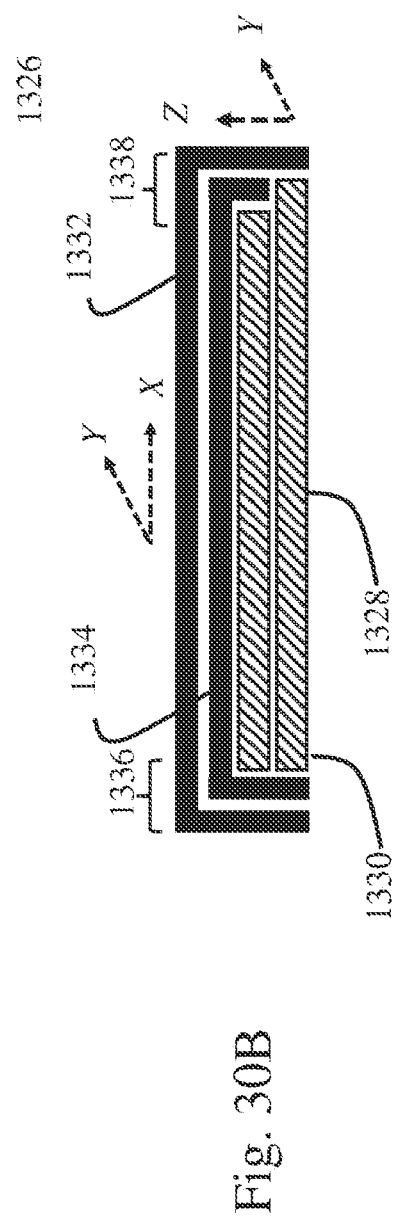
FIG. 30B is a schematic representation of a part including a shell applied to the top and sides using a three-dimensional printing process.
Figure 30C:
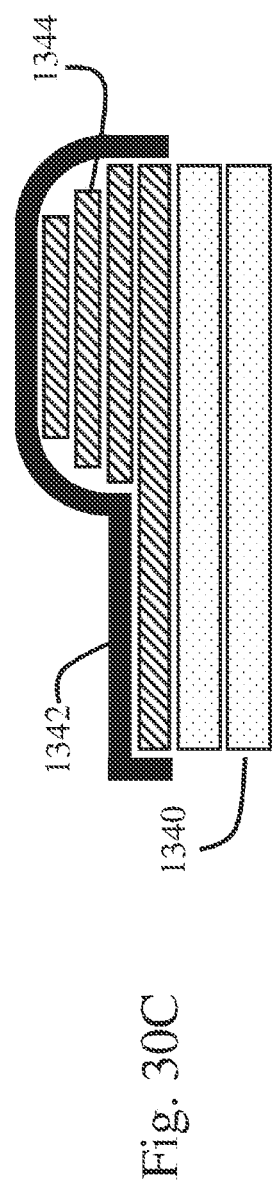
FIG. 30C is a schematic representation of a part including a shell that has been offset from an underlying supporting surface.

FIGS. 30A-30C depict various parts formed using the printer head depicted in FIG. 29. FIG. 30A shows a part including a plurality of sections 1322 deposited as two dimensional layers in the XY plane. Sections 1324 and 1326 are subsequently deposited in the ZY plane to give the part increased strength in the Z direction. FIG. 30B show a related method of shell printing, where layers 1328 and 1330 are formed in the XY plane and are overlaid with shells 1332 and 1334 which extend in both the XY and ZY planes. As depicted in the figure, the shells 1332 and 1334 may either completely overlap the underlying core formed from layers 1328 and 1330, see portion 1336, or one or more of the shells may only overly a portion of the underlying core. For example, in portion 1338 shell 1332 overlies both layers 1328 and 1330. However, shell 1334 does not completely overlap the layer 1328 and creates a stepped construction as depicted in the figure. FIG. 30C shows another embodiment where a support material 1340 is added to raise the part relative to a build platen, or other supporting surface, such that the pivoting head of the three dimensional printer has clearance between the part and the supporting surface to enable the deposition of the shell 1342 onto the underlying layers 1344 of the part core.

The above described printer head may also be used to form a part with discrete subsections including different orientations of a continuous core reinforced filament. For example, the orientation of the continuous core reinforced filament in one subsection may be substantially in the XY direction, while the direction in another subsection may be in the XZ or YZ direction. Such multi-directional parts enable the designer to run reinforcing fibers exactly in the direction that the part needs strength.

Figure 30D:
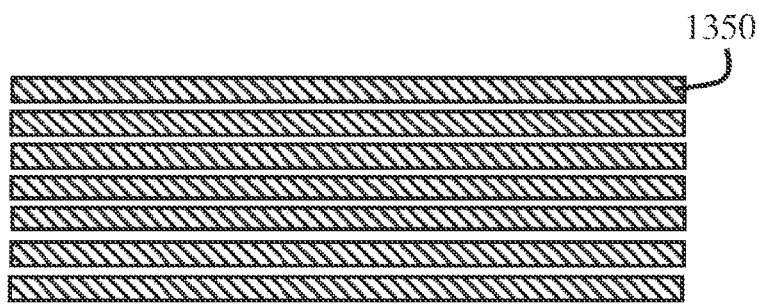
FIG. 30D is a schematic representation of a part formed with a fill material.
Figure 30E:
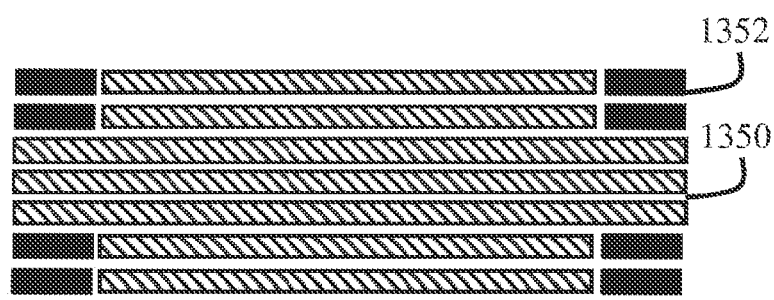
FIG. 30E is a schematic representation of a part formed with composite material extending inwards from the corners and polymer fill in the interior.
Figure 30F:
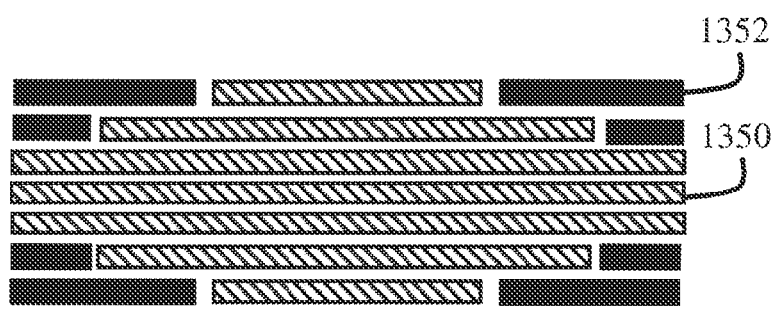
FIG. 30F is a schematic representation of a part formed with composite material extending inwards from the corners and polymer fill in the interior.
Figure 30G:
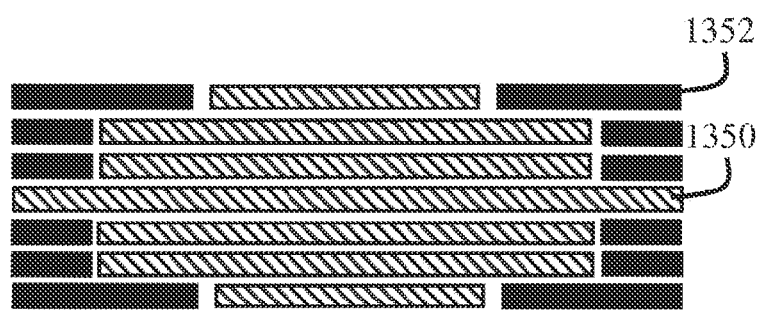
FIG. 30G is a schematic representation of a part formed with composite material extending inwards from the corners and polymer fill in the interior.

The high cost of composite material has been one of the major barriers to widespread adoptions of composite parts. Therefore, in some embodiments a three dimensional printer may utilize a fill pattern that uses high-strength composite material in selected areas and filler material in other locations, see FIGS. 30D-30O. Consequently, in contrast to forming a complete composite shell on a part is described above, a partial composite shell is formed on the outer extremes of a part, to maximize the stiffness of the part for a given amount of composite material used. Low-cost matrix material such as nylon plastic may be used as the fill-in material, though other materials may also be used. A part formed completely from the fill material 1350 is depicted in FIG. 30D. As illustrated in FIG. 30E, a composite material 1352 is deposited at the radially outward most portions of the part and extending inwards for a desired distance to provide a desired increase in stiffness and strength. The remaining portion of the part is formed with the fill material 1350. Alternatively, portions of the build plane may be left unfilled. Depending on the desired strength and/or stiffness, a user may increase or decrease an amount of the composite material 1352 used. This will correspond to the composite material extending either more or less from the various corners of the part. This variation in amount of composite material 1352 is illustrated by the series of figures FIGS. 30D-30O.

When determining an appropriate fill pattern for a given level of strength and stiffness, a control algorithm starts with a concentric fill pattern that traces the outside corners and wall sections of the part, for a specified number of concentric infill passes, the remainder of the part may then be filled using a desired fill material. The resultant structure maximizes the strength of the part, for a minimum of composite usage. It should be understood that while the above process is described for a two dimensional plane, it is also applicable to three dimensional objects as well.

FIGS. 31A-31C show the cross-sections of various embodiments of an airfoil with different fiber orientations within various subsections. It should be understood that while an airfoil as described below, the described embodiments are applicable to other applications and constructions as well.

FIG. 31A shows a method of building each section of the three dimensional part with plastic deposition in the same plane. Specifically, sections 1350, 1352 and 1354 are all constructed in the same XY planer orientation. The depicted sections are attached at the adjoining interfaces, the boundary of which is exaggerated for illustration purposes. In another embodiment, and as depicted in FIG. 31B, a part is constructed with separate sections 1362, 1364, and 1366 where the fiber orientations 1368 and 1372 of sections 1362 and 1366 are orthogonal to the fiber orientation 1370 of section 1364. Without wishing to be bound by theory, by orthogonally orienting the fibers in section 1364 relative to the other sections, the resulting part has a much greater bending strength in the Z direction. Further, by constructing the part in this manner, the designer can determine the relative thickness of each section to prescribe the strength along each direction.

FIG. 31C depicts a shell combined with subsections including different fiber orientations. In this embodiment, sections 1374, 1376, and 1378 are deposited in the same direction to form a core, after which a shell 1386 is printed in the orthogonal direction. The shell 1386 may be a single layer or a plurality of layers. Further, the plurality of layers of shell 1386 may include a variety of orientation angles other than orthogonal to the underlying subsections of the core, depending on the design requirements. While this embodiment shows the inner sections with fiber orientations all in the same direction 1380, 1382, and 1384, it should be obvious that subsections 1374, 1376, and 1378 may be provided with different fiber orientations similar to FIG. 31B as well.

In other embodiments, the continuous core reinforced filament, or other appropriate consumable material, may require a post-cure, such that the part strength is increased by curing the part. Appropriate curing may be provided using any appropriate method including, but not limited to, heat, light, lasers, and/or radiation. In this embodiment, a part may be printed with a pre-preg composite and subject to a subsequent post-cure to fully harden the material. In one specific embodiment, continuous carbon fibers are embedded in a partially cured epoxy such that the extruded component sticks together, but requires a post-cure to fully harden. It should be understood that other materials may be used as well.

Figure 32:
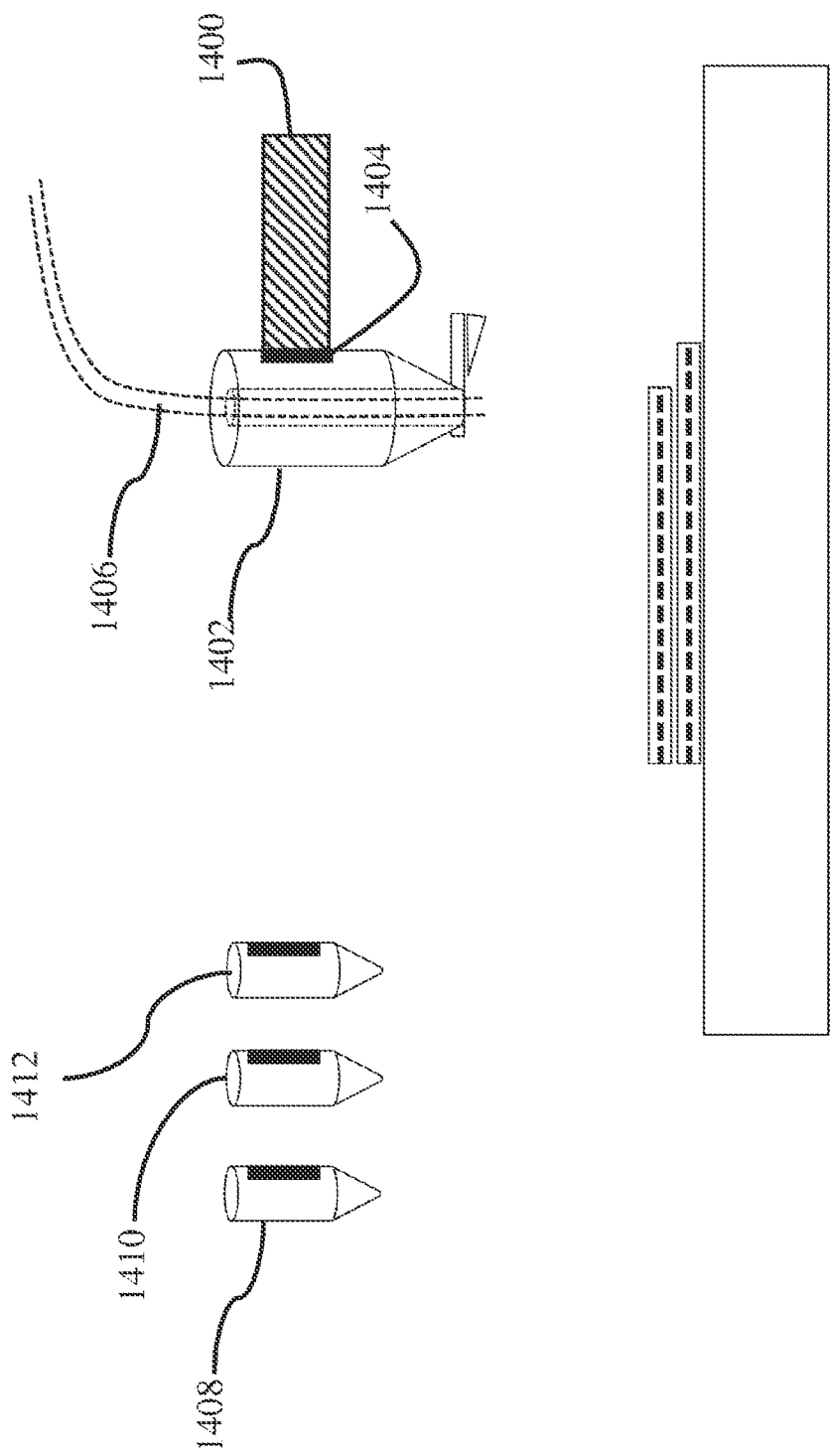
FIG. 32 is a schematic representation of a three dimensional printing system including a print arm and selectable printer heads.

FIG. 32 depicts an optional embodiment of a three dimensional printer with selectable printer heads. In the depicted embodiment, a print arm 1400 is capable of attaching to printer head 1402 at universal connection 1404. An appropriate consumable material 1406, such as a continuous core reinforced filament, may already be fed into the printer head 1402, or it may be fed into the printer after it is attached to the printer 1400. When another print material is desired, print arm 1400 returns printer head 1402 to an associated holder. Subsequently, the printer 1400 may pick up printer head 1408 or 1410 which are capable of printing consumable materials that are either different in size and/or include different materials to provide different. As depicted, such swappable printer heads are used one at a time, and advantageously reduce the mass of the printer head and arm combination. Without wishing to be bound by theory, this enables faster printing of a part due to the reduced inertia of the printer head. In another embodiment, the print arm may have slots for two or more printer heads concurrently. Such heads may feed different material, apply printed colors, apply a surface coating of spay deposited material, or the like. It should be understood that any number of separate selectable print heads might be provided. For example, the print heads may be mounted to a turret, with one print head in the "active" position and the others rotated out of position awaiting for the appropriate time when they may be rotated into the print position. In another embodiment, print arm may 1400 pick up a vision system 1412 for part inspection. Appropriate vision systems include cameras, rangefinders, or other appropriate systems.

While most of the above embodiments are directed to the use of preformed continuous core reinforced filaments, in some embodiments, the continuous core reinforced filament may be formed by combining a resin matrix and a solid continuous core in the heated extrusion nozzle. The resin matrix and the solid continuous core are able to be combined without the formation of voids along the interface due to the ease with which the resin wets the continuous perimeter of the solid core as compared to the multiple interfaces in a multifilament core. Therefore, such an embodiment may be of particular use where it is desirable to alter the properties of the deposited material. Further, it may be especially beneficial to selectively extrude one or more resin matrices, continuous cores, or a combination thereof to deposit variety of desired composite structures.

Figure 33:
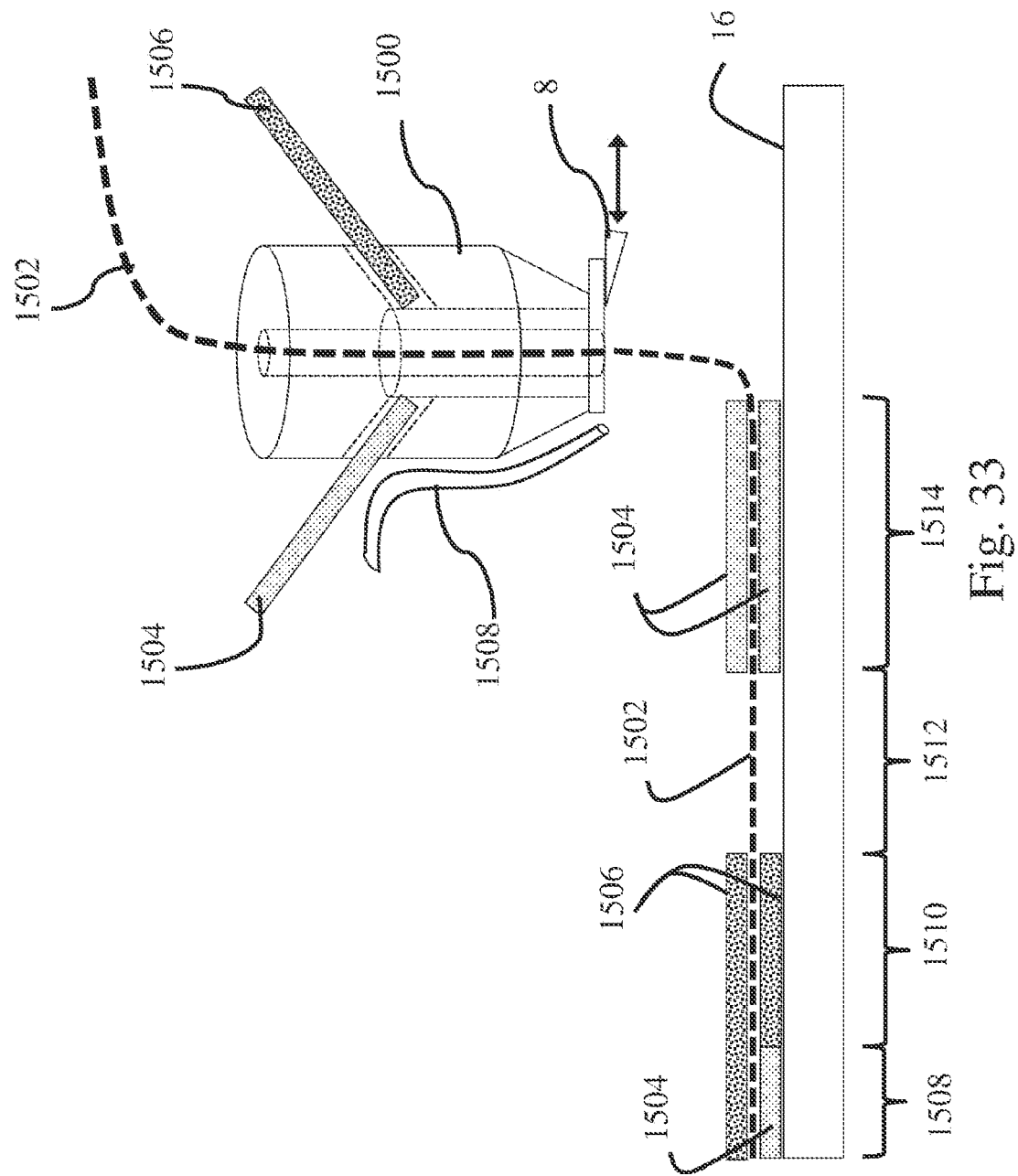
FIG. 33 is a schematic representation of a multi-element printer head for use in the printing system.

FIG. 33 depicts a multi-element printer head 1500 that is capable of selectively extruding material feed options 1502, 1504, and 1506 as well as an optional cutting mechanism 8. More specifically, the multi-element printer head 1500 is capable of selectively depositing any of material feed options 1502, 1504, and 1506, as singular elements or in combination. It should be understood that other material feed options may also be integrated with the multi-element printer head as the current disclosure is not limited to any particular number of material feed options.

In one specific example of a multi-element printer head, material 1502 is a continuous copper wire fed through a central channel. Further, material 1504 is a binding resin such as Nylon plastic and material 1506 is a different binding resin such as a dissolvable support material. The multi-element printer head 1500 is capable of extruding all the elements at once where, for example, the copper wire 1502 might be surrounded by the nylon binder 1504 on the bottom surface and the dissolvable support material 1506 on the top surface, see section 1508. The multi-element printer head 1500 may also deposit the copper wire 1502 coated with either the nylon binder 1504 or the soluble support material 1506 separately, see sections 1510 and 1514. Alternatively, the multi-element printer head 1500 can deposit the above noted material options singly for any number of purposes, see the bare copper wire at section 1512.

The ability to selectively deposit any of the one or more of the materials in a given location as described above enables many advanced functionalities for constructing parts using three dimensional printing methods. Also, the ability to selectively deposit these materials continuously also results in a significantly faster deposition process. It should be understood that while two specific resin materials and a core material have been described above, any appropriate resin and core material might be used and any number of different resins and cores might be provided. For example, a single core and a single resin might be used or a plurality of cores and a plurality of resins might be provided in the multi-element printer head.

In a related embodiment, the multi-element printer head 1500 includes an air nozzle 1508 which enables pre-heating of the print area and/or rapid cooling of the extruded material, see FIG. 33. The inclusion of the air nozzle 1508 enables the formation of structures such as flying leads, gap bridging, and other similar features. For example, a conductive core material may be extruded by the multi-element printer head 1500 with a co-extruded insulating plastic, to form a trace in the printed part. The end of the trace may then be terminated as a flying lead. To achieve this, the multi-element printer head would lift, while commensurately extruding the conductive core and insulating jacket. The multi-element printer head may also optionally cool the insulating jacket with the air nozzle 1508. The end of the wire could then be printed as a "stripped wire" where the conductive core is extruded without the insulating jacket. The cutting mechanism 8 may then terminate the conductive core. Formation of a flying lead in the above-noted manner may be used to eliminate a stripping step down stream during assembly.

The above embodiments have been directed to three dimensional printers that print successive filaments of continuous core reinforced filament in addition to pure resins and their core materials to create a three dimensional part. The position of continuous cores or fibers can also be used with three dimensional printing methods such as stereolithography and selective laser sintering to provide three dimensional parts with core reinforcements provided in selected locations and directions as described in more detail below.

For the sake of clarity, the embodiment described below is directed to a stereolithography process. However, it should be understood that the concept of depositing a continuous core or fiber prior to or during layer formation can be applied to any number of different additive manufacturing processes where a matrix in liquid or powder form to manufacture a composite material including a matrix solidified around the core materials. For example, the methods described below can also be applied to Selective Laser Sintering which is directly analogous to stereolithography but uses a powdered resin for the construction medium as compared to a liquid resin. Further, any of the continuous core filaments noted above with regards to the continuous core reinforced filaments may be used. Therefore, the continuous cores might be used for structural, electrical conductivity, optical conductivity, and/or fluidic conductivity properties.

In one embodiment, a stereolithography process is used to form a three dimensional part. In stereolithography, the layer to be printed is typically covered with resin that can be cured with UV light, a laser of a specified wavelength, or other similar methods. Regardless of the specific curing method, the light used to cure the resin sweeps over the surface of the part to selectively harden the resin and bond it to the previous underlying layer. This process is repeated for multiple layers until a three dimensional part is built up. However, in typical stereolithography processes, directionally oriented reinforcing materials are not used which leads to final parts with lower overall strength.

In order to provide increased strength as well as the functionalities associated with different types of continuous core filaments including both solid and multifilament materials, the stereolithography process associated with the deposition of each layer can be modified into a two-step process that enables construction of composite components including continuous core filaments in desired locations and directions. More specifically, a continuous core or fiber may be deposited in a desired location and direction within a layer to be printed. The deposited continuous core filament may either be completely submerged in the resin, or it may be partially submerged in the resin. After the continuous fiber is deposited in the desired location and direction, the adjoining resin is cured to harden around the fiber. This may either be done as the continuous fiber is deposited, or it may be done after the continuous fiber has been deposited as the current disclosure is not limited in this fashion. In one embodiment, the entire layer is printed with a single continuous fiber without the need to cut the continuous fiber. In other embodiments, reinforcing fibers may be provided in different sections of the printed layer with different orientations. In order to facilitate depositing the continuous fiber in multiple locations and directions, the continuous fiber may be terminated using a simple cutting mechanism, or other appropriate mechanism, similar to that described above. In some applications, the same laser that is used to harden the resin may be used to cut the continuous core filament.

Figure 34:
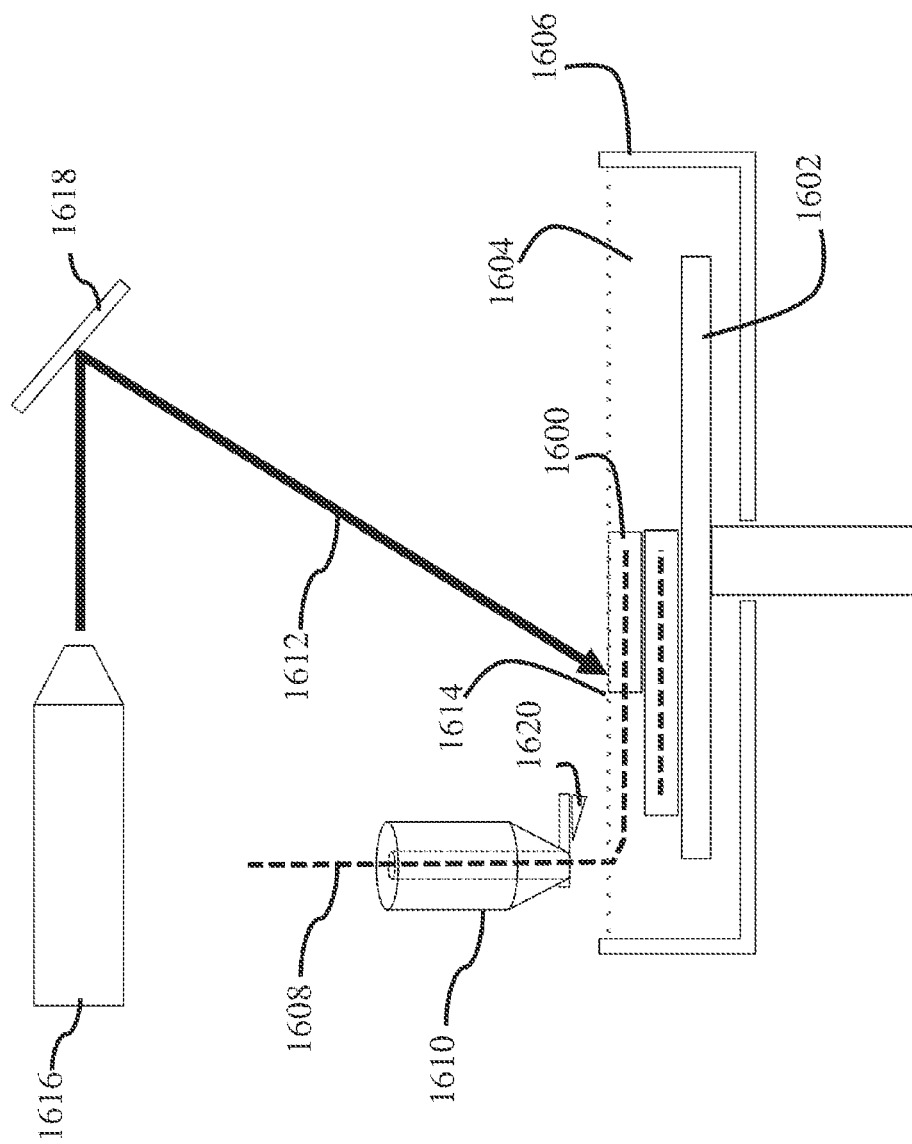
FIG. 34 is a schematic representation of a stereolithography three dimensional printing process including deposited reinforcing fibers.

FIG. 34 depicts an embodiment of the stereolithography process described above. As depicted in the figure, a part 1600 is being built on a platen 1602 using stereolithography. The part 1600 is immersed in a liquid resin material 1604 contained in a tray 1606. The liquid resin material may be any appropriate photopolymer. In addition to the resin bath, during formation of the part 1600, the platen 1602 is moved to sequentially lower positions corresponding to the thickness of a layer after the formation of each layer to keep the part 1600 submerged in the liquid resin material 1604. During the formation of each layer, a continuous core filament 1608 is fed through a nozzle 1610 and deposited onto the part 1600. The nozzle 1610 is controlled to deposit the continuous core filament 1608 in a desired location as well as a desired direction within the layer being formed. Additionally, in some embodiments, the feed rate of the continuous core filament 1608 is equal to the speed of the nozzle 1610 to avoid disturbing the already deposited continuous core filaments. In the depicted embodiment, as the continuous core filament 1608 is deposited, a laser 1612, or other appropriate type of electromagnetic radiation, is directed to cure the resin surrounding the continuous core filament 1608 in a location 1614 behind the path of travel of the nozzle 1610. The distance between the location 1614 and the nozzle 1610 may be selected to allow the continuous core filament to be completely submerged within the liquid resin prior to curing as well as to avoid possible interference issues by directing the laser 1612 at a location to close to the nozzle 1606. The laser is generated by a source 1616 and is directed by a controllable mirror 1618. The three dimensional printer also includes a cutting mechanism 1620 to enable the termination of the continuous core filament as noted above.

In another embodiment of a stereolithography process, the deposited continuous core filament is held in place by one or more "tacks". These tacks correspond to a sufficient amount of hardened resin material that holds the continuous core filament in position while additional core material is deposited. The balance of the material can then be cured such that the cross linking between adjacent strands is maximized. Any number of different hardening patterns might be used to provide desirable properties in the final part. For example, when a sufficient number of strands has been deposited onto a layer and tacked in place, the resin may be cured in beads that are perpendicular to the direction of the deposited strands of continuous core filament. Without wishing to be bound by theory, curing the resin in a direction perpendicular to the deposited strands may provide increased bonding between adjacent strands to improve the part strength in a direction perpendicular to the direction of the deposited strands of continuous core filament. While a particular curing pattern is described, other curing patterns are also possible as would be required for a desired geometry and directional strength.

Figure 35:
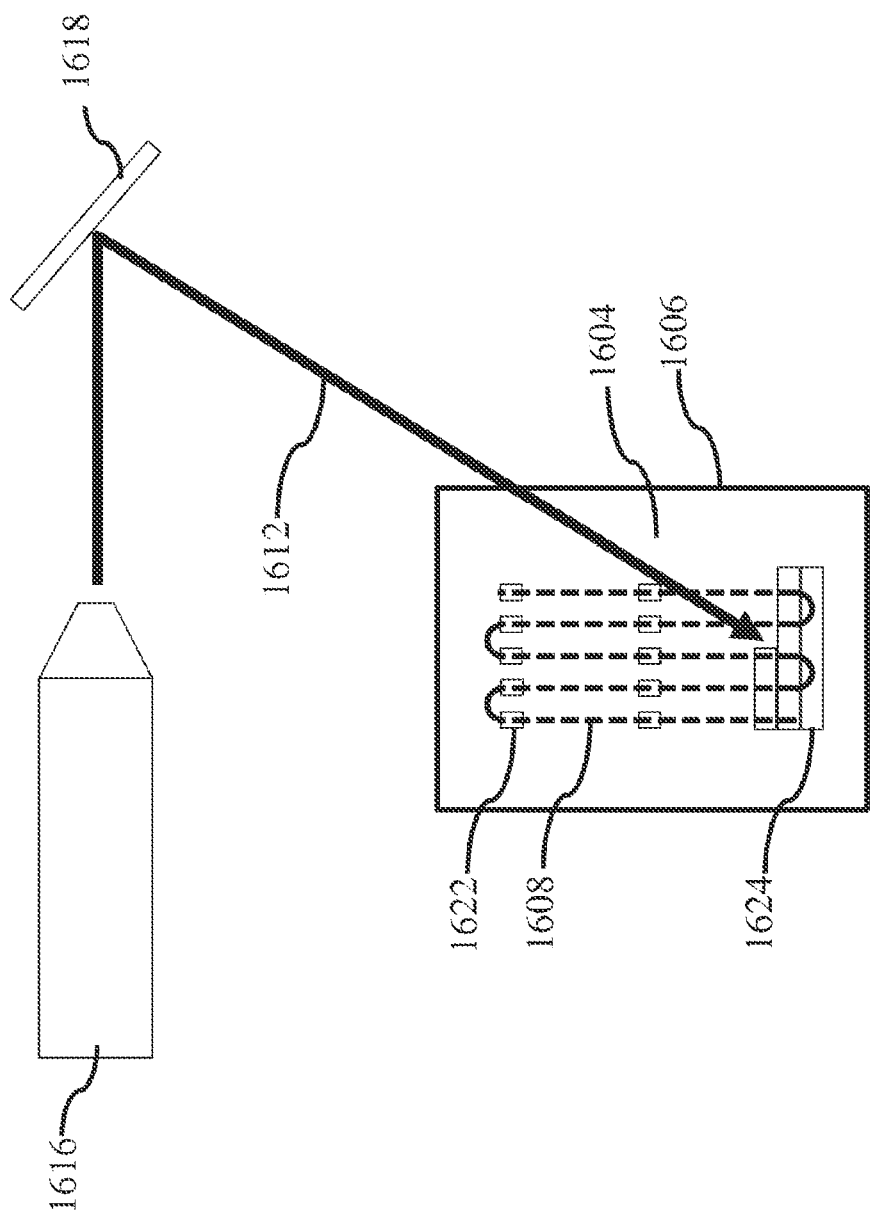
FIG. 35 is a schematic representation of a stereolithography three dimensional printing process including deposited reinforcing fibers.

FIG. 35 depicts one embodiment of the stereolithography process described above. As depicted in the figure, the continuous core filament 1608 is tacked in place at multiple discrete points 1622 by the laser 1612 as the continuous core filament is deposited by a nozzle, not depicted. After depositing a portion, or all, of the continuous core filament 1608, the laser 1612 is directed along a predetermined pattern to cure the liquid resin material 1604 and form the current layer. Similar to the above system, the laser, or other appropriate electromagnetic radiation, is generated by a source 1616 and directed by a controllable mirror 1618. As illustrated by the figure, the liquid resin material 1604 may be cured in a pattern corresponding to lines 1624 oriented perpendicular to the direction of the deposited strands of continuous core filament 1608. Without wishing to be bound by theory, since the cure front is perpendicular to the strands of continuous core filament 1608, the crosslinking between the strands is increased. It should be understood, that if separate portions of the layer include strands of continuous core filament oriented in different directions, the cure pattern may include lines that are perpendicular to the direction of the strands of continuous fibers core material in each portion of the layer. While a particular cure pattern with lines that are oriented perpendicular to the continuous fibers are described, other patterns are also possible including cure patterns of lines that are oriented parallel to the continuous fibers as the current disclosure is not limited to any particular orientation of the cure pattern.

Similar to the three dimensional printing processes described above with regards to depositing a continuous core reinforced filament, it may be desirable to avoid the formation of voids along the interface between the continuous core filament and the resin matrix during the stereolithography process in order to form a stronger final part. Consequently, it may be desirable to facilitate wetting of the continuous core filament prior to curing the liquid resin material. In some embodiments, wetting of the continuous fiber may simply require a set amount of time. In such an embodiment, the liquid resin material may be cured after a sufficient amount of time has passed and may correspond to a following distance of the laser behind the nozzle. In other embodiments, the continuous core filament may be a continuous multifilament core material. Such embodiment, it is desirable to facilitate wicking of the liquid resin material between the multiple filaments. Wetting of the continuous fiber and wicking of the resin between the into the cross-section of the continuous multifilament core may be facilitated by maintaining the liquid resin material at an elevated temperature, using a wetting agent on the continuous fiber, applying a vacuum to the system, or any other appropriate method.

Having described several systems and methods for forming parts using three dimensional printing processes, as well as the materials used with these systems and methods, several specific applications and components are described in more detail below.

In the simplest application, the currently described three dimensional printing processes may be used to form parts using composite materials with increased structural properties in desired directions and locations as described above. In another embodiment, optically or electrically conductive continuous cores may be used to construct a part with inductors, capacitors, antennae, transformers, heat syncs, VIA's, thermal VIA's, and a plurality of other possible electrical and optical components formed directly in the part. Parts may also be constructed with fluid conducting cores to form fluid channels and heat exchangers as well as other applicable fluidic devices and components.

In some embodiments, a part may also be constructed with sensors, such as strain gauges, formed directly in the part to enable structural testing and structural health monitoring. For example, a cluster of printed copper core material can be added to a layer to forming a strain gauge. Similarly, an optical fiber can be selectively added to the part for structural monitoring reasons. Optical fibers can also be printed in a loop to form the coil of a fiber optic gyroscope with a plurality of possible advantages including longer loop lengths for increased sensitivity as well as component integration and simplified manufacturing. For example, the optical coil of the gyro can be printed inside of the associated external container, as part of a wing, or integrated with any number of other parts. Additionally, an optical fiber could be printed as part of a shaft encoder for an electrical motor, which could also be formed using three dimensional printing.

Figure 36:
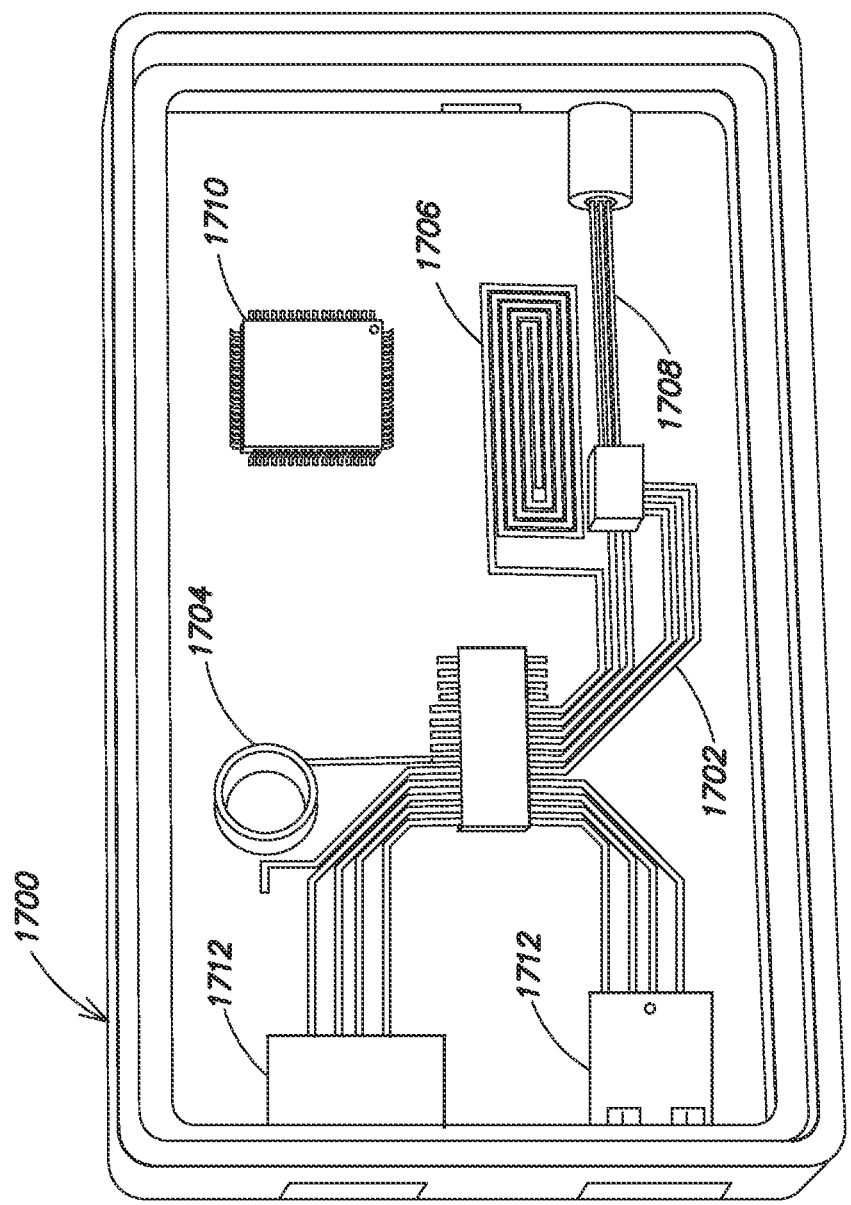
FIG. 36 is a schematic representation of a three dimensional printed part including incorporated printed components with different functionalities.

FIG. 36 illustrates a printed part incorporating many of the components described above that are formed directly in the part using the described three dimensional printing processes. The printed part 1700 includes printed electrical traces 1702 for connecting the printed electrical components as well as a printed inductor 1704 and a printed antennae 1706 connected by the printed electrical traces 1702. The printed part 1700 also includes a printed fiber optic cable 1708. Additionally, depending on the embodiment, the printed part 1700 may include contacts or leads, not depicted, for connecting other components such as chip 1710 and connectors 1712 to the printed part.

FIGS. 37-39 depict the printing and formation process for a multilayer printed circuit board (PCB) using additive manufacturing. As in subtractive PCB layout, a pattern of pads and traces can be designed, and then printed, as illustrated in the figures. However, the process of additive manufacturing of a PCB is simple enough to perform on a bench using one machine, thereby enabling a substantial acceleration of the design cycle.

FIG. 37 depicts printing of a multi-layer PCB 1800, on a build platen 16. The PCB 1800 is formed with a conductive core material 1802 and an insulating material 1804 which are deposited using a printer head including a heated extrusion nozzle 10 and cutting mechanism 8. Similar to the multi element printer head described above, the conductive core material 1802 and insulating material 1804 may be selectively deposited either individually or together. Further, in some embodiments the conductive core material 1802 is solid to minimize the formation of voids in the deposited composite material. When the conductive core material 1802 is printed without the insulating material 1804 a void 1806 can be formed to enable the subsequent formation of vias for use in connecting multiple layers within the PCB 1800. Depending on the desired application, the void 1806 may or may not be associated with one or more traces made from the conductive core material 1802.

FIGS. 38 and 39 depict several representative ways in which the currently described three dimensional printer could be used to form various structures in a printed circuit board 1800. As above, the printed circuit board 1800 can be printed with various combinations of traces and voids. For example, voids 1812 are associated with a single piece of the conductive core material 1802 which acts as a trace. The voids 1812 are subsequently filled with solder or solder paste to form solder pads 1814. In a similar fashion, the void 1816 is associated with two traces and can also be filled with solder or solder paste to form an electrically connected via 1818 between two or more printed layers. As an alternative to the above, a void 1820 may not be associated with a trace. Such a void may also be filled with solder or solder paste to function as a thermal via 1822. While the solder and/or solder paste may be applied separately, in one embodiment, the solder fill can be done using an optional print head 1810 which is used to dispense solder or an equivalent electrical binding agent 1808. The solder may be applied as a molten solder, or as a solder paste for post processing thermal curing using any appropriate technique. The ability to print various components and traces within a circuit board coupled with the ability to apply solder and/or solder paste, may help to further accelerate the prototyping process of a printed circuit board. In addition to the above, separate components may be placed on the printed circuit board by the same machine, another machine, or manually. Subsequently, the printed circuit board can be heated to bond the separate components to the printed circuit board and finish the part. It should be understood that while manufacturing processes for a printed circuit board described above, the ability to selectively form various structures within a three dimensional printed component can be used for any number of different applications.

Figure 41A:
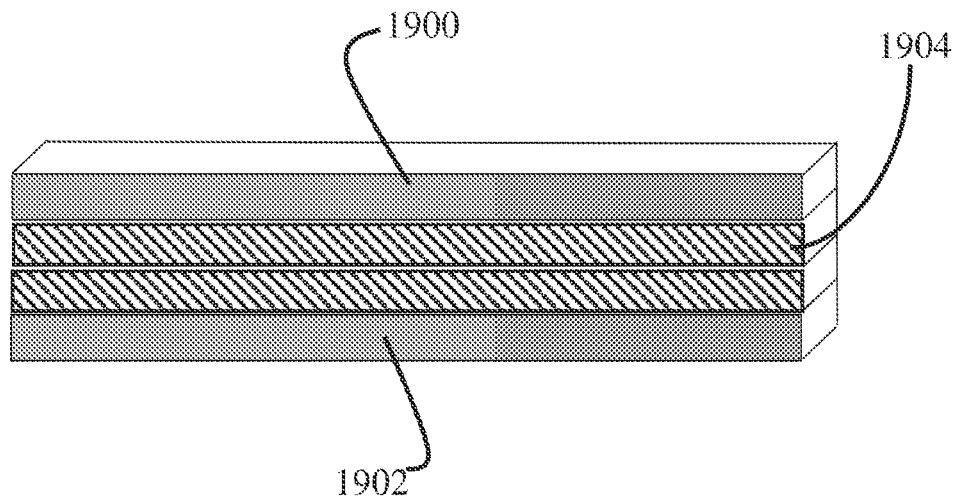
FIG. 41A is a schematic representation of a composite part formed using three-dimensional printing methods.

The presently described three dimensional printing systems and methods may also be used to form composite structures. A schematic representation of a composite structure is depicted in FIG. 41A which shows a sandwich panel composite part. The top section 1900, and bottom section 1902, are printed using a continuous core reinforced filament to form relatively solid portions. In contrast, the middle section 1904 may be printed such that it has different properties than the top section 1900 and the bottom section 1902. For example the middle section 1904 may include multiple layers printed in a honeycomb pattern using a continuous core reinforced filament, a pure resin, or even a three dimensionally printed foaming material. This enables the production of a composite part including a lower density core using a three dimensional printer. Other composite structures that are not easily manufactured using typical three dimensional printing processes may also be manufactured using the currently described systems, materials, and methods.

Figure 41B:
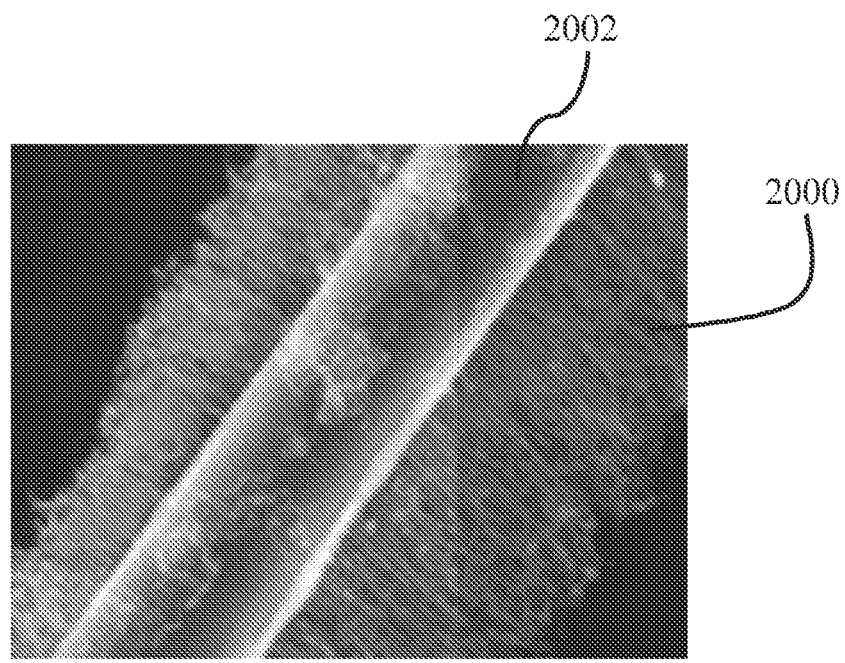
FIG. 41B is a scanning electron microscope image of a reinforcing carbon fiber and perpendicularly arranged carbon nanotubes.

While several different types of applications are described above, it should be understood that the three dimensional printing systems and materials described herein may be used to manufacture any number of different structures and/or components. For example, the three-dimensional printing systems and materials described herein may be used to manufacture airplane components, car parts, sports equipment, consumer electronics, medical devices, and any other appropriate component or structure as the disclosure is not limited in this fashion In addition to using the continuous core reinforced filaments to form various composite structures with properties in desired directions using the fiber orientation, in some embodiments it is desirable to provide additional strength in directions other than the fiber direction. For example, the continuous core reinforced filaments might include additional composite materials to enhance the overall strength of the material or a strength of the material in a direction other than the direction of the fiber core. For example, FIG. 41B shows a scanning electron microscope image of a carbon fiber core material 2000 that includes substantially perpendicularly loaded carbon nanotubes 2002. Without wishing to be bound by theory, loading substantially perpendicular small fiber members on the core increases the shear strength of the composite, and advantageously increases the strength of the resulting part in a direction substantially perpendicular to the fiber direction. Such an embodiment may help to reduce the propensity of a part to delaminate along a given layer.

Figure 40A:
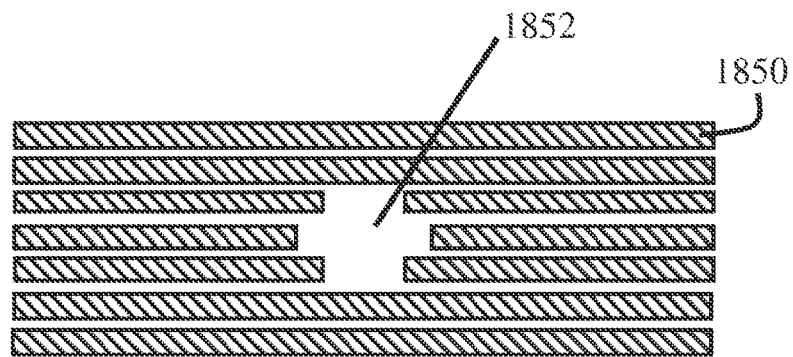
FIG. 40A is a schematic representation of a printed part including a hole drilled therein.
Figure 40B:
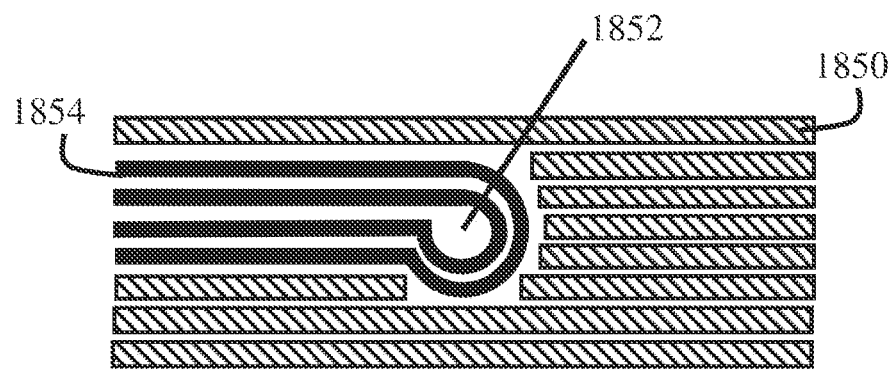
FIG. 40B is a schematic representation of a printed part including a reinforced hole formed therein.
Figure 40C:
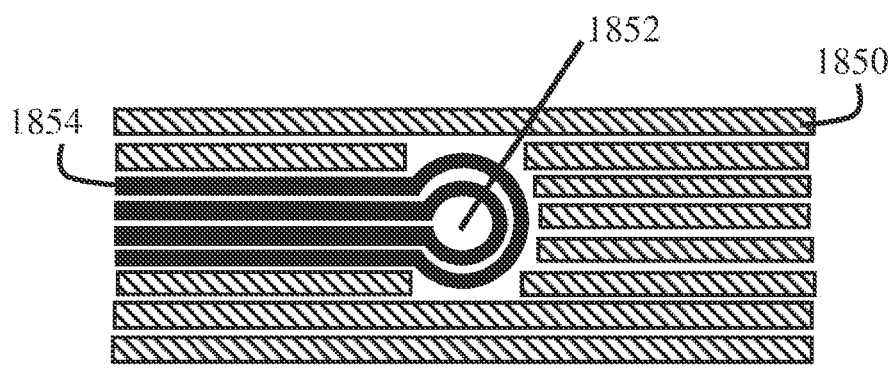
FIG. 40C is a schematic representation of a printed part including a reinforced hole formed therein.

In traditional composites, fibers are laid up, then a hole is drilled after the fact (subtractive machining). This is illustrated in FIG. 40A which illustrates multiple layers 1850, which may either be formed using pure polymer filaments or core reinforced filaments. As also depicted in the figure, a hole 1852 is subsequently formed in the part using a drilling or other appropriate machining process. In contrast, in some embodiments, a core reinforced filament 1854 is used to form a hole directly in a part, see FIGS. 40B and 40C. More specifically, the core reinforced filament 1854 comes up to the hole, runs around it, then exits from the direction it came, though embodiments in which the filament exits in another direction are also contemplated. A benefit associated with this formation method is that the hole is reinforced in the hoop direction by the core in the core reinforced filament. As illustrated in FIG. 40B, the core reinforced filament 1854 enters the circular pattern tangentially. This is good for screws that will be torqued in. In another version, the core reinforced filament 1854 enter the circular pattern at the center of the circle. Of course, it should be understood that other points of entering the pattern are also possible. In one embodiment, the entrance angle is staggered in each successive layer (also described in a PPA). For example, if there are two layers, the entering angle of the first layer may be at 0 degrees while the entering angle for the second layer may be at 180 degrees. This prevents the buildup of a seam in the part. If there are 10 layers, the entering angle may be every 36 degrees or any other desired pattern or arrangement.

As noted above, typical towpregs include voids, this may be due to considerations such as at a temperature and rate at which a green towpregs pass through a nozzle as well as the difference in areas of the green and impregnated towpregs. Due to the relatively high-viscosity of thermoplastics, for example, sections of the extruded material also typically are not fully wetted out. These "dry" weak points may lead to premature, and often catastrophic, component failure.

In view of the above, it is desirable to improve the wetting or impregnating of towpregs during the impregnation step. One way in which to do this is to pass a material including a core of one or more fibers and a matrix material through a circuitous path involving multiple changes in direction of the material while the matrix material is maintained in a softened or fluid state. For example, in the case of a polymer matrix, the polymer may be maintained at an appropriate temperature to act as a polymer melt while the circuitous path functions to mechanically work the matrix material into the fibers. This process may help to reduce the processing time while enhancing the fiber wet-out to provide a substantially void free material. Moreover, reducing the residence time of the matrix material, such as a thermoplastic matrix material, at high temperature reduces degradation of the material which results in further strengthening of a resultant part formed using the composite material. The above noted process may be used for both continuous, and semi-continuous, core materials.

In some embodiments, a circuitous path used to form a desired material is part of a standalone system used to manufacture a consumable material. Alternatively, in other embodiments, a circuitous path is integrated in the compression stage of a print head. In such an embodiment, friction within the print head may be minimized by using one or more smooth walled guide tube with a polished surface. Further, the one or more guide tubes may be close-fitting relative to the material, such that the compressed fiber does not buckle and jam the print head.

Figure 42:
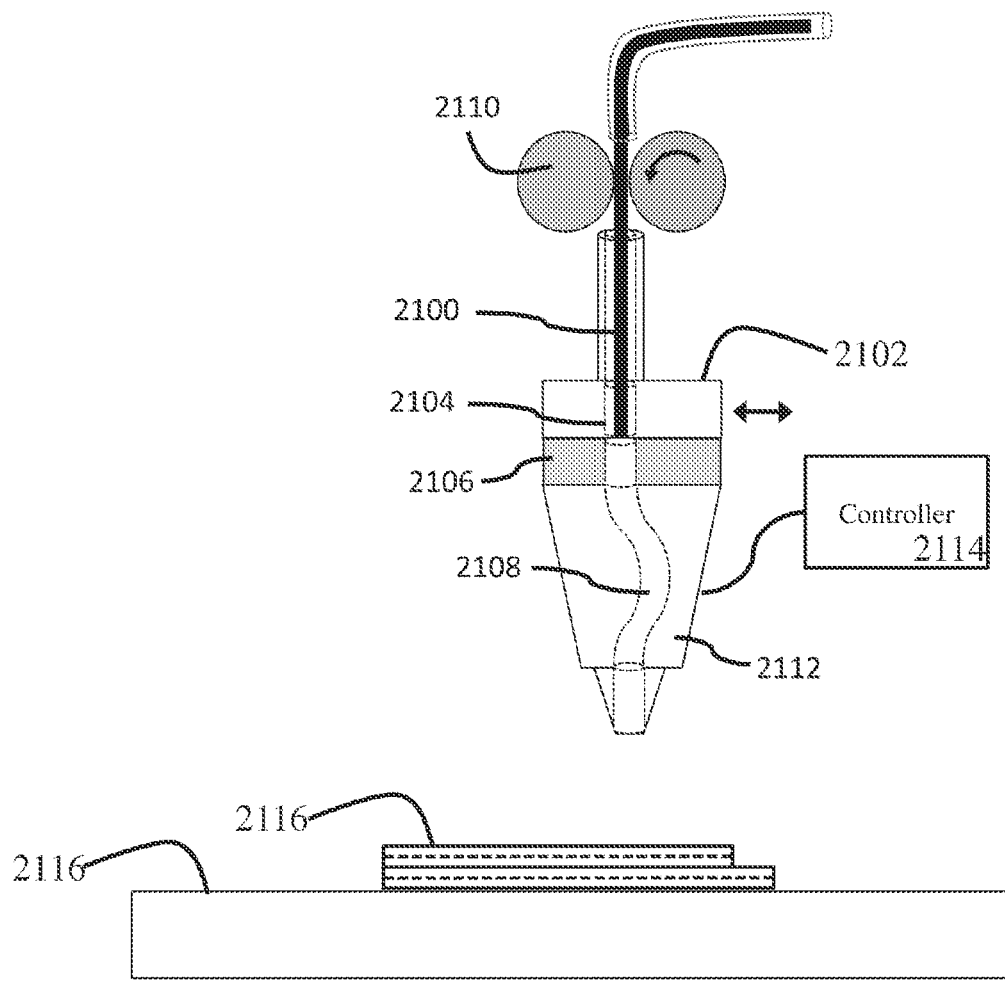
FIG. 42 is a schematic representation of a circuitous path impregnation system

FIG. 42 depicts one possible embodiment of a three-dimensional printer head 2102 including a circuitous path impregnation system. In the depicted embodiment, a continuous core filament 2100 is driven by a feed mechanism 2110 (e.g. the depicted rollers), into a cutting mechanism 2104, through a receiving section 2106, and into a heated zone 2112 of the nozzle. When passing through the heated zone 2112, the continuous core filament 2100 passes through a circuitous path 2108 corresponding to a channel that undergoes at least a first bend in a first direction and a second bend in a second direction prior to the material being extruded from the nozzle into one or more layers 2116 on a print bed 2118. The resulting shape of the circuitous path forms a somewhat sinusoidal path. However, it should be understood that any number of bends and any desired curvature might be used to form the circuitous path. Similar to the above noted printer heads, the printing process may be controlled using a controller 2114 which may also control the impregnation processes. The advantages associated with the depicted embodiment is provided by the back and forth mechanical motion of the continuous core filament 2100 within the circuitous path 4 which aids in the impregnation of the input material.

Figure 43A:
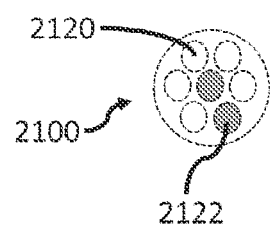
FIG. 43A is a schematic representation of an incoming material with comingled tows.
Figure 43B:
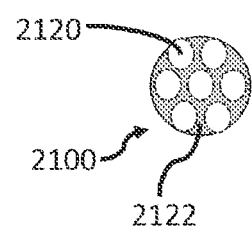
FIG. 43B is a schematic representation of the material of FIG. 43A after impregnation.

FIG. 43A illustrates one possible embodiment of the continuous core filament 2100 when it is input to the system. As illustrated in the figure, the continuous core filament 2100 corresponds to a commingled green towpreg including one or more fibers 2120 bundled with a matrix material 2122 in the form of fibers or particles. After passing through the heated zone and the circuitous path, the continuous core filament 2100 has been fully wetted by the matrix material 2122 to provide a substantially void free continuous core filament, see FIG. 43B.

Figure 44A:
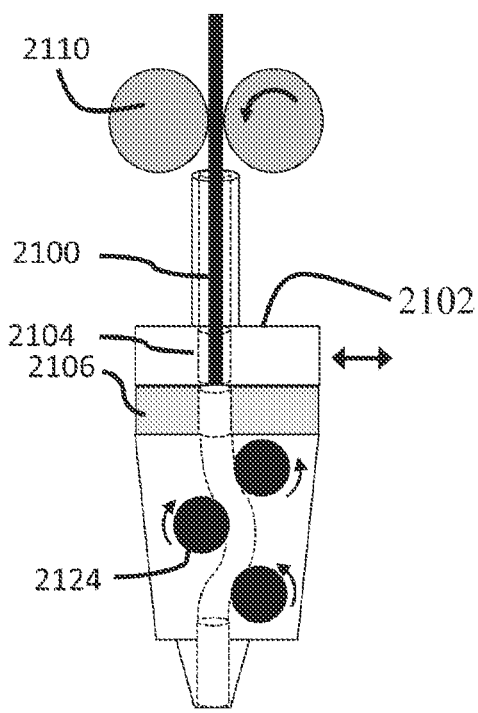
FIG. 44A is a schematic representation of an offset roller impregnation system.
Figure 44B:
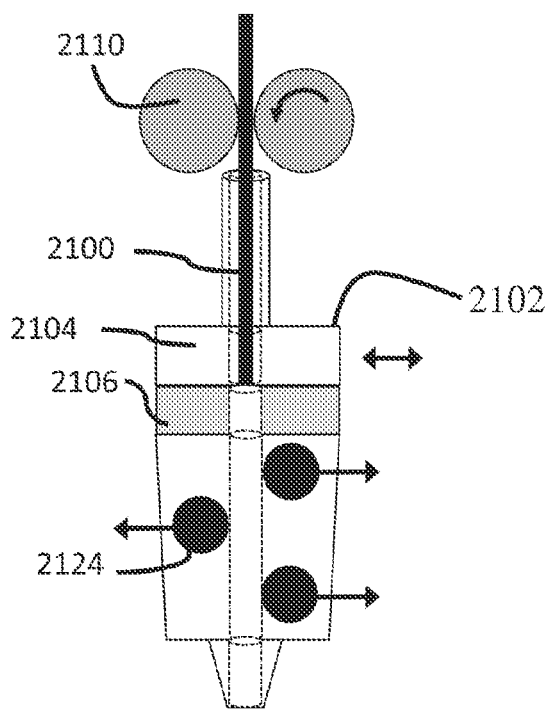
FIG. 44B is a schematic representation of the roller impregnation system of FIG. 44A in an optional loading configuration.

In another embodiment, the circuitous path is provided by offset rollers which may either be stationary, or they may be constructed to advantageously open during initial threading to provide a straight through path and subsequently close to provide the desired circuitous path. FIGS. 44A and 44B show one possible implementation of such an embodiment. As depicted in the figures, three or more rollers 204 are placed within the printer head 2102 to provide the desired circuitous path. During use, the continuous core filament 2100 is fed through the offset rollers by the feeding mechanism 2110 and through the printer head. FIG. 44B depicts an optional loading strategy. In such an embodiment, the rollers 2124 are selectively movable between a first position in which they form a circuitous path as illustrated in FIG. 44A and a second position in which they do not obstruct a path between an inlet and outlet of the printer head 2102 in order to facilitate threading of the system with the continuous core filament 2100, see FIG. 44B. After the material has threaded past the rollers 2124, they may return to the first position to form the circuitous path depicted in FIG. 44A.

In another embodiment, not depicted, a circuitous path located within a print head is formed by a flexible tube such as a polytetrafluoroethylene tube. The flexible tube is selectively placed in a straight configuration to permit threading of the printer head. Subsequently, the flexible tube is deformed into a circuitous path after threading has been completed to facilitate impregnation of a continuous core filament passing there through as described above.

Figure 45:
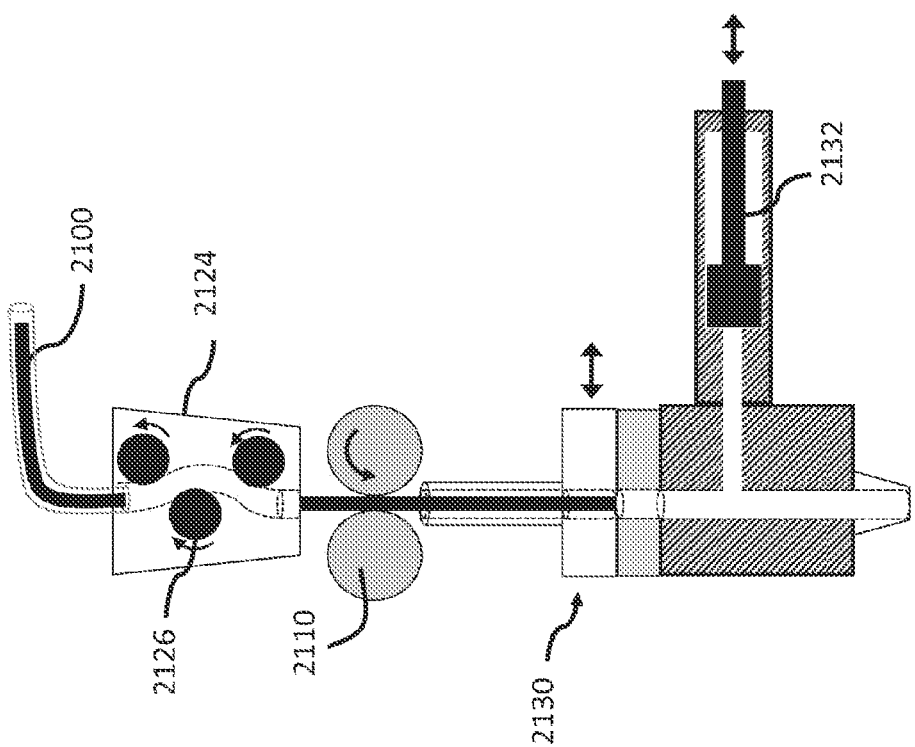
FIG. 45 is a schematic representation of an impregnation system combined with a vacuum impregnation nozzle.

In some instances, it is desirable to provide a fully wetted or impregnated material to the feeding mechanism of a printer head. In such an embodiment, a circuitous path wet-out of a continuous core filament 2100 is performed as a pre-treatment step within the tension side of a three-dimensional printer, prior to feeding the resulting substantially void material into the compressive side of the three-dimensional printer, see FIG. 45. As depicted in the figure the continuous core filament 2100 enters a pre-conditioner 2124. As noted above, when entering the pre-conditioner 124, the continuous core filament 2100 may correspond to a comingled towpreg including one or more fibers and matrix material. As the continuous core filament 2100 passes through the pre-conditioner 2124, it is heated and passes through a circuitous path which may be provided by a set of offset rollers 2126, or other appropriate configuration to facilitate impregnation of the material. After passing through the pre-conditioner 2124, the continuous core filament 2100 passes through the feeding mechanism 2110 corresponding to a set of drive rollers. The feeding mechanism 2110 feeds the continuous core filament 2100 into a print head 2130 including a vacuum pressure system 2132. The vacuum pressure system 2132, or other appropriate system, varies a pressure applied to the continuous core filament 2100 within the print head. Without wishing to be bound by theory, these pressure variations may facilitate impregnation of the fibers and burst air pockets within the towpreg. In another preferred embodiment, a continuous vacuum line is used for the vacuum pressure system 2032 instead of the oscillating pump as depicted in the figure. Additionally, while a vacuum may be applied to vary a pressure within the print head, embodiments in which positive pressures are applied to the print head are also contemplated.

Figure 46:
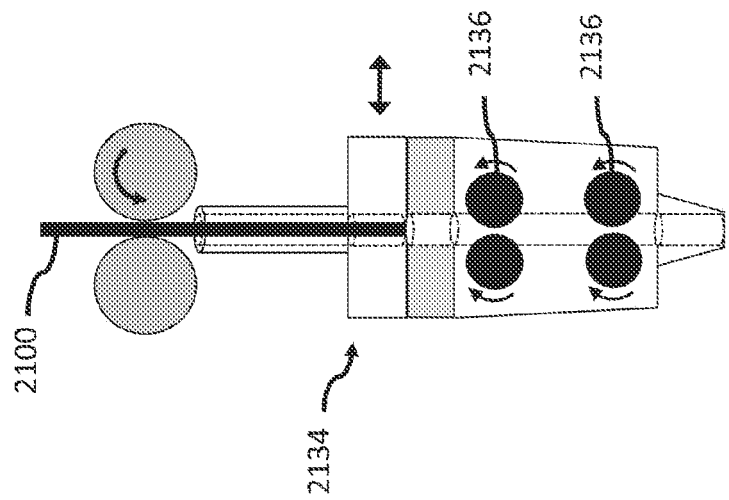
FIG. 46 is a schematic representation of an impregnation system integrated with a printing nozzle.

In yet another embodiment, the matrix material contained within a green continuous core filament is worked into the fibers by passing through one or more compressive roller sets while the matrix is hot and capable of flowing. FIG. 46 shows one embodiment of a three-dimensional print head 2034 including a first and second set of compression rollers 2136 disposed within the print head. As depicted in the figure, the continuous core filament 2100 passes through the print head where it is heated and subjected to two subsequent compressions from the two sets of compression rollers. While two sets of rollers are depicted in the figures, additional rollers within the print head may also be used.

In another embodiment, oscillating pressures and/or vacuums a reused to work the matrix material into the fiber core of a continuous core filament. Without wishing to be bound by theory, applying reduced pressures, or increased vacuums, to the material removes voids. Conversely, applying increased pressures, or decreased vacuums, then forces the resin deeper into the fiber towpreg as the air pressure around said towpreg increases. The above noted process may either be performed completely with vacuums, positive pressures, or a combination of the two as the disclosure is not so limited. For example, a material might be cycled between ambient pressure and a high pressure, between ambient pressure and a vacuum, or between positive pressures and vacuums.

In the above embodiments, mechanically working the matrix into the fiber cores enables the production of substantially void free towpregs from a variety of starting materials. For example, comingled towpregs can be used. In an additional embodiment, a flat towpreg in which the polymer matrix is only partially wicked into the underlying fibers is subjected to the circuitous path wetting method described above to wet out the towpreg. In addition to enabling the manufacture of various types of towpregs, if used as a pre-treatment, a precision extrusion die can be used to form the impregnated material into a desired size and shape for extrusion from a three dimensional printer. For example, the material may have a circular cross section though any other appropriately shaped cross section might also be used.

Figure 47:
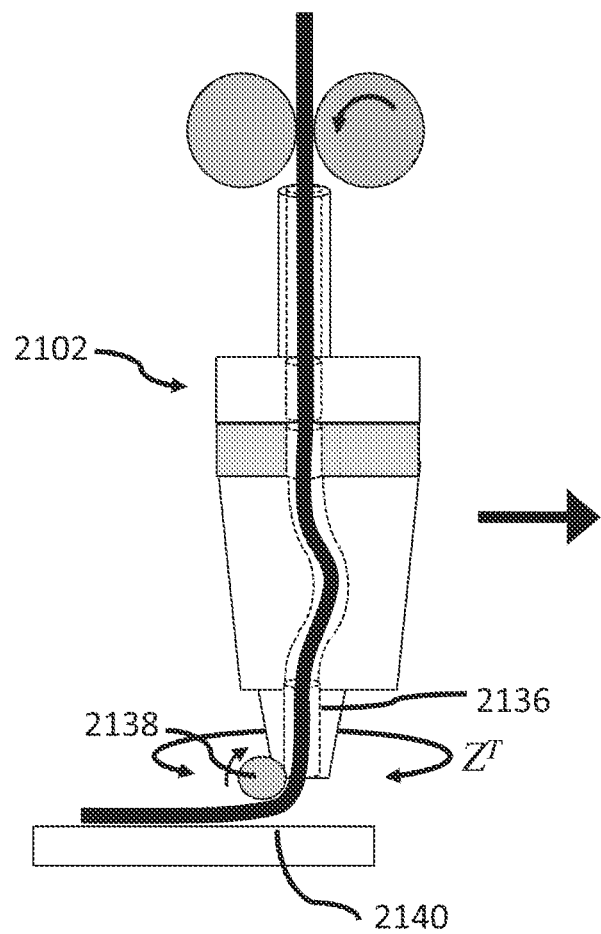
FIG. 47 is a schematic representation of a printing nozzle including a circuitous path impregnation system.

When desirable, a precision roller set can be used to maintain a constant thickness along a relatively wider width of material output from a print head 2102. Such an embodiment may be of use when dealing with wider materials such as flat towpregs. FIG. 47 shows a print head 2102 translating in a first direction. A nozzle 2136 of the print head is attached to a trailing compression roller 2138. The roller imparts a compressive force to the material deposited on to the onto print bed 2140. Depending on the embodiment, the trailing roller 2138 can articulate around the Z axis using any number of different mechanisms. For example, in one embodiment, the print head 2102 is free-rotating on a bearing, such that the roller always trails the direction of travel of the print head. In another embodiment, the entire print head 402 is constructed to rotate. Alternatively, the print bed 2140 may be rotated to achieve the desired trailing and displacement.

Figure 48:
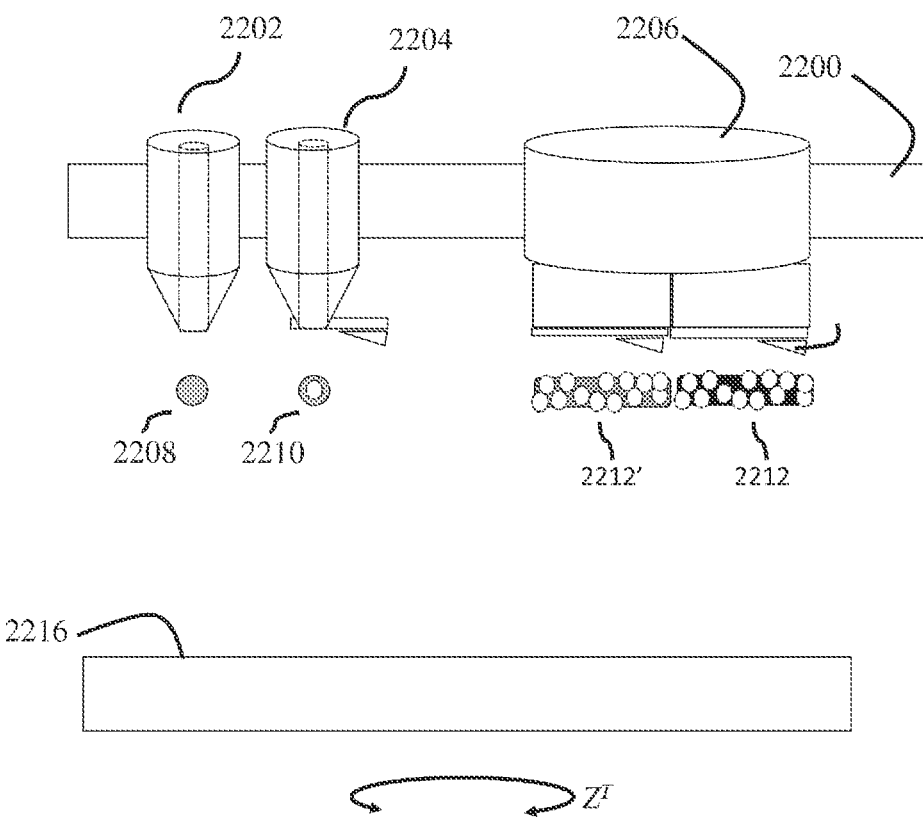
FIG. 48 is a schematic representation of a multi-nozzle three-dimensional printer.

FIG. 48 shows one embodiment of a high-speed continuous core printer capable of using the above described materials. In the depicted embodiment, the printer includes a print arm 2200 including a plurality of nozzles. The nozzles include a pure resin nozzle 2202 adapted to print pure resin 2208. The print arm 2200 also includes a continuous core filament nozzle 2204 adapted to print a continuous core filament 2210 for use in fine detail work. Additionally, the print arm 2200 includes a tape dispensing head 2206 capable of printing one or more printable tapes 2212. The tape dispensing head enables large infill sections to be printed quickly using the noted printable tapes. However, fine detail work and gaps that cannot be filled in by the tape can be filled by either the pure resin nozzle 2202 or continuous core filament nozzle 2204 as the disclosure is not so limited. The above noted method and system using wide tape fills greatly improves the speed of a printer, enabling higher throughput, and commensurately lower cost.

As noted above, in some embodiments, it is desirable to provide a material with a smooth outer surface for a variety of reasons. As detailed below, the smooth outer surface, a desired shape, and/or a desired size may be obtained in a variety of ways.

In one embodiment, a core reinforced filament includes an internal portion including axially aligned continuous or semi-continuous fibers, or other materials, in the form of a tow, bundle, yarn, string, rope, thread, twine, or other appropriate form. The internal portion also includes a matrix in which the fibers are embedded. The core reinforced filament also includes an external coating disposed on the internal portion of the filament. The external coating may be shaped and sized to provide a desired cross-sectional shape and size. The resulting core reinforced filament may be used in a three dimensional printing process as described herein as well as other appropriate three dimensional printing processes as the disclosure is not so limited.

In a related embodiment, a method for manufacturing a core reinforced filament includes embedding a tow, bundle, yarn, string, rope, thread, cord or twine in a polymer matrix using any appropriate method. The resulting filament is subsequently extruded with a polymer to form the external coating noted above. As described in more detail below, the external coating may be made from the same material, or a different material, as the matrix material of the internal portion of the filament.

FIG. 49A depicts a process to make a fully-wetted or impregnated core reinforced filament with a smooth outer coating for use in a three-dimensional printing system. As depicted in the figure, a continuous core element 2300 is pulled into a co-extrusion die 2302. In some embodiments, the continuous core element 2300 is subjected to various pretreatments at 2301 prior to entering the co-extrusion die 2302 as described in more detail below. Once introduced into the co-extrusion die 2302 the continuous core element 2300 is impregnated with matrix material 2306 at a mixing point 2304. Either during, or prior to wetting or impregnation of the continuous core element with the polymer, an optional vacuum step may be employed to remove entrapped air from the continuous core filament. FIGS. 49B and 49C depict cross sectional views of various starting continuous core elements 2300 which may be towpregs including a plurality of aligned reinforcing fibers. As complete wetting or impregnating is the primary goal of this step (as opposed to merely coating in traditional co-extrusion dies), the temperature and pressure of the mixing step may be increased to achieve the desired full-wetting/impregnating through the fiber bundle. Alternatively, or in addition to the above, a circuitous path and/or varying pressure may be applied as described above to further facilitate wetting/impregnation of the material.

As many carbon fiber and fiberglass towpregs are initially in a tape-like format, the die exit 2308 of the co-extrusion die may act to consolidate the continuous core element and polymer matrix material into a desired shape and size to provide a smooth, constant diameter, composite filament. However, the filament will start to distort down-stream of the coextrusion die as occurs with typical filament manufacturing processes. The inventors have recognized that this distortion is an artifact of cooling the extrusion without support which is somewhat akin to ejecting an injection molded part too soon which then warps when outside of the mold. Consequently, in some embodiments, a cooling tube 2312 and operatively coupled cooling element 2310, such as a cooling jacket, are aligned with and support the extruded material. Consequently, the extruded core reinforced filament is permitted to cool while being constrained to a desired size and shape. Lubricating agents may advantageously be applied to the filament upon entry to the tube, or at points along a length of the tube. The lubricating agents may either evaporate, or be washed off at the later time. The lubricants may function to reduce the dragging friction of the core reinforced filament within the tube to substantially prevent, or at least reduce, "skipping" or surface roughness from dragging the filament through the cooling tube during cooling. Depending on the core material, and its corresponding compressibility and ductility, the cooling tube may be built with a series of different inner diameter "dies" to achieve a desired shape and size. Alternatively, a plurality of discrete "cooling dies" might be used in place of a cooling tube for certain materials. An output core reinforced material 2314 may exhibit cross sections similar to those depicted in FIGS. 49E-49F. Depending on the amount of compression used in the cooling tube, or die, the material may exhibit varying cross sectional profiles that conform either more or less to a shape of the tube or die.

In some embodiments, the core reinforced filament is fed into a second co-extrusion die 2316 where it is coated with another matrix material 2318, such as a polymer or resin, prior to being output through the die exit 2320 as a coated core reinforced filament 2322. This outer coating 2326 is disposed on the internal portion 2324. The outer coating 2326 may be made from the same material, or a different material, as the matrix material 2306 in the internal portion. Therefore, the outer coating 2326 may be selected to provide a desired performance characteristics such as bonding to previously deposited layers, wear resistance, or any other number of desired properties. Additionally, in some embodiments, the outer coating 2326 provides a smooth, fiber-free outer diameter as shown in the cross-section is presented in FIGS. 49G-49I. FIG. 49G presents an embodiment of the core reinforced filament including an internal portion 2324 and an outer coating 2326 formed with different matrix materials as well as a plurality of filaments forming the continuous core. FIG. 49H depicts an embodiment of the core reinforced filament including an internal portion 2324 and an outer coating 2326 formed with the same matrix material as well as a plurality of filaments forming the continuous core. FIG. 49I presents an embodiment of the core reinforced filament including an internal portion 2324 including a solid continuous core 2300. The inner and outer matrix materials may be any appropriate binder used in composites, including, but not limited to, thermoplastics, thermosets, resins, epoxies, ceramics, metals, waxes, and the like.

FIG. 50A depicts an alternative roller-based method to achieve full-wetting/impregnation of the fiber, combined with an outer coating. Similar to the above, the core material 2300 may have a cross-sections as depicted in FIGS. 50B and 50C. Additionally, the core material 2300 may be subjected to an optional pre-treatment step at 2301. The core material 2300 is passed through a set of dispersion rollers 2330 which are constructed and arranged to flatten the cross-section of the core material to a flattened cross-sectional shape 2332 illustrated in FIG. 50D. Without wishing to be bound by theory, dispersing the individual fibers of the continuous core into a flattened shape may help to facilitate wetting/impregnation of the matrix material 2306 when it is introduced to the flattened continuous core element 2332 at the mixing point 2304. Similar to the above, the continuous core element and matrix material may be subjected to a circuitous path and/or varying pressures to further facilitate impregnation of the matrix material. Additionally, in the depicted embodiment, the system may optionally include a set of rollers 2334 located downstream from the mixing point 2304. The rollers 2334 may apply a force to the composite filament to further force the matrix material 2306 into the continuous core element 2300. A cross-section of the resulting composite flattened tape 2336 is illustrated in FIG. 50E. The resultant flattened composite tape 2336 is subsequently fed into a forming die 2338. This step can either be achieved with a heated forming die, that is heated to a sufficient temperature in order to reflow the material, or the forming die 2338 is located sufficiently close to the exit of the rollers 2334 such that the composite flattened tape is at a sufficient temperature to be formed when entering the die. Again, similar to the above, an optional cooling tube 2312 and an associated cooling element 2310 may be associated with the forming die 2338 in order to support a cross-section of the core reinforced filament 2314 as it cools, see FIGS. 50F-50G. An outer coating may then be applied to the court reinforced filament to forming a coated core reinforced filament 2322 as described above.

While the above described embodiments have been directed to the use of a fully wetted, fully wicked material, that is substantially void free, it should be noted that described outer coatings and impregnation methods may be used with materials including voids as well. Additionally, green materials that have not been wetted might also be used with the three dimensional printers described herein. Further, while various shapes such as flattened tapes and rounded cross-sectional profiles are described above with regards to the manufacturing processes, any appropriate shape of the material and/or resulting core reinforced filament is possible as the disclosure is not so limited.

The composition of the aforementioned two polymer matrix binders used in the internal portion and outer coating of a composite filament may differ by one or more of the following factors: polymer molecular weight, polymer weight distribution, degree of branching, chemical structure of the polymer chain and polymer processing additives, such as plasticizers, melt viscosity modifiers, UV stabilizers, thermal stabilizers, optical brighteners, colorants, pigments or fillers. Manufacturing of core reinforced filaments with two different binder compositions may be practiced in several different ways depending on which particular processing characteristic or the property of the finished part one desires to modify or control.

In one embodiment, it is desirable to preserve the uniform distribution of the fibers in the interior portion of the filament and the circular cross section shape. In such an embodiment, the polymer matrix of the interior portion may exhibit a higher melting point than the melting point of the polymer matrix in the outer coating. Consequently, the interior portion of the filament remains in a solid, or at least a semi-solid highly viscous state, when the external coating is applied. Correspondingly, the fibers contained within the continuous core will stay in place and the filament will retain its circular cross-sectional shape during application of the outer coating polymer matrix by co-extrusion while avoiding migration of the continuous fibers through the molten matrix of the interior portion of the filament to the outer coating of the filament during the co-extrusion step.

In another embodiment, it is desirable to improve impregnation/wetting of the fiber towpreg by the matrix binder. Consequently, in some embodiments, a less viscous polymer melt is used as the matrix material in the interior portion of the filament. Preferably, the polymer matrix material used for the interior portion of the filament should have not only low viscosity, but also exhibit improved interfacial wetting of the fiber surface. Without wishing to be bound by theory, this may be obtained by matching the surface energy of the imbibing polymer melt with the surface energy of the continuous fiber material. The polymer matrix material used for the external coating may comprise a polymer with a higher melt viscosity than the interior matrix polymer. The exterior polymer matrix material may also exhibit a lower melting point than the interior polymer. The wetting properties of the outer coating matrix towards the continuous core is of lesser importance as the two should not in principle be in direct contact.

In yet another embodiment, is desirable to facilitate the adhesion of an external coating to the underlying bundle through the modification of the surface energy of the polymer melt and the continuous core filaments. The surface energy can be controlled by a number of methods, including, but not limited to, varying the content and the type of the polar groups in the polymer backbone, the addition of surface active components to the melt, for example, surfactants, oils, inorganic fillers etc., exposing the fibers to electric gas discharge plasmas, chemical vapor deposition, ozone, or reactions with, or coating of, surface modifying compounds from solutions.

In another embodiment, surface energy modifiers may also be used to strengthen the interlayer bonding of the filament as it is deposited by a three dimensional printer. For example, ozone may be deposited by the print head to promote adhesion of a new layer to an existing layer. In another embodiment, the build chamber may be filled with a sufficient proportion of ozone to activate the exposed surfaces.

In yet another embodiment of the present invention, it may be advantageous to improve the bond strength of freshly extruded fiber-rich filament to the underlying layer by selectively applying a stream of heated vapor to a small area adjacent to, and/or just ahead of, the deposition point of the freshly deposited filament.

In another embodiment, it is contemplated that the bond strength between the freshly extruded fiber-rich filament and the underlying layer may be improved by selectively directing a stream of air or another gas consisting of a sufficient concentration of ozone toward a small area adjacent to, and just ahead of, the deposition point of the freshly deposited filament surface. Ozone readily reacts with the atomically thick surface layers of organic polymers to create a multitude of polar reactive surface groups, such as hydroxyl, ozonide, peroxide, hydroperoxide, aldehyde and carboxylic groups, which by their very reactive chemical and/or polar nature facilitate bonding of the surface layer to another material, such as ink, adhesive or another polymer binder.

In yet another embodiment, it is desirable to increase the bonding strength with a build platform to help prevent lifting off of a part, or section of a part, from the build platform. Consequently, in some embodiments, a surface energy modifier is applied to the build platform to facilitate the adhesion of the extruded filament to said platform. In some embodiments, the noted adhesion modification is used to increase the adhesion of the first bonding layer to the build platform in a few key areas, such as the corners of a box, thereby causing greater adhesion where the part is most likely to peel up from the platform. The center of the box, however, may be substantially free of surface energy modifiers to facilitate easy removal.

With regards to the above noted embodiments, it should be understood that the timing and/or quantity of deposited ozone, vapor, or other surface energy modifier may be varied to obtain a desired level of adhesion.

In another embodiment, a magnetic filler is loaded into the matrix material. The magnetic filler may either be magnetically active, like iron or steel, or it may be magnetized as the disclosure is not so limited. In the case of continuous core printing of electronics, the magnetic filler could be used to form a three dimensionally printed actuation members. Additionally, the magnetic matrix particles could be used to magnetically stick a part to a printing table during printing, and then release at the conclusion of printing. The magnetic material may either be integrated into a final part, or it may advantageously be integrated into a removable support material with similar matrix exhibiting properties similar to the remainder of the material.

In yet another embodiment, the magnetically active filler particles enable measurement and detection of the material, or support structure, using x-rays or metallic sensors. For example, using a material including metallic powder in the support material, and not the model material, would enable easy detection of the removal of all the support material. In another embodiment, the magnetic material is added to a part, or all, of a part, to enable the detection of intricate features in x-ray detection, that would otherwise be invisible.

In some embodiments, a continuous core, such as continuous carbon fibers, is combined with a semi-aromatic polyamides and/or a semi-aromatic polyamide blends with linear polyamides which exhibit excellent wetting and adhesion properties to the noted continuous carbon fibers. Examples of such semi-aromatic polyamides include blends of semi-aromatic and linear polyamides from EMS-Grivory, Domat/Ems, Switzerland, such as Grivory HT1, Grivory HT2, Grivory HT3 and other similar blends. By combining continuous reinforced fiber towpregs with high-temperature melting and fiber wetting polyamides and their blends, parts may be manufactured which are characterized by exceptional mechanical strength and long-term temperature stability at use temperatures 120° C. and higher while ensuring extrudability of the composite tow, excellent fiber-matrix wettability, complete fiber towpreg permeation with the resin and excellent shear strength at the fiber-matrix interface.

The optional pre-treatments noted above are intended to facilitate full wetting of the core material, and wicking of the matrix material into the centers thereof. Various types of pretreatments can include categories such as mechanical, rheology, and fiber-wetting pretreatments. The particular method(s) employed will depend on the matrix material chosen, and the core selected.

Appropriate mechanical pretreatments include, spreading the individual fibers of the core into a flattened ribbon-shaped towpreg by mechanical or pneumatic means before contacting with the resin or melt (i.e. dip coating). Alternatively, a towpreg may pass through a melt in a chamber that is periodically evacuated to expand and remove air bubbles trapped between the fibers and to force the resin or melt into the interstitial space between the fibers when the vacuum is released. Additionally, periodic cycles of higher air pressure may improve the effectiveness of the process by changing the size of entrapped air bubbles and forcing the renewal of the air-fiber interface, thus, facilitating bubble migration. Additionally, a resin or polymer milk may be injected from one side of a continuous core such that it is injected through the continuous core as compared to simply surrounding it during a traditional coextrusion process. Should be understood that other mechanical pretreatments are also possible.

Appropriate rheological pretreatments of a continuous core include the use of a low viscosity or high melt flow index resins or polymer melts. Additionally, polymers exhibiting low molecular weights and/or linear chains may be used. Polymers exhibiting a sharp melting point transition with a large change in viscosity might also be used. Such a transition is a typical property exhibited by polyamides. Various features such as multiple port melt injection, angled channels, as well as fluted or spiral-groove extrusion channel surface "morphologies" may be used to induce higher melt turbulence and non-laminar melt flow which may result in enhanced impregnation of the matrix material. Melt viscosity modifiers and lubricants used to lower the effective melt viscosity and improve slip at the fiber surface might also be used.

Appropriate fiber wetting pretreatments may include precluding the fiber surfaces with a very thin layer of the same or similar polymer from a dilute polymer solution followed by solvent evaporation to obtain a like-to-like interaction between the melt and the fiber surface. Polymer or resin solutions in neutral and compatible solvents can have concentrations from about 0.1 wt.-% to 1 wt.-% or higher. Additionally, one or more surface activation methods may be used to introduce or change the polarity of the fiber surface and/or to introduce chemically reactive surface groups that would affect wetting/impregnation (contact angle) and adhesion (matrix-fiber interfacial shear strength) by physically or chemically bonding the polymer matrix with the fiber surface. Several examples of suitable surface activation methods include, but are not limited to: atmospheric pressure surface oxidation in air; air enriched in oxygen, nitrogen oxides, or other reactive gases, such as halogenated, sulfur, silicon or other volatile compounds; as well as a high-voltage corona discharges (a method widely used in activating polyolefin film surfaces for printing). Low-pressure plasma activation techniques in air, oxygen, or the other gases enumerated above may also be used to introduce reactive chemical surface groups with a chemical character defined by the process conditions (time, pressure, discharge energy (electrode bias voltage), residence time and the composition of the reactive gas. The fiber surface may also be chemically activated using: activation methods in gas and liquid phase, such as silanization in the presence of hexamethyldisilizane (HMDS) vapors, especially at elevated temperatures; and solvent-phase surface modification using organosilicon or organotitanium adhesion promoters, such as tris(ethoxy)-3-aminopropylsilane, tris (ethoxy) glycidyl silane, tetraalkoxytitanates and the like.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method for manufacturing a part, the method comprising steps of:
   adhering a coated continuous core reinforced filament dispensed through a distal end of a nozzle of a printhead to a surface, wherein the adhering step comprises applying a compaction pressure with a structure located at the distal end of the nozzle to the coated continuous core reinforced filament; and
   applying a dragging force between the adhered coated continuous core reinforced filament and the coated continuous core reinforced filament being fed through the nozzle of the printhead when the printhead is moved relative to the surface.

2. The method of claim 1, wherein the coated continuous core reinforced filament is substantially void free.

3. The method of claim 1, wherein a core of the coated continuous core reinforced filament comprises a multifilament core.

4. The method of claim 1, wherein prior to the step of dragging, the coated continuous core reinforced filament is adhered to a point on the surface.

5. The method of claim 4, wherein the point is an anchor point.

6. The method of claim 5, wherein the core of the coated continuous core reinforced filament is substantially impregnated with a matrix material.

7. The method of claim 6, wherein the coating surrounding the coated continuous core reinforced filament is a matrix material.

8. The method of claim 6, further comprising affixing the dragged coated reinforced filament to an opposing section of a gap, such that the coated continuous core reinforced filament bridges the gap from the anchor point to the affixed point.

9. The method of claim 1, further comprising, prior to the step of adhering, steps of:
impregnating a continuous core element with a matrix material at a first coextrusion die of a printhead to form a continuous core reinforced filament;
introducing the continuous core reinforced filament within a second coextrusion die of the printhead; and
coating an outer surface of the continuous core reinforced filament at the second coextrusion die of the printhead to form a coated continuous core reinforced filament.

10. The method of claim 1, wherein applying compaction pressure compresses the core reinforced filament into a build platen.

11. The method of claim 10, wherein applying compaction pressure spreads strands of the core reinforced filament.

12. The method of claim 11, wherein applying compaction pressure that spreads strands of the core reinforced filament further comprises adhering the compacted core reinforced filament to the build platen.

13. The method of claim 11, wherein applying compaction pressure that spreads strands of the core reinforced filament further comprises adhering the compacted core reinforced filament to a prior deposited layer on the build platen.

14. The method of claim 11, wherein the step of applying the dragging force pulls the core reinforced filament through a feeding mechanism.

15. The method of claim 11, wherein the step of applying the dragging force pulls a cut end portion of the core reinforced filament from the printhead.

16. A method for manufacturing a part, the method comprising steps of:
coextruding a continuous core reinforced filament and a matrix material to form a coated continuous core reinforced filament;
adhering the coated continuous core reinforced filament dispensed through a distal end of a nozzle of a printhead to a surface, wherein the adhering step comprises applying a compaction pressure with a structure at the distal end of the nozzle to the coated continuous core reinforced filament; and
applying a dragging force between the adhered coated continuous core reinforced filament and the coated continuous core reinforced filament being dispensed through the nozzle when the printhead is moved relative to the surface to form the part.

17. The method of claim 16, further comprising, prior to the step of adhering, coating the continuous core reinforced filament with the matrix material.

18. The method of claim 17, wherein the coating step occurs at a mixing point.

19. The method of claim 16, further comprising extruding a coated continuous core reinforced filament from a nozzle of the printhead.

20. The method of claim 16, wherein the adhering step comprises compressing the coated continuous core reinforced filament.

21. The method of claim 20, wherein compressing the coated continuous core reinforced filament spreads a plurality of strands of the coated continuous core reinforced filament.

22. The method of claim 21, wherein compressing the coated continuous core reinforced filament spreads the coated continuous core reinforced filament into an adjacent coated continuous core reinforced filament of a same layer and an underlying material of the part.

23. The method of claim 16, wherein the compaction pressure is applied by printhead.

24. The method of claim 16, wherein the adhering step further comprises heating to reflow the matrix material.

25. The method of claim 16, wherein the continuous core reinforced filament is a towpreg.

26. The method of claim 25, wherein the towpreg comprises a plurality of axially aligned reinforcing fibers.

27. The method of claim 16, wherein the continuous core reinforced filament is a prepreg.

28. The method of claim 27, wherein the prepreg comprises multiple continuous strands preimpregnated with a resin already wicked into the strands.

29. The method of claim 16, wherein the continuous core reinforced filament is combined with matrix material at a nozzle outlet.

30. The method of claim 16, wherein the matrix material comprises a thermoplastic, a thermoset, a resin, or an epoxy.

31. A method for manufacturing a part, the method comprising steps of:
coating an outer surface of at least one continuous core reinforced filament with a matrix material at a coextrusion die of a printhead to form a coated continuous core reinforced filament, wherein the coated continuous core reinforced filament is output through a die exit;
feeding the coated continuous core reinforced filament from the die exit to a nozzle of the printhead, wherein the coated continuous core reinforced filament is dispensed through an outlet at a distal end of the nozzle and onto a surface;
adhering the coated continuous core reinforced filament to the surface, wherein the adhering step comprises applying a compaction pressure with a structure at the distal end of the nozzle to the coated continuous core reinforced filament; and
applying a dragging force between the adhered the coated continuous core reinforced filament and the coated continuous core reinforced filament being fed through the nozzle when the printhead is moved relative to the surface to form the part.

32. The method of claim 31, further comprising, prior to the step of adhering, extruding the coated continuous core reinforced filament from a nozzle of the printhead.

33. The method of claim 31, further comprising a step of impregnating the at least one continuous core reinforced filament with matrix material such that at least one continuous core reinforced filament is wicked.

34. The method of claim 31, wherein the step of coating occurs at a mixing point.

35. The method of claim 31, wherein the matrix material comprises a thermoplastic, a thermoset, a resin, or an epoxy.

* * * * *